United States Patent
Naruse et al.

(10) Patent No.: US 9,854,187 B2
(45) Date of Patent: *Dec. 26, 2017

(54) IMAGE PROCESSING APPARATUS, FILTER ACQUISITION APPARATUS, IMAGE PROCESSING METHOD, FILTER ACQUISITION METHOD, PROGRAM, AND RECORDING MEDIUM

(71) Applicant: FUJIFILM Corporation, Tokyo (JP)

(72) Inventors: Yousuke Naruse, Saitama (JP); Kenkichi Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/435,950

(22) Filed: Feb. 17, 2017

(65) Prior Publication Data

US 2017/0163915 A1  Jun. 8, 2017

Related U.S. Application Data

(63) Continuation of application No. PCT/JP2015/073701, filed on Aug. 24, 2015.

(30) Foreign Application Priority Data

Sep. 30, 2014  (JP) .................. 2014-201083

(51) Int. Cl.
   H04N 5/232  (2006.01)
   H04N 5/357  (2011.01)
   (Continued)

(52) U.S. Cl.
   CPC ........... *H04N 5/3572* (2013.01); *G06T 5/001* (2013.01); *G06T 5/20* (2013.01); *H04N 5/23229* (2013.01)

(58) Field of Classification Search
   CPC .................. H04N 5/3572; H04N 5/23229
   See application file for complete search history.

(56) References Cited

U.S. PATENT DOCUMENTS

2008/0175510 A1  7/2008  Matsushita
2008/0297643 A1*  12/2008  Ono ................ H04N 5/217
                                                348/335
(Continued)

FOREIGN PATENT DOCUMENTS

JP  2008-177801 A  7/2008
JP  2010-177919 A  8/2010
(Continued)

OTHER PUBLICATIONS

Fessler et al., "Space-Alternating Generalized Expectation-Maximization Algorithm", IEEE Transactions on Signal Processing, vol. 42, No. 10, Oct. 1994, pp. 2664-2677.

(Continued)

*Primary Examiner* — Abdelaaziz Tissire
(74) *Attorney, Agent, or Firm* — Birch, Stewart, Kolasch & Birch, LLP

(57) ABSTRACT

There are provided an image processing apparatus, an image processing method, and a program capable of realizing a desired image filtering process specified based on an optical characteristic of an individual optical system with high accuracy using a simple computation process. Further, there are provided a filter acquisition apparatus, a filter acquisition method, program, and a recording medium capable of acquiring a filter which is suitably usable in an image filtering process. A filtering process unit 41 (image processing apparatus 35) applies a filter to processing target data to acquire filter application process data, applies a gain to the filter application process data to acquire gain application process data, in each filtering process. In each filtering
(Continued)

process, the gain applied to the filter application process data is acquired based on a target frequency characteristic of the image filtering process.

35 Claims, 39 Drawing Sheets

(51) Int. Cl.
  *G06T 5/20* (2006.01)
  *G06T 5/00* (2006.01)

(56) References Cited

U.S. PATENT DOCUMENTS

| | | | |
|---|---|---|---|
| 2012/0189226 A1* | 7/2012 | Okada | G06T 5/20 382/260 |
| 2013/0038748 A1* | 2/2013 | Hatakeyama | G06T 5/003 348/222.1 |
| 2013/0343670 A1* | 12/2013 | Damkat | H04N 5/208 382/261 |
| 2017/0161877 A1* | 6/2017 | Naruse | G06T 5/002 |

FOREIGN PATENT DOCUMENTS

| | | |
|---|---|---|
| JP | 2012-252646 A | 12/2012 |
| JP | 2013-038562 A | 2/2013 |

OTHER PUBLICATIONS

Fleury et al., "Channel Parameter Estimation in Mobile Radio Environments Using the SAGE Algorithm", IEEE Journal on Selected Areas in Communications, vol. 17, No. 3, Mar. 1999, pp. 434-450.

International Search Report (PCT/ISA/210) issued in PCT/JP2015/073701, dated Oct. 27, 2015.

Pati et al., "Orthogonal Matching Pursuit: Recursive Function Approximation with Applications to Wavelet Decomposition", Proc. of the 27th Annual Asilomar Conference on Signals Systems and Computers, Nov. 1-3, 1993, pp. 1-5.

Written Opinion (PCT/ISA/237) issued in PCT/JP2015/073701, dated Oct. 27, 2015.

* cited by examiner

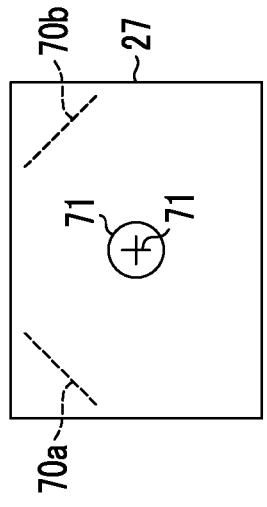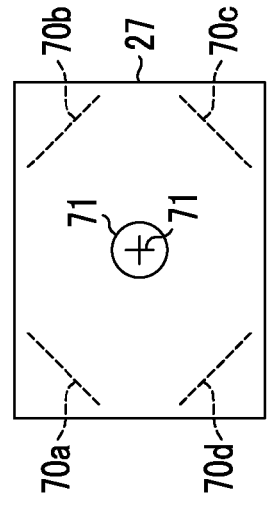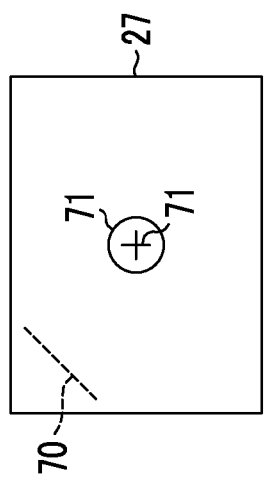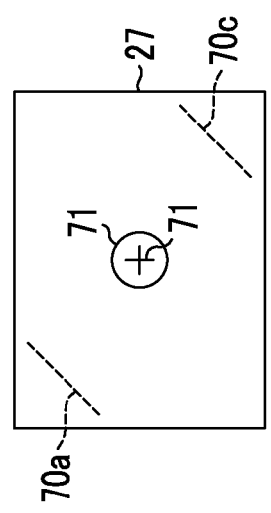

FIG. 32A $$f(\omega) = g_0 \phi_0(\omega) + g_1 \phi_1(\omega) + g_2 \phi_2(\omega)$$

FIG. 32B

| IMAGE FILTERING PROCESS | $g_0$ | $g_1$ | $g_2$ |
|---|---|---|---|
| P1 | 1.0 | 10.5 | 5.5 |
| P2 | 1.0 | 8.5 | 0.2 |
| P3 | 1.0 | 0.1 | 0.4 |
| P4 | 1.0 | -2.3 | 5.3 |

FIG. 38A $$f(\omega) = g_0 \phi_0^{(i)}(\omega) + g_1 \phi_1^{(i)}(\omega) + g_2 \phi_2^{(i)}(\omega)$$

FIG. 38B

| IMAGE FILTERING PROCESS | CLUSTER INDEX (i) | $g_0$ | $g_1$ | $g_2$ |
|---|---|---|---|---|
| P1 | 1 | 1.0 | 5.2 | −0.1 |
| P2 | 1 | 1.0 | 0.2 | 2.1 |
| P3 | 1 | 1.0 | −4.2 | 4.6 |
| P4 | 2 | 1.0 | 4.2 | −2.1 |
| P5 | 2 | 1.0 | 1.2 | 0.1 |
| P6 | 2 | 1.0 | −3.2 | 3.6 |

IMAGE PROCESSING APPARATUS, FILTER ACQUISITION APPARATUS, IMAGE PROCESSING METHOD, FILTER ACQUISITION METHOD, PROGRAM, AND RECORDING MEDIUM

CROSS-REFERENCE TO RELATED APPLICATIONS

This application is a Continuation of PCT International Application No. PCT/JP2015/073701 filed on Aug. 24, 2015, which claims priority under 35 U.S.C §119 (a) to Japanese Patent Application No. 2014-201083 filed on Sep. 30, 2014. Each of the above application(s) is hereby expressly incorporated by reference, in its entirety, into the present application.

BACKGROUND OF THE INVENTION

1. Field of the Invention

The present invention relates to an image processing apparatus, a filter acquisition apparatus, an image processing method, a filter acquisition method, a program, and a recording medium, and particularly, to a filter acquisition technique that is usable in an image filtering process and an image filtering process.

2. Description of the Related Art

Various image filtering process techniques such as a filtering process for enhancing image quality or a filtering process for providing a special visual effect have been proposed. For example, a point image restoration process that restores an original image using a filter determined based on a point spread function (PSF) indicating an image deterioration characteristic due to aberration of an imaging lens or the like is known.

JP2010-177919A discloses an image recording apparatus for the purpose of restoring an image by image processing based on PSF data. In the image recording apparatus, other area PSF data is estimated from "design PSF data indicating a PSF obtained from design values of an imaging lens" and "measurement PSF data obtained from imaging data on an adjustment chart", and image data is restored using the measurement PSF data and the other area PSF data. In this way, by restoring the image data using the measurement PSF data obtained from the imaging data on the adjustment chart, even in a case where the level of deterioration of the image data varies between image recording apparatuses due to an individual difference between the image recording apparatuses, it is possible to perform restoration according to the individual difference.

SUMMARY OF THE INVENTION

As in the above-described image filtering process using the point spread function (PSF), by specifying an image deterioration characteristic such as aberration of a lens from an optical characteristic of an optical system, and by performing a filtering process using a filter designed based on the image deterioration characteristic, it is possible to restore an original image.

Accordingly, it is possible to specify in advance an optical characteristic from design values with respect to an optical system manufactured in an ideal state, and theoretically, it is also possible to create a high-accuracy filter with excellent restoration performance of an image captured using the ideal optical system from a design value. However, since there is variation between optical systems which are actually manufactured and optical characteristics of the optical systems vary due to manufacturing errors or the like, in reality, it is not necessarily easy to create a filter with excellent image restoration performance from only design values of an optical system.

In the image recording apparatus disclosed in JP2010-177919A, by estimating the other area PSF data from the design PSF data and the measurement PSF data, a restoration process of image data according to an individual difference is performed. However, in the technique disclosed in JP2010-177919A, for example, in a case where a difference between a manufacturing error in a central portion and a manufacturing error in a peripheral portion in one optical system (lens or the like) is large, it is not necessarily possible to perform restoration of image data with high accuracy.

Further, in order to perform an image filtering process in which an individual difference between optical systems is reflected, normally, it is necessary to acquire a specific optical characteristic (for example, an image deterioration characteristic) of an individual optical system, and then, to re-design a filter based on the specific optical characteristic. For example, in a case where a filter is generated based on a point spread function (PSF), an optical transfer function (OTF) obtained by Fourier-transforming the point spread function is acquired for each optical system, and a filter for image restoration is calculated from the optical transfer function based on an arbitrary design standard such as a Wiener filter. By configuring the filter calculated in this way by a plurality of taps (tap coefficients), it is possible to simply apply a filter to image data formed of a plurality of pieces of pixel data in an actual space.

In a case where there is no limit in the number of taps of a filter, it is possible to realize a frequency characteristic obtained by inversely Fourier-transforming a frequency space filter represented by a Wiener filter or the like by a finite impulse response (FIR) filter having an arbitrary number of taps. However, in a case where hardware which is actually usable is limited, the number of taps of a filter is also limited. Under the condition that the number of taps of a filter is limited, in order to calculate tap coefficients having a desired frequency characteristic, it is necessary to solve a non-linear optimization problem, and thus, an excessively large amount of calculation is necessary.

Accordingly, in a manufacturing stage of an optical system or in a usage stage thereof from a user, in a case where a filter (tap coefficients) in which an individual difference between optical systems is reflected is re-designed, it is necessary to acquire a specific optical characteristic of an individual optical system, and then, to perform a large amount of computation processes. For example, in a case where calibration of a filter is performed by a user himself/herself using a camera used in actual imaging, it is necessary to prepare a compact computation circuit with high capability for performing such a tremendous computation process without stress and a storage area (read only memory: ROM) therefor. Particularly, in a case where an image filtering process is performed immediately after an image deterioration characteristic of a point spread function or the like is acquired, it is necessary to secure a tremendous calculation resource for calculation of tap coefficients which are actually used. However, it is not necessarily preferable to secure such a calculation resource from a viewpoint of actually building an image processing system.

Further, the types and number of filters used in an image filtering process increase, since a data amount of the entire filters rapidly increases, it is necessary to prepare a memory having a large storage capacity. That is, in a case where filters used in an image filtering process are determined according to a plurality of conditions, a necessary data amount of the filters increases at a rate of an exponential function. For example, a point spread function of an optical system is changed according to imaging conditions such as a diaphragm value (F-number), a zoom value (focal length), a subject distance, a focal position, an optical system type, a sensor signal-noise (SN) ratio of an imaging element, an image height (in-image position), or an individual optical system difference. However, if characteristic filters are prepared with respect to all combinations of individual imaging conditions, an entire data amount necessary for the filters becomes huge.

In addition, in an image filtering process in which specific anisotropy or a specific frequency characteristic is considered, the number of necessary patterns of filters increases. Furthermore, in a case where filters (filter coefficients) to be used are changed according to pixel positions, a data amount of the filters increases according to the number of pixels of an image which is a processing target.

Ideally, it is desirable to prepare filters relating to combinations of all conditions in advance and store the filters in a memory. However, since it is necessary to secure a huge storage capacity and to prepare a high-cost memory, it is not necessarily desirable to prepare and store filters corresponding to all conditions in advance from a viewpoint of actually building an image processing system.

The invention is made in consideration of the above-described problems, and an object of the invention is to provide an image processing technique capable of realizing a desired image filtering process specified based on an optical characteristic of an individual optical system with high accuracy using a simple computation process.

Further, another object of the invention is to provide a filter acquisition technique capable of acquiring a filter which is suitably usable in such an image filtering process.

According to an aspect of the invention, there is provided an image processing apparatus comprising: a filtering process unit that performs an image filtering process that includes a plurality of times of filtering processes with respect to original image data to acquire processed image data, in which in each of the plurality of times of filtering processes, the filtering process unit applies a filter to processing target data to acquire filter application process data, applies a gain to the filter application process data to acquire gain application process data, and acquires filtering process data from the gain application process data, and in which in each of the plurality of times of filtering processes, the gain applied to the filter application process data is acquired based on a target frequency characteristic of the image filtering process specified based on an individual optical characteristic of an optical system used when the original image data is acquired.

According to this aspect, in each of the plurality of times of filtering processes, the gain applied to the filter application process data is acquired based on the target frequency characteristic of the image filtering process, and the target frequency characteristic of the image filtering process is specified based on the individual optical characteristic of the optical system used when the original image data is acquired. By performing the gain adjustment in this way, it is possible to realize a desired image filtering process specified based on an optical characteristic of an individual optical system with high accuracy using a simple computation process. Further, it is possible to perform a high-accuracy filtering process while reducing a data amount of a filter applied to processing target data in each filtering process.

The "frequency characteristic" is a characteristic relating to a frequency, and represents a ratio of an amplitude for each frequency component of image data after processing to an amplitude for each frequency component of image data before processing (=amplitude for each frequency component of image data after processing/amplitude for each frequency component of image data before processing), and represents a response according to a frequency.

Here, it is preferable that the "optical characteristic" is an optical characteristic of an imaging optical system used for imaging and acquisition of original image data which is a target of an image filtering process. For example, a characteristic based on a point spread function PSF or an optical transfer function OTF (including a modulation transfer function (MTF) and a phase transfer function (PTF)) may be used as the "optical characteristic", and "the target frequency characteristic of the image filtering process" may be represented by using an inverse filter design technique using an arbitrary design standard such as a Wiener filter.

Preferably, the image processing apparatus further comprise a gain candidate data storage unit that stores gain table information obtained by associating candidate data of the gain applied to the filter application process data with the individual optical characteristic of the optical system, in each of the plurality of times of filtering processes, and a gain specifying unit that specifies, with reference to the gain table information, the candidate data associated with the individual optical characteristic of the optical system used when the original image data is acquired as the gain applied to the filter application process data in each of the plurality of times of filtering processes, and the filtering process unit applies the gain specified by the gain specifying unit to the filter application process data to acquire the gain application process data in each of the plurality of times of filtering processes.

According to this aspect, it is possible to simply specify the gain applied to the filter application process data from the gain candidate data.

The format of "the gain table information" is not particularly limited as long as gain candidate data and an individual optical characteristic of an optical system are appropriately associated with each other. The individual optical characteristic of the optical system may be directly or indirectly associated with the gain candidate data, and the gain table information may associate information (ID information of the optical system, for example) for specifying the individual optical system with the gain candidate data, for example.

Preferably, the image processing apparatus further comprise a gain acquisition unit that acquires data indicating the individual optical characteristic of the optical system used when the original image data is acquired, specifies the target frequency characteristic of the image filtering process based on the data indicating the individual optical characteristic, and acquires the gain applied to the filter application process data in each of the plurality of times of filtering processes based on the specified target frequency characteristic of the image filtering process.

According to this aspect, the target frequency characteristic of the image filtering process is specified based on the data indicating the individual optical characteristic of the optical systems, and the gain applied to the filter application process data is acquired. Here, "the data indicating the individual optical characteristic of the optical system" may be data directly or indirectly indicating the individual optical characteristic of the optical system, for example, information (ID information of the optical system, for example) for specifying an individual optical system may be used as "the data indicating the individual optical characteristic of the optical system".

Preferably, the gain is acquired by fitting a frequency characteristic of the image filtering process to the target frequency characteristic of the image filtering process using a least squares method based on each frequency characteristic of the plurality of times of filtering processes.

According to this aspect, it is possible to acquire a gain for realizing the target frequency characteristic of the image filtering process with high accuracy based on the least squares method.

Preferably, weighting is performed based on a frequency in the least squares method.

Particularly, in the least squares method, it is preferable that an approximation error evaluation function of frequency characteristics is weighted based on a frequency. Here, the approximation error evaluation function is a function that represents evaluation of the level of approximation (that is, the level of an error), and for example, "a generic function ($J_{LMS}[g]$) based on a weighted least squares standard" which will be described later may be used as the approximation error evaluation function. According to this aspect, by increasing the weight of a frequency band which is to be emphasized and decreasing the weight in a frequency band which is not to be emphasized, it is possible to acquire a gain depending on an actual request with high accuracy.

Preferably, a weight in a low-frequency band is set to be larger than a weight in a high-frequency band in the least squares method.

According to this aspect, it is possible to acquire a gain for particularly realizing a frequency characteristic in a low-frequency band in the target frequency characteristic of the image filtering process with high accuracy. Since a low-frequency component is easily perceived compared with a high-frequency component in terms of human's visual characteristics, by increasing the weight in the low-frequency band to acquire a gain, it is possible to generate processed image data having excellent visibility using an image filtering process.

Here, it is preferable that "the low-frequency band" is determined according to an image quality characteristic which is actually necessary. For example, the "low-frequency band" may be set in a range where a sampling frequency is equal to or smaller than ¼ (=0.25 fs=½ of Nyquist frequency).

Preferably, a weight in a high-frequency band is set to be larger than a weight in a low-frequency band according to an imaging condition when the original image data is acquired, in the least squares method.

According to this aspect, it is possible to acquire a gain for particularly realizing a frequency characteristic in a high-frequency band in the target frequency characteristic of the image filtering process with high accuracy, according to the imaging condition when the original image data is acquired. Generally, in a case where MTF deterioration in a high-frequency band is large and there is a large amount of noise in an imaging system, the noise may be amplified by an image filtering process. That is, image quality may be lowered. Thus, in an image filtering process of original image data acquired under an imaging condition that it is predicted that the SN ratio is bad in a high-frequency band, it may be preferable to prioritize a high-frequency component with respect to a low-frequency component as the accuracy of "the approximation to the target frequency characteristic of the image filtering process".

Here, it is preferable that "the high-frequency band" is determined according to an image quality characteristic which is actually necessary. For example, "the high-frequency band" may be set in a range where a sampling frequency is larger than ¼ (=0.25 fs) and is equal to or smaller than ½ (=0.5 fs), based on a frequency characteristic of assumed noise.

Further, "the imaging condition when the original image data is acquired" is determined based on an arbitrary factor that may have influences on noise. For example, one or a plurality of conditions selected from setting conditions of an imaging optical system used when the original image data is acquired, subject state conditions (scene conditions), or the like may be set to "the imaging condition when the original image data is acquired".

Preferably, the weight in the least squares method is determined according to a pixel position in the original image data.

According to this aspect, it is possible to change the weight in the least squares method according to the pixel position in the original image data, and to perform an image filtering process according to the pixel position. For example, at a pixel position where sharp image quality is necessary, a weight in a high-frequency band may be set to be larger than a weight in a low-frequency band, and at a pixel position where image quality with excellent visibility is necessary, a weight in a low-frequency band may be set to be larger than a weight in a high-frequency band.

Preferably, in the least squares method, the weight in the high-frequency band is large at a pixel position which is equal to or shorter than a first distance from the center of an image of the original image data, compared with a pixel position which is more distant than the first distance from the center of the image of the original image data.

According to this aspect, it is possible to acquire a gain with excellent reproducibility of a high-frequency component in a central portion of an image compared with a peripheral portion of the image. For example, in a case where a main subject is disposed in the central portion of the image, or in similar cases, this aspect may be suitably applied to a case where sharpness is necessary in the central portion of the image.

Here, "the first distance" is not particularly limited, and may be appropriately set based on an imaging range where a high-frequency band is emphasized.

Preferably, the weight in the low-frequency band is large at a pixel position which is more distant than a second distance from the center of an image of the original image data, compared with a pixel position which is equal to or shorter than the second distance from the center of the image of the original image data, in the least squares method.

According to this aspect, it is possible to acquire a gain with excellent reproducibility of a low-frequency component in a peripheral portion of an image compared with a central portion of the image. For example, as in a case where a subject which is an observation target may be disposed in a peripheral portion of an image, in a case where excellent visibility is necessary in a peripheral portion of an image, it is possible to suitably apply this aspect.

Here, "the second distance" is not particularly limited, and may be appropriately set based on an image range where a low-frequency band is emphasized.

Preferably, the filtering process unit uses a filter that makes the filtering process data equal to the processing target data in each of the plurality of times of filtering processes at a frequency where a ratio of the processed image data to the original image data is smaller than 1 in the target frequency characteristic of the image filtering process.

If an image filtering process is performed using an excessively small value of data, noise is easily mixed in data after processing, and also, such noise may be amplified, which consequently may lead to deterioration in image quality. According to this aspect, by using a filter that makes the filtering process data equal to the processing target data, it is possible to effectively prevent mixing of noise and amplification of the noise.

Preferably, the filtering process unit acquires the filter application process data using a filter determined according to an estimated characteristic of the optical system, in at least any one filtering process among the plurality of times of filtering processes.

According to this aspect, the filtering process based on the estimated characteristic of the optical system can be performed at least once.

Preferably, the filter determined according to the characteristic of the optical system is a filter determined based on a point spread function of the optical system.

According to this aspect, the filtering process based on the point spread function of the optical system can be performed at least once.

Preferably, the filtering process unit acquires the filter application process data using a filter determined irrespectively of a characteristic of the optical system used when the original image data is acquired through imaging, in at least any one filtering process among the plurality of times of filtering processes.

According to this aspect, the filtering process irrespective of the characteristic of the optical system can be performed at least once.

Preferably, the filter determined irrespectively of the characteristic of the optical system is a contour emphasis filter.

According to this aspect, the filtering process relating to contour emphasis (edge emphasis) can be performed at least once. The contour emphasis filter may have a frequency characteristic according to a pixel position in the processing target data, or may have a common frequency characteristic without depending on the pixel position in the processing target data.

Preferably, the filtering process unit acquires the filter application process data using a filter having a frequency characteristic according to a pixel position in the processing target data, in at least any one filtering process among the plurality of times of filtering processes.

According to this aspect, the filtering process having the frequency characteristic according to the pixel position in the processing target data can be performed at least once.

Preferably, the plurality of times of filtering processes include at least a first filtering process and a second filtering process, and the filtering process unit uses the filtering process data acquired by the first filtering process as the processing target data in the second filtering process.

According to this aspect, the first filtering process and the second filtering process can be performed in series.

Preferably, the plurality of times of filtering processes include at least a first filtering process and a second filtering process, and the filtering process unit uses the same data in the first filtering process and the second filtering process as the processing target data, and acquires the processed image data based on the filtering process data acquired by the first filtering process and the filtering process data acquired by the second filtering process.

According to this aspect, the first filtering process and the second filtering process can be performed in parallel.

Preferably, the plurality of times of filtering processes include at least a first filtering process and a second filtering process, and the filtering process unit includes a first filter application unit that applies a filter for the first filtering process to the processing target data of the first filtering process to acquire the filter application process data, a first gain application unit that applies a gain for the first filtering process to the filter application process data acquired by the first filter application unit to acquire the gain application process data, a second filter application unit that applies a filter for the second filtering process to the processing target data of the second filtering process to acquire the filter application process data, and a second gain application unit that applies a gain for the second filtering process to the filter application process data acquired by the second filter application unit to acquire the gain application process data.

According to this aspect, the first filtering process and the second filtering process can be performed by "the filter application unit (the first filter application unit and the second filter application unit)" and "the gain application unit (the first gain application unit and the second gain application unit)" which are separately provided, and thus, the processing flow can become simple.

Preferably, the plurality of times of filtering processes include at least a first filtering process and a second filtering process, and the filtering process unit includes a filter application unit that applies the filter to the processing target data to acquire the filter application process data, and a gain application unit that applies the gain to the filter application process data to acquire the gain application process data. The filter application unit acquires the filter application process data using a filter for the first filtering process in the first filtering process, and acquires the filter application process data using a filter for the second filtering process in the second filtering process. The gain application unit acquires the gain application process data using a gain for the first filtering process in the first filtering process, and acquires the gain application process data using a gain for the second filtering process in the second filtering process.

According to this aspect, the first filtering process and the second filtering process can be performed by "the filter application unit" and "the gain application unit" which are the same, and thus, a hardware configuration (circuit configuration) can become simple.

Preferably, the plurality of times of filtering processes include at least a first filtering process and a second filtering process, and the filtering process unit acquires the filter application process data using a reference filter determined according to an average of a plurality of types of frequency characteristics of the image filtering processes in the first filtering process, and acquires the filter application process data using a variance filter determined according to a variance of the plurality of types of frequency characteristics of the image filtering processes in the second filtering process.

According to this aspect, since the reference filter and the variance filter determined according to the average and the variance of the plurality of types of frequency characteristics of the image filtering processes are used, it is possible to averagely perform an image filtering process to be applied with high accuracy.

The variance filter may correspond to directly or indirectly the variance of the plurality of types of frequency characteristics of the image filtering processes. For example, the variance filter may be determined based on a standard deviation derived from the variance, or may be determined based on other factors (for example, an average or the like) in addition to the variance.

According to another aspect of the invention, there is provided an image processing apparatus comprising: a filtering process unit that performs an image filtering process including a plurality of times of filtering processes with respect to original image data to acquire processed image data. Here, the plurality of times of filtering processes include at least a first filtering process and a second filtering process. The filtering process unit applies a filter to a processing target data to acquire filter application process data, applies a gain to the filter application process data to acquire gain application process data, and acquires filtering process data from the gain application process data, in each of the plurality of times of filtering processes. Further, the filtering process unit acquires, in the first filtering process, the filter application process data using a reference filter determined according to an average of frequency characteristics of the plurality of types of image filtering processes, which are frequency characteristics of the plurality of types of image filtering processes determined according to an individual optical characteristic of an optical system used when the original image data is acquired, and acquires, in the second filtering process, the filter application process data using a variance filter determined according to a variance of the frequency characteristics of the plurality of types of image filtering processes, which are the frequency characteristics of the plurality of types of image filtering processes determined according to the individual optical characteristic of the optical system used when the original image data is acquired. Further, the gain applied to the filter application process data is determined based on the individual optical characteristic of the optical system used when the original image data is acquired, in each of the plurality of times of filtering processes.

According to this aspect, the gain applied to the filter application process data is determined based on the individual optical characteristic of the optical system used when the original image data is acquired, in each of the plurality of times of filtering processes. By performing the gain adjustment in this way, it is possible to realize a desired image filtering process specified based on the individual optical characteristic of the optical system with high accuracy using a simple computation process. Further, since the reference filter and the variance filter according to the average and the variance of the frequency characteristics of the plurality of types of image filtering processes determined according to the individual optical characteristic of the optical system are used, it is possible to averagely perform an image filtering processes with high accuracy.

According to still another aspect of the invention, there is provided a filter acquisition apparatus comprising: a filter calculation unit that acquires a reference filter determined according to an average of frequency characteristics of a plurality of types of image filtering processes, based on the frequency characteristics of the plurality of types of image filtering processes specified according to optical characteristics of a plurality of optical systems, and acquires at least one variance filter determined according to a variance of the frequency characteristics of the plurality of types of image filtering processes, based on the frequency characteristics of the plurality of types of image filtering processes.

According to this aspect, it is possible to acquire the reference filter and the variance filter capable of stably performing an image filtering process with high accuracy.

The reference filter and the variance filter acquired in this way can be suitably used in each of the plurality of times of filtering processes.

Preferably, the filter calculation unit acquires, among the frequency characteristics of the plurality of types of image filtering processes classified into a plurality of filter groups, based on the frequency characteristics of the plurality of types of image filtering processes included in each of the plurality of filter groups, the reference filter and the at least one variance filter relating to each of the plurality of filter groups.

According to this aspect, even in a case where variation of the frequency characteristics of the plurality of types of image filtering processes is relatively large, the frequency characteristics of the plurality of types of image filtering processes are classified into the plurality of filter groups, and the reference filter and the variance filter are acquired for each of filter groups. Thus, it is possible to provide a filter capable of realizing each of the frequency characteristics of the plurality of types of image filtering processes with high accuracy.

A method for classifying the frequency characteristics of the plurality of types of image filtering processes into a plurality of filter groups is not particularly limited, and for example, the classification may be performed based on similarity of the frequency characteristics of the image filtering processes. Here, "the similarity" may be appropriately determined by a user, or may be acquired by automatically analyzing the frequency characteristics of the image filtering processes based on a specific reference.

Preferably, the filter acquisition apparatus further comprises a filter group classification unit that classifies the frequency characteristics of the plurality of types of image filtering processes into the plurality of filter groups, with reference to a mixed normal distribution.

According to this aspect, it is possible to perform classification into the filter groups with high accuracy based on the mixed normal distribution.

Preferably, the filter calculation unit acquires the reference filter which has a plurality of taps, in which a coefficient is allocated to each tap, and acquires the at least one variance filter which has a plurality of taps, in which a coefficient is allocated to each tap.

According to this aspect, it is possible to configure each of the reference filter and the variance filter using a plurality of taps (tap coefficients).

Preferably, the filter calculation unit calculates the coefficient allocated to each tap of the at least one variance filter from a variation distribution function that represents the variance of the frequency characteristics of the plurality of types of image filtering processes and is determined based on the coefficient allocated to each tap of the reference filter.

According to this aspect, it is possible to calculate the coefficient allocated to each tap of the variance filter, based on the variation distribution function indicating the variance of the frequency characteristics of the plurality of types of image filtering processes with high accuracy.

Preferably, the filter calculation unit acquires a first to an I-th variance filters in a case where I is an integer which is equal to or greater than 2, calculates a coefficient allocated to each tap of the first variance filter from the variation distribution function determined based on the coefficient allocated to each tap of the reference filter, and calculates, in a case where J is an integer which is equal to or greater than 2 and is equal to or smaller than I, a coefficient allocated to each tap of a J-th variance filter from the variation distribution function determined based on the coefficient allocated to each tap of the reference filter and a coefficient allocated to each tap of each variance filter that belongs to a first to a (J−1)-th variance filters.

According to this aspect, it is possible to calculate a coefficient allocated to each tap of a certain variance filter (a J-th variance filter) from the variation distribution function determined based on the reference filter and the other variance filters (a first to a (J−1)-th variance filters) with high accuracy.

Preferably, the filter calculation unit updates a coefficient allocated to each tap of at least one of the reference filter and the at least one variance filter, based on a variation distribution function that represents the variance of the frequency characteristics of the plurality of types of image filtering processes and is determined based on the coefficient allocated to each tap of each of the reference filter and the at least one variance filter.

According to this aspect, it is possible to update the coefficient allocated to each tap of at least one of the reference filter and the at least one variance filter, to thereby enhance the accuracy of filters.

Preferably, the filter calculation unit calculates the coefficient allocated to each tap of each of the reference filter and the at least one variance filter, based on a SAGE algorithm or an OMP algorithm.

According to this aspect, it is possible to calculate the coefficient allocated to each tap with high accuracy, based on the space alternative generalized expectation (SAGE) algorithm or the orthogonal matching pursuit (OMP) algorithm.

According to still another aspect of the invention, there is provided an image processing method for performing an image filtering process including a plurality of times of filtering processes with respect to original image data to acquire processed image data, in which the method comprises: applying a filter to processing target data to acquire filter application process data, applying a gain to the filter application process data to acquire gain application process data, and acquiring filtering process data from the gain application process data, in each of the plurality of times of filtering processes; and acquiring the gain applied to the filter application process data based on a target frequency characteristic of the image filtering process specified based on an individual optical characteristic of an optical system used when the original image data is acquired, in each of the plurality of times of filtering processes.

According to still another aspect of the invention, there is provided an image processing method for performing an image filtering process including a plurality of times of filtering processes with respect to original image data to acquire processed image data, in which the plurality of times of filtering processes include at least a first filtering process and a second filtering process, in which the method comprises: applying a filter to processing target data to acquire filter application process data, applying a gain to the filter application process data to acquire gain application process data, and acquiring filtering process data from the gain application process data, in each of the plurality of times of filtering processes; acquiring, in the first filtering process, the filter application process data using a reference filter determined according to an average of frequency characteristics of a plurality of types of image filtering processes, which are frequency characteristics of the plurality of types of image filtering processes determined according to an individual optical characteristic of an optical system used when the original image data is acquired; and acquiring, in the second filtering process, the filter application process data using a variance filter determined according to a variance of the frequency characteristics of the plurality of types of image filtering processes, which are the frequency characteristics of the plurality of types of image filtering processes determined according to the individual optical characteristic of the optical system used when the original image data is acquired, and in which the gain applied to the filter application process data is determined based on the individual optical characteristic of the optical system used when the original image data is acquired, in each of the plurality of times of filtering processes.

According to still another aspect of the invention, there is provided a filter acquisition method comprising: acquiring, based on frequency characteristics of a plurality of types of image filtering processes specified according to optical characteristics of a plurality of optical systems, a reference filter determined according to an average of the frequency characteristics of the plurality of types of image filtering processes; and acquiring at least one variance filter determined according to a variance of the frequency characteristics of the plurality of types of image filtering processes, based on the frequency characteristics of the plurality of types of image filtering processes.

According to still another aspect of the invention, there is provided a program that causes a computer to realize a function for performing an image filtering process including a plurality of times of filtering processes with respect to original image data to acquire processed image data, the program causing the computer to execute: a process of applying a filter to processing target data to acquire filter application process data, a process of applying a gain to the filter application process data to acquire gain application process data, and a process of acquiring filtering process data from the gain application process data, in each of the plurality of times of filtering processes, in which the gain applied to the filter application process data is acquired based on a target frequency characteristic of the image filtering process specified based on an individual optical characteristic of an optical system used when the original image data is acquired, in each of the plurality of times of filtering processes.

According to still another aspect of the invention, there is provided a program that causes a computer to realize a function for performing an image filtering process including a plurality of times of filtering processes with respect to original image data to acquire processed image data, in which the plurality of times of filtering processes include at least a first filtering process and a second filtering process, in which the program causes the computer to execute: a process of applying a filter to processing target data to acquire filter application process data, a process of applying a gain to the filter application process data to acquire gain application process data, and a process of acquiring filtering process data from the gain application process data, in each of the plurality of times of filtering processes; a process of acquiring, in the first filtering process, the filter application process data using a reference filter determined according to an average of frequency characteristics of the plurality of types of image filtering processes, which are the frequency characteristics of the plurality of types of image filtering processes determined according to an individual optical characteristic of an optical system used when the original image data is acquired; and a process of acquiring, in the second filtering process, the filter application process data using a variance filter determined according to a variance of the frequency characteristics of the plurality of types of image filtering processes, which are the frequency characteristics of the plurality of types of image filtering processes determined according to the individual optical characteristic of the optical system used when the original image data is acquired, and in which the gain applied to the filter application process data is determined based on the individual optical characteristic of the optical system used when the original image data is acquired, in each of the plurality of times of filtering processes.

According to still another aspect of the invention, there is provided a program that causes a computer to execute: a process of acquiring, based on frequency characteristics of a plurality of types of image filtering processes specified according to optical characteristics of a plurality of optical systems, a reference filter determined according to an average of the frequency characteristics of the plurality of types of image filtering processes; and a process of acquiring, based on the frequency characteristics of the plurality of types of image filtering processes, at least one variance filter determined according to variances of the frequency characteristics of the plurality of types of image filtering processes.

According to still another aspect of the invention, there is provided a computer-readable recording medium that stores a program that causes a computer to realize a function for performing an image filtering process including a plurality of times of filtering processes with respect to original image data to acquire processed image data, in which the program causes the computer to execute: a process of applying a filter to processing target data to acquire filter application process data, a process of applying a gain to the filter application process data to acquire gain application process data, and a process of acquiring filtering process data from the gain application process data, in each of the plurality of times of filtering processes, and in which the gain applied to the filter application process data is acquired based on a target frequency characteristic of the image filtering process specified based on an individual optical characteristic of an optical system used when the original image data is acquired, in each of the plurality of times of filtering processes.

According to still another aspect of the invention, there is provided a computer-readable recording medium that stores a program that causes a computer to realize a function for performing an image filtering process including a plurality of times of filtering processes with respect to original image data to acquire processed image data, in which the plurality of times of filtering processes include at least a first filtering process and a second filtering process, in which the program causes the computer to execute: a process of applying a filter to processing target data to acquire filter application process data, a process of applying a gain to the filter application process data to acquire gain application process data, and a process of acquiring filtering process data from the gain application process data, in each of the plurality of times of filtering processes; a process of acquiring, in the first filtering process, the filter application process data using a reference filter determined according to an average of frequency characteristics of the plurality of types of image filtering processes, which are the frequency characteristics of the plurality of types of image filtering processes determined according to an individual optical characteristic of an optical system used when the original image data is acquired; and a process of acquiring, in the second filtering process, the filter application process data using a variance filter determined according to a variance of the frequency characteristics of the plurality of types of image filtering processes, which are the frequency characteristics of the plurality of types of image filtering processes determined according to the individual optical characteristic of the optical system used when the original image data is acquired, and in which the gain applied to the filter application process data is determined based on the individual optical characteristic of the optical system used when the original image data is acquired, in each of the plurality of times of filtering processes.

According to still another aspect of the invention, there is provided a computer-readable recording medium that stores a program that causes a computer to execute: a process of acquiring, based on frequency characteristics of a plurality of types of image filtering processes specified according to optical characteristics of a plurality of optical systems, a reference filter determined according to an average of the frequency characteristics of the plurality of types of image filtering processes; and a process of acquiring, based on the frequency characteristics of the plurality of types of image filtering processes, at least one variance filter determined according to variances of the frequency characteristics of the plurality of types of image filtering processes.

According to the aspects, it is possible to acquire a gain applied to filter application process data in each of a plurality of times of filtering processes based on a target frequency characteristic of an image filtering process, and to specify the target frequency characteristic of the image filtering process based on an individual optical characteristic of an optical system used when original image data is acquired. Thus, it is possible to realize a desired image filtering process specified based on an optical characteristic of an individual optical system with high accuracy using a simple computation process. Further, it is possible to perform a high-accuracy filtering process while reducing a data amount of a filter applied to processing target data in each filtering process.

Further, according to the invention, it is possible to acquire a reference filter and a variance filter determined according to an average and a variance of frequency characteristics of a plurality of types of image filtering processes. By performing a filter application process using the reference filter and the variance filter acquired in this way, it is possible to averagely perform an image filtering process with high accuracy.

BRIEF DESCRIPTION OF THE DRAWINGS

FIGS. 17A to 17D are diagrams showing an example of an imaging guide in a display unit.

FIGS. 31A to 31C are diagrams schematically showing examples of base filters (characteristic vectors) acquired from an average and a variance of frequency characteristics of the plurality of types of image filtering processes shown in FIG. 29, in which FIG. 31A shows "$\phi_0$", FIG. 31B shows "$\phi_1$", and FIG. 31C shows "$\phi_2$".

FIGS. 32A and 32B are diagrams showing a frequency characteristic (see FIG. 32A) and a gain example (see FIG. 32B) relating to image filtering processes (first filtering process to third filtering process) performed by a filtering process unit having the circuit configuration shown in FIG. 10.

FIGS. 35A and 35B are diagrams schematically showing an example of a variance of frequency characteristics of a plurality of types of image filtering processes shown in FIG. 34, in which FIG. 35A shows a variance of frequency characteristic data of a first image filtering process to a third image filtering process classified as a first variation distribution, and FIG. 35B shows a variance of frequency characteristic data of a fourth image filtering process to a sixth image filtering process classified as a second variation distribution.

FIGS. 36A to 36C are diagrams schematically showing examples of base filters (characteristic vectors) acquired from an average and a variance of frequency characteristics of the first image filtering process to the third image filtering process classified as the first variation distribution, in which FIG. 36A shows "$\phi_0$", FIG. 36B shows "$\phi_1$", and FIG. 36C shows "$\phi_2$".

FIGS. 37A to 37C are diagrams schematically showing examples of base filters (characteristic vectors) acquired from an average and a variance of frequency characteristics of the fourth image filtering process to the sixth image filtering process classified as the second variation distribution, in which FIG. 37A shows "$\phi_0$", FIG. 37B shows "$\phi_1$", and FIG. 37C shows "$\phi_2$".

FIGS. 38A and 38B are diagrams showing a frequency characteristic (see FIG. 38A) and a gain example (see FIG. 38B) relating to image filtering processes (first filtering process to third filtering process) performed by a filtering process unit having the circuit configuration shown in FIG. 10.

FIGS. 41A and 41B are graphs showing an example of an "MTF of an optical system (lens)" derived from design values, in which FIG. 41A shows an MTF of a central portion of the optical system and FIG. 41B shows an MTF of a peripheral portion of the optical system.

FIGS. 42A and 42B are graphs showing an example of an "MTF of an optical system (lens)" derived from an actual measurement value, in which FIG. 42A shows an MTF of a central portion of the optical system and FIG. 42B shows an MTF of a peripheral portion of the optical system.

FIGS. 43A and 43B are graphs showing an example of an "MTF relating to an image filtering process" in a case where a filter application process PF and a gain application processing PG are performed based on the MTF shown in FIG. 41, in which FIG. 43A shows an MTF of a central portion of the optical system and FIG. 43B shows an MTF of a peripheral portion of the optical system.

FIGS. 44A and 44B are graphs showing an example of an "MTF relating to an image filtering process" in a case where a filter application process PF and a gain application process PG are performed based on the MTF shown in FIG. 42, in which FIG. 44A shows an MTF of a central portion of the optical system and FIG. 44B shows an MTF of a peripheral portion of the optical system.

FIGS. 45A and 45B are graphs showing an example of an "MTF of an optical system (lens)" in a case where the filter application process PF and the gain application process PG are performed based on the MTF shown in FIG. 42, in which FIG. 45A shows an MTF of a central portion of the optical system and FIG. 45B shows an MTF of a peripheral portion of the optical system.

FIGS. 46A and 46B are graphs showing an example of an "MTF of an optical system (lens)" in a case where a point image restoration process and a contour emphasis process (which will be described hereinafter) are combined and performed based on the MTF shown in FIG. 42, in which FIG. 46A shows an MTF of a central portion of the optical system and FIG. 46B shows an MTF of a peripheral portion of the optical system.

Figure 53:
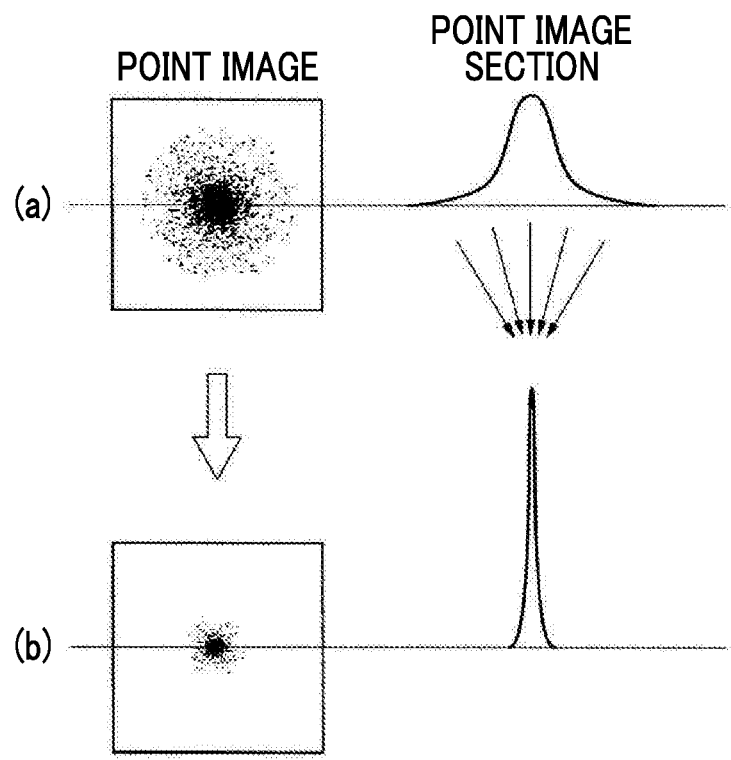

(a) and (b) of FIG. 53 are diagrams showing an example of restoration of an image acquired through the EDoF optical system, in which (a) of FIG. 53 shows a blurred image before the restoration process and (b) of FIG. 53 shows an image (point image) in which blurring is canceled after the restoration process.

Figure 54:
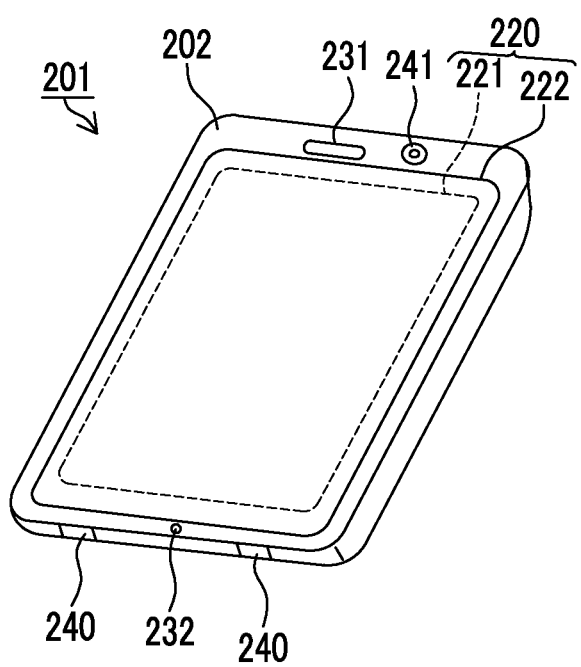

FIG. 54 is a diagram showing an appearance of a smartphone.

Figure 55:
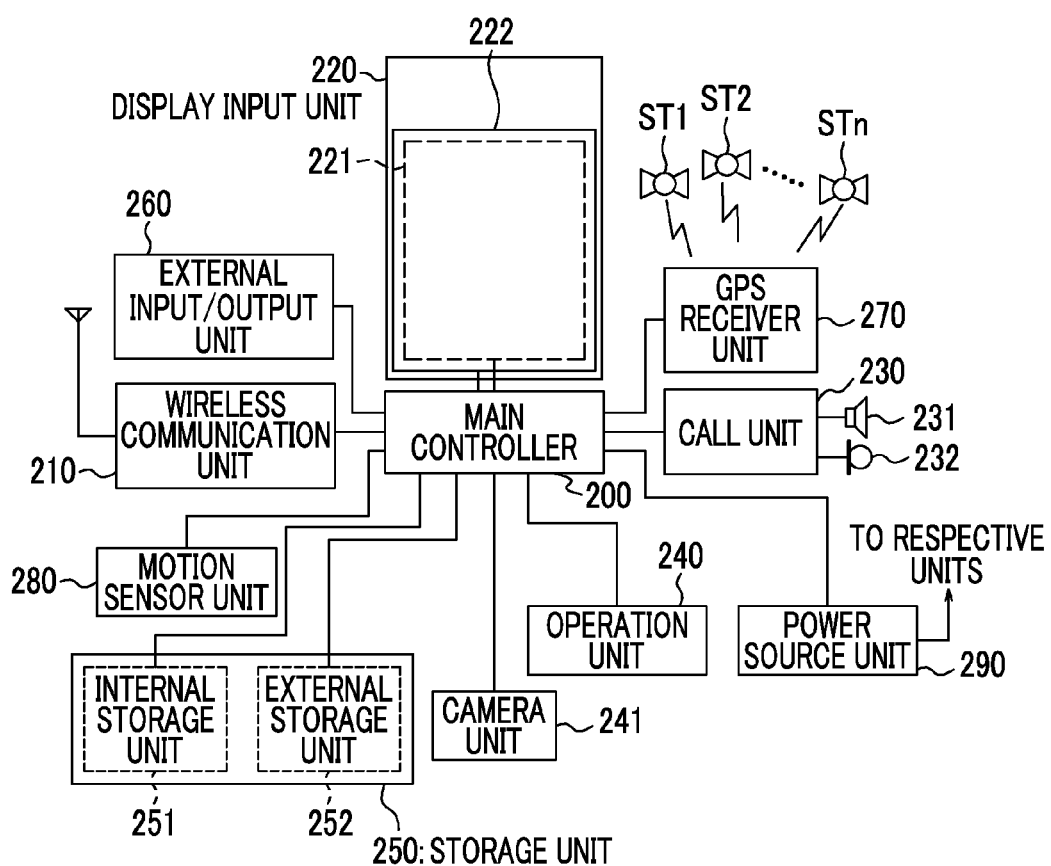

FIG. 55 is a block diagram showing a configuration of the smartphone shown in FIG. 54.

DESCRIPTION OF THE PREFERRED EMBODIMENTS

Embodiments of the invention will be described with reference to the accompanying drawings. In the following embodiments, a case in which the invention is applied to a digital camera (imaging apparatus) capable of being connected to a computer (PC: personal computer) will be described as an example.

Figure 1:
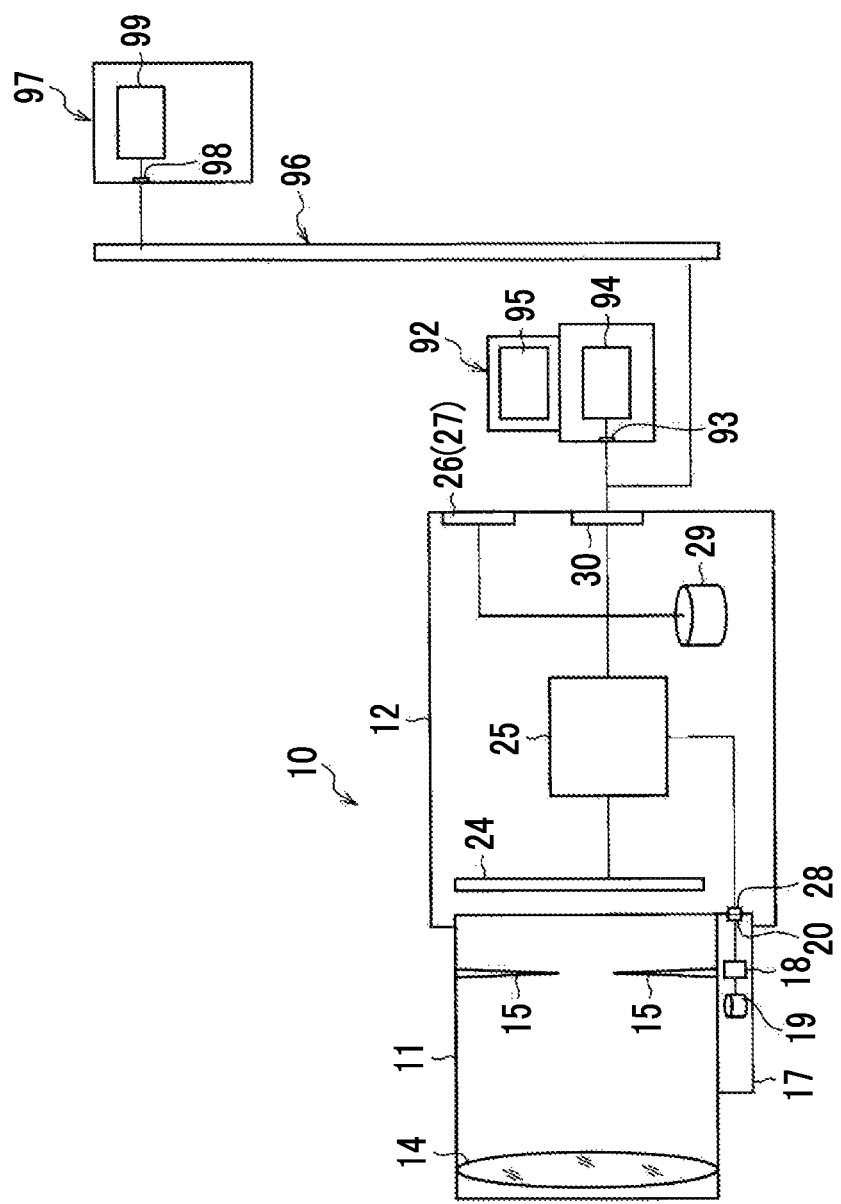
FIG. 1 is a block diagram showing a digital camera connected to a computer.

FIG. 1 is a block diagram showing a digital camera 10 connected to a computer 92.

The digital camera 10 in this example includes an exchangeable lens unit 11, and a camera main body 12 that includes an imaging element 24, in which the lens unit 11 and the camera main body 12 are electrically connected to each other through a lens unit input/output unit 20 of the lens unit 11 and a camera main body input/output unit 28 of the camera main body 12.

The lens unit 11 includes an optical system that includes a lens 14 and a diaphragm 15, and an optical system operation unit 17 that controls the optical system. The optical system operation unit 17 includes a lens unit controller 18 connected to the lens unit input/output unit 20, a lens unit storage unit 19 that stores a variety of information such as optical system information, and an actuator (not shown) that operates the optical system. The lens unit controller 18 controls the optical system through the actuator based on a control signal transmitted from the camera main body 12 through the lens unit input/output unit 20, and for example, performs a focus control or a zoom control based on lens movement, a diaphragm value control of the diaphragm 15, and the like. Further, the lens unit controller 18 reads out a variety of information stored in the lens unit storage unit 19 based on a control signal transmitted from the camera main body 12 through the lens unit input/output unit 20, and transmits the read information to the camera main body 12 (main body controller 25).

The imaging element 24 of the camera main body 12 includes a focusing microlens, color filters of R (red), G (green) and B (blue), or the like, and an image sensor (photodiode) configured by a complementary metal oxide semiconductor (CMOS), a charge coupled device (CCD) or the like. The imaging element 24 converts subject image light irradiated through the optical system (the lens 14, the diaphragm 15, and the like) of the lens unit 11 into an electric signal, and transmits the image signal (image data) to the main body controller 25.

The main body controller 25 has a function as a device controller that generally controls the respective units of the digital camera 10, and a function as an image processing unit (image processing apparatus) that performs image processing with respect to image data transmitted from the imaging element 24, but details thereof will be described later (see FIG. 2).

The digital camera 10 includes other devices (release button or the like) necessary for imaging or the like, and a part of the other devices forms a user interface 26 through which a user is capable of performing checks and operations. In the example shown in FIG. 1, the user interface 26 is provided in the camera main body 12, but the user interface 26 may be disposed in the lens unit 11 and/or the camera main body 12. The user may determine and change various settings (exposure value (EV)) for imaging or the like, may give an imaging instruction, or may check a live view image and a captured image through the user interface 26, for example. The user interface 26 is connected to the main body controller 25, so that various setting and various instructions determined and changed by the user are reflected in various processes in the main body controller 25. In this embodiment, as described later, the user is guided through a display on a display unit 27 (electronic view finder (EVF), and a rear surface liquid crystal display unit) included in the user interface 26, and is prompted to perform capturing of a reference image used for detecting an optical characteristic of the optical system (the lens 14, the diaphragm 15, and the like) is prompted.

Image data which is subjected to image processing in the main body controller 25 is stored in a main body storage unit 29 provided in the camera main body 12, and is transmitted to an external apparatus such as the computer 92 through an input/output interface 30, as necessary. The main body storage unit 29 is configured by an arbitrary memory device, and an exchangeable memory such as a memory card may be preferably used. A format of the image data output from the main body controller 25 is not particularly limited, and image data having a format such as RAW, joint photographic experts group (JPEG) and/or tagged image file format (TIFF) may be generated and output by the main body controller 25. Further, the main body controller 25 may form one image file by associating a plurality of pieces of related data such as header information (imaging information (imaging date and time, device type, the number of pixels, a diaphragm value, or the like), or the like), main image data and thumbnail image data with each other, such as a so-called exchangeable image file format (Exif), and may output the image file.

The computer 92 is connected to the digital camera 10 through the input/output interface 30 of the camera main body 12 and the computer input/output unit 93, and receives a variety of data such as image data transmitted from the camera main body 12. The computer controller 94 totally controls the computer 92, performs image processing with respect to image data from the digital camera 10, and for example, controls communication with a server 97 connected to the computer input/output unit 93 through a network 96 such as the Internet. The computer 92 includes a display 95, and processed content or the like in the computer controller 94 is displayed on the display 95 as necessary. A user may operate input means (not shown) such as a keyboard while checking a display on the display 95, to thereby input data or commands into the computer controller 94. Thus, the user may control the computer 92 or devices (the digital camera 10, the server 97, and the like) connected to the computer 92.

The server 97 includes a server input/output unit 98 and a server controller 99. The server input/output unit 98 configures a transmission/reception connection unit with respect to an external apparatus such as the computer 92, and is connected to the computer input/output unit 93 of the computer 92 through the network 96 such as the Internet. The server controller 99 works in cooperation with the computer controller 94 according to a control instruction signal from the computer 92, performs transmission and reception of a variety of data with respect to the computer controller 94 as necessary, performs a computation process, and transmits a computation result to the computer 92.

Each controller (the lens unit controller 18, the main body controller 25, the computer controller 94, and the server controller 99) includes a variety of circuits necessary for a control process, and for example, includes a computational circuit (central processing unit (CPU), or the like), a memory, or the like. Further, communication between the digital camera 10, the computer 92, and the server 97 may be a wired communication or a wireless communication. In addition, the computer 92 and the server 97 may be integrally formed, or the computer 92 and/or the server 97 may not be provided. Furthermore, a communication function with respect to the server 97 may be given to the digital camera 10, and transmission and reception of a variety of data may be directly performed between the digital camera 10 and the server 97.

Figure 2:
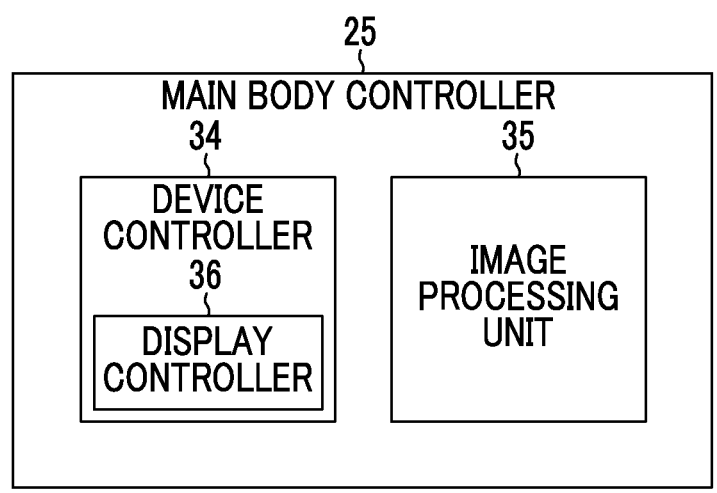
FIG. 2 is a block diagram showing an example of a configuration of a main body controller.

FIG. 2 is a block diagram showing an example of a configuration of the main body controller 25. The main body controller 25 includes a device controller 34 and an image processing unit (image processing apparatus) 35, and totally controls the camera main body 12.

The device controller 34 appropriately controls various types of devices provided in the digital camera 10, for example, controls the imaging element 24 to control an output of an image signal (image data) from the imaging element 24, generates a control signal for controlling the lens unit 11, transmits the control signal to the lens unit 11 (lens unit controller 18) through camera main body input/output unit 28, stores the image data before and after image processing (RAW data, JPEG data, or the like) in the main body storage unit 29, and transmits the image data before and after the image processing (RAW data, JPEG data, or the like) to an external apparatus or the like (computer 92 or the like) connected through the input/output interface 30. Particularly, the device controller 34 of this example includes a display controller 36 that controls the display unit 27. The display controller 36 is capable of causing the display unit 27 to display a guide for guiding a user's imaging operation in cooperation with the image processing unit 35 as described later.

On the other hand, the image processing unit 35 performs arbitrary image processing with respect to an image signal output from the imaging element 24, as necessary. For example, a variety of image processing such as sensor correction, demosaicing (synchronization), pixel interpolation, color correction (offset correction, white balancing, color matrix processing, gamma conversion, and the like), and RGB image processing (sharpening, tone correction, exposure correction, contour correction, and the like), RGB/YCrCb conversion, or image compression may be appropriately performed in the image processing unit 35.

Figure 3:
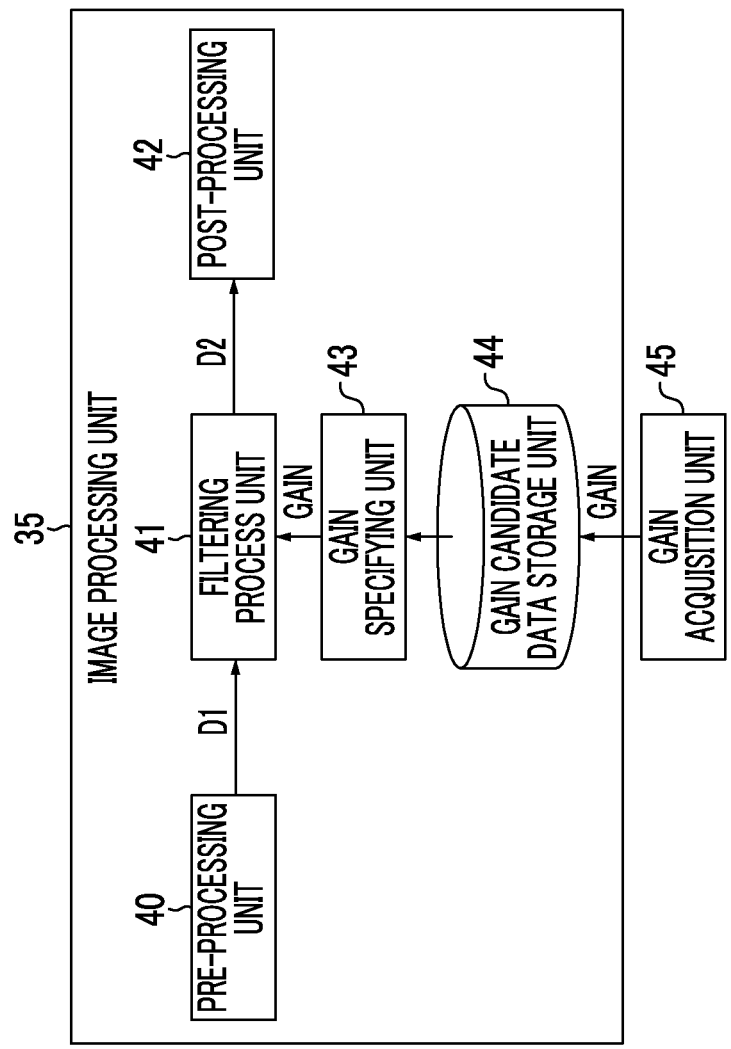
FIG. 3 is a block diagram showing an example of a functional configuration of an image processing unit.

FIG. 3 is a block diagram showing an example of a functional configuration of the image processing unit 35.

The image processing unit 35 includes a filtering process unit 41 that performs an image filtering process including a plurality of times of filtering processes with respect to original image data D1 to acquire processed image data D2. Further, the image processing unit 35 of this example further includes a gain specifying unit 43, a gain candidate data storage unit 44, a pre-processing unit 40, and a post-processing unit 42, in addition to the filtering process unit 41.

The filtering process unit 41 applies a filter to processing target data to acquire filter application process data in each of the plurality of times of filtering processes, applies a gain to the filter application process data to acquire gain application process data, and acquires filtering process data from the gain application process data.

The gain candidate data storage unit 44 stores "gain table information" obtained by associating candidate data of a gain applied to filter application process data in each of the plurality of times of filtering processes in the filtering process unit 41 with an individual optical characteristic of an optical system. The gain table information including the candidate data of the gain is acquired in advance by the gain acquisition unit 45 according to the individual optical characteristic of the optical system, and is stored in the gain candidate data storage unit 44. A specific example of a gain (candidate data) acquisition method based on the individual optical characteristic of the optical system will be described later.

The gain specifying unit 43 specifies, with reference to gain table information stored in the gain candidate data storage unit 44, candidate data associated with an individual optical characteristic of the optical system used when the original image data D1 which is an image filtering process target is acquired as a gain to be applied to the filter application process data in each of the plurality of times of filtering processes, and transmits the result to the filtering process unit 41. The gain specifying unit 43 in this example acquires the individual optical characteristic of the optical system used when the original image data D1 is acquired, reads out the candidate data of the gain associated with the optical characteristic from the gain candidate data storage unit 44, and transmits the result to the filtering process unit 41 as a gain to be applied to the filter application process data. A method for acquiring information relating to the individual optical characteristic of the optical system in the gain specifying unit 43 is not particularly limited, and the gain specifying unit 43 may acquire information for specifying each optical system used when the original image data D1 is acquired from imaging condition information retained in a memory (not shown) of the main body controller 25, for example, as information indirectly indicating the individual optical characteristic of the optical system.

The filtering process unit 41 applies the gain specified by the gain specifying unit 43 in each of the plurality of times of filtering processes to the filter application process data to acquire the gain application process data.

The image processing unit 35 also performs image processing other than the above-described image filtering process. A variety of image processing other than the image filtering process may be performed in the pre-processing unit 40 provided at a pre-stage of the filtering process unit 41, or may be performed in the post-processing unit 42 provided at a post-stage of the filtering process unit 41. That is, the image filtering process in the filtering process unit 41 may be performed using data received through the variety of image processing performed in the pre-processing unit 40 as the original image data D1, or the variety of image processing may be performed in the post-processing unit 42 with respect to the processed image data D2 received through the image filtering process in the filtering process unit 41.

In this example, image data input to the filtering process unit 41 from the pre-processing unit 40 is referred to as the "original image data D1", and image data output from the post-processing unit 42 from the filtering process unit 41 is referred to as the "processed image data D2".

Figure 4:
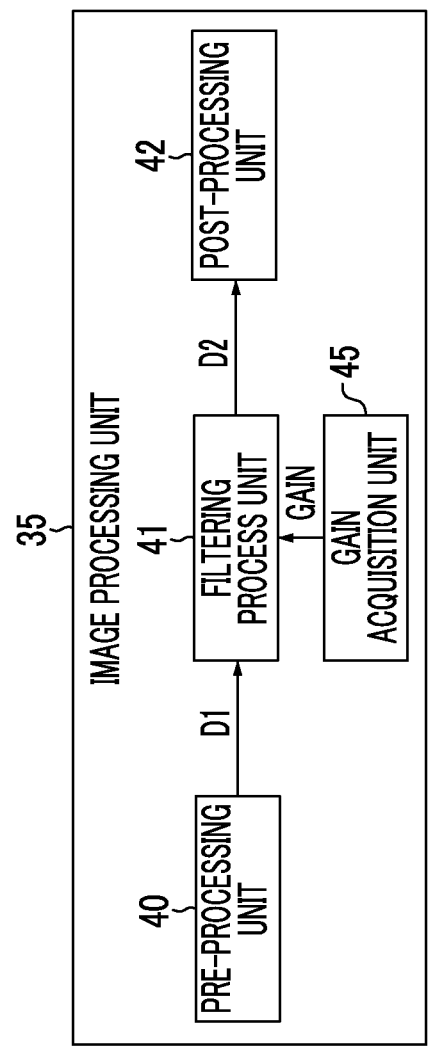
FIG. 4 is a block diagram showing another example of the functional configuration of the image processing unit.

FIG. 4 is a block diagram showing another example of the functional configuration of the image processing unit 35.

In the example shown in FIG. 3, a gain to be used in the filtering process is acquired with reference to the gain table information stored in advance in the gain candidate data storage unit 44, but in the example shown in FIG. 4, the gain table information (gain candidate data) is not acquired and stored in advance, and instead, a gain is acquired together with execution of the filtering process. That is, in the example shown in FIG. 4, the gain acquisition unit 45 is connected to the filtering process unit 41, and a gain to be used in the plurality of times of filtering processes performed in the filtering process unit 41 is directly supplied to the filtering process unit 41 from the gain acquisition unit 45. The gain acquisition unit 45 acquires data indicating the individual optical characteristic of the optical system used when the original image data D1 is acquired, specifies a target frequency characteristic of an image filtering process based on the data indicating the individual optical characteristic, acquires a gain to be applied to the filter application process data in each of the plurality of times of filtering processes, based on the specified "target frequency characteristic of the image filtering process", and supplies the acquired gain to the filtering process unit 41.

Figure 5:
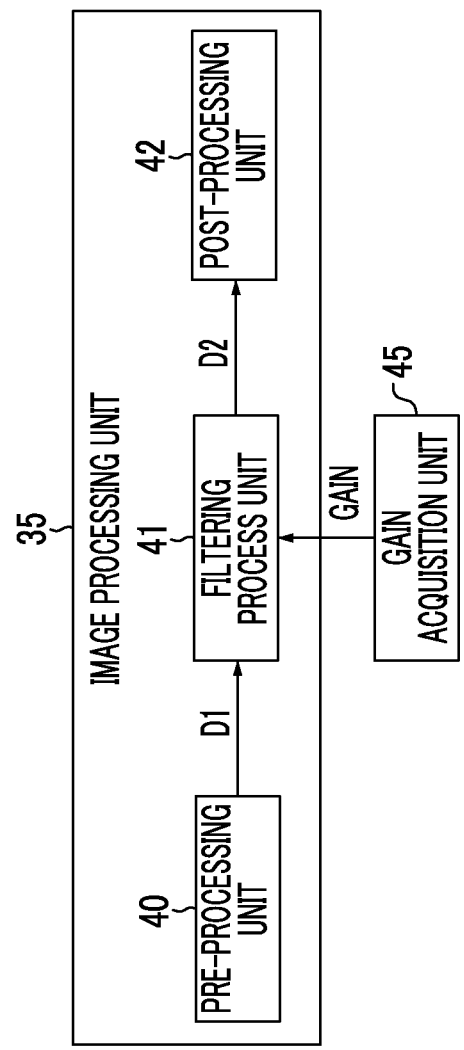
FIG. 5 is a block diagram showing another example of the functional configuration of the image processing unit.

The gain acquisition unit 45 may be provided as a part of the image processing unit 35, as shown in FIG. 4, or may be provided as another processing unit which is different from the image processing unit 35, as shown in FIG. 5.

In the examples shown in FIGS. 4 and 5, similarly, image processing other than the above-described image filtering process may be performed in the pre-processing unit 40 provided at the pre-stage of the filtering process unit 41, or may be performed in the post-processing unit 42 provided at the post-stage of the filtering process unit 41.

Next, a specific example of the image filtering process (the plurality of times of filtering processes) performed in the filtering process unit 41 will be descried.

Ideally, a plurality of optical systems manufactured based on the same design values is expected to show a uniform optical characteristic, respectively. However, in reality, even in the case of optical systems manufactured based on the same design values, variation occurs between the individual optical systems due to manufacturing errors or the like, and thus, do not necessarily show the same optical characteristics. Accordingly, in order to perform image filtering processes using filters based on optical characteristics with high accuracy, since optical characteristics of a plurality of optical systems are not considered to be the same even when the optical systems are manufactured based on the same design values, it is necessary to individually design filters relating to the respective optical systems in a state where accurate optical characteristics of the respective optical systems are acquired. However, in order to build filters which are actually used based on the optical characteristics of the respective optical systems, it is necessary to perform a large amount of computation processes, and it is necessary to secure a large storage capacity for storing filters. Generally, in a case where an image filtering process (filtering process) is performed using an FIR filter configured by a plurality of finite taps, it is necessary to calculate, after an optical characteristic of an individual optical system is acquired, a frequency characteristic of the filter based on the optical characteristic, and then, it is necessary to calculate tap coefficients in order to realize the frequency characteristic of the filter. Since such a series of processes causes complicated computation and a data volume of the calculated tap coefficients becomes enormous, for example, in a case where it is necessary that tap coefficients are calculated in a short time, a high-performance computational circuit and a memory therefor are necessary.

In order to reduce a work load of a computation process necessary for the image filtering process and reduce a data volume, in the following embodiment, without building ideal filters based on optical characteristics of respective optical systems, by adjusting a gain to be used in each filtering process according to an individual optical characteristic of an optical system by applying the plurality of times of filtering processes, image filtering processes suitable for optical characteristics of respective optical systems to be used in acquisition of original image data are realized.

The optical characteristics of the respective optical systems are not limited to only different optical characteristics between the respective optical systems due to manufacturing errors or the like, and for example, may be optical characteristics which are originally different from each other according to the types of optical systems. That is, an individual optical characteristic of an optical system is not limited to an optical characteristic that varies according to an individual optical system due to a manufacturing error or the like, as described above. The invention may also be applied to original image data acquired using an optical system having a different optical characteristic for each type, and may also include a different optical characteristic for each optical type as an individual optical characteristic of an optical system.

Figure 6:
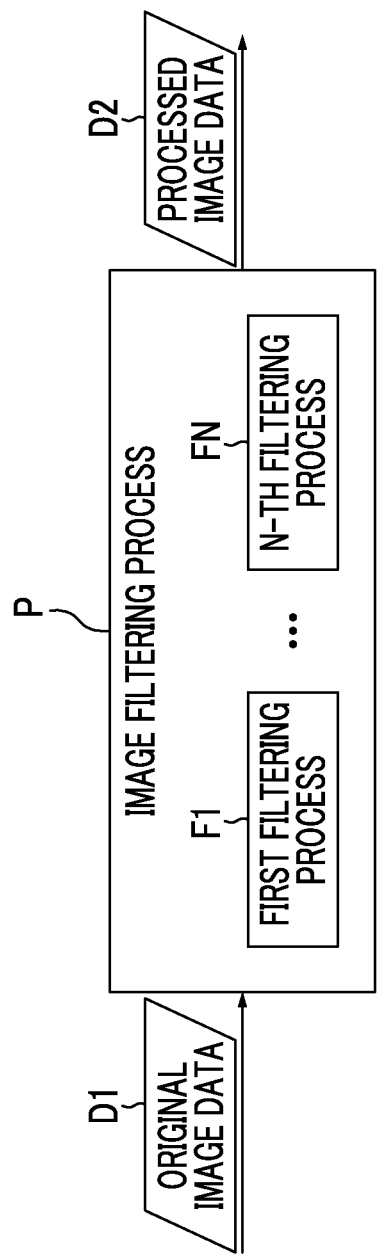
FIG. 6 is a conceptual diagram of an image filtering process.

FIG. 6 is a conceptual diagram of an image filtering process P. The image filtering process P of this example includes a plurality of times of filtering processes (a first filtering process F1 to an N-th filtering process FN (here, "N" is an integer which is equal to or greater than 2)). The processed image data D2 is generated from the original image data D1 using the "image filtering process P including the plurality of times of filtering processes".

Figure 7:
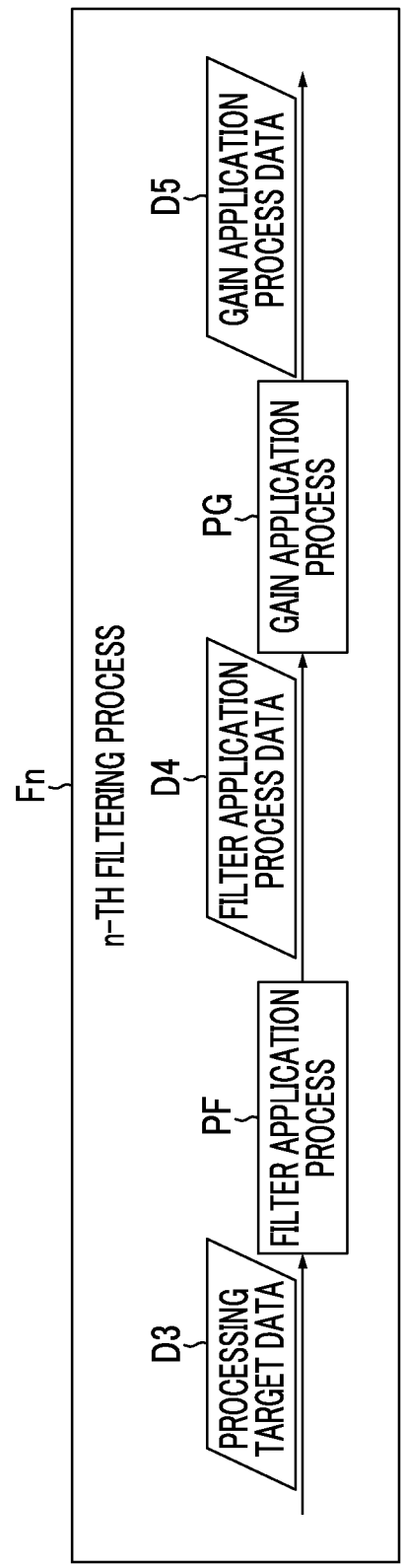
FIG. 7 is a conceptual diagram of an n-th filtering process (here, "n" is an integer which is equal to or greater than 1 and is equal to or smaller than N).

FIG. 7 is a conceptual diagram of an n-th filtering process Fn (here, "n" is an integer which is equal to or greater than 1 and is equal to or smaller than N). Each filtering process (the n-th filtering process Fn) of the image filtering process P includes a filter application processed PF and a gain application process PG. The filter application process PF is a process of applying a filter to processing target data D3 to acquire filter application process data D4, and the gain application process PG is a process of applying a gain to the filter application process data D4 to acquire gain application process data D5.

In each of the plurality of times of filtering processes (the first filtering process F1 to the N-th filtering process FN) included in the image filtering process P performed by the filtering process unit 41, a filter applied to the processing target data D3 in the filter application process PF is not particularly limited.

For example, the filtering process unit 41 may acquire the filter application process data D4 using a filter determined according to estimated characteristics (optical characteristics) of the optical system (the lens 14, the diaphragm 15, and the like) in at least one filtering process among the plurality of times of filtering processes (the first filtering process F1 to the n-th filtering process FN).

As the "filter determined according to the estimated optical characteristics of the optical system", a filter determined based on a point spread function of an optical system (the lens 14, the diaphragm 15, and the like) may be preferably used, for example. For example, variation of optical characteristics between optical systems based on manufacturing errors or the like may be estimated in advance, a filter which is effective for covering the estimated variation of the optical characteristics may be obtained in advance, and the obtained filter may be used in a plurality of times of filtering processes in the filtering process unit 41. A method for estimating variation of optical characteristics between optical systems is not particularly limited. For example, variation of optical characteristics between optical systems based on manufacturing errors may be experimentally obtained, or may be obtained using a modeled function. Further, an example of a filter design method will be described later, but a filter may be designed using an inverse filter design method using an arbitrary design standard of a Wiener filter or the like.

In addition, the filtering process unit 41 may use a plurality of filters, based on the point spread function of an optical system (the lens 14, the diaphragm 15, and the like), which is a plurality of filters obtained by changing factors that determines characteristics of the point spread function, in the plurality of times of filtering processes (the first filtering process F1 to the N-th filtering process FN). The factors that determines the characteristics of the point spread function may include imaging conditions such as a diaphragm value (F-number), a zoom value (focal length), a subject distance, a focal position, an optical system type, a sensor SN ratio of the imaging element 24, an image height (an in-image position), or an individual optical system difference. Filters derived based on a point spread function in which characteristic data of one or a plurality of factors among the above-mentioned factors is different from each other may be used in each filter application process PF.

The "filter determined according to the characteristics of the optical system" is not limited to the filter based on the point spread function, and a contour emphasis filter or another filter may be used as the "filter determined according to the characteristics of the optical system". Even in the case of the filter (contour emphasis filter or the like) other than the filter based on the point spread function, the filter (contour emphasis filter or the like) may be adjusted according to various conditions (for example, the above-described various factors such as a diaphragm value (F-number)), and a filter such as a contour emphasis filter having a filter coefficient (tap coefficient) adjusted based on optical characteristics that changes according to the various conditions (for example, the above-described various factors such as a diaphragm value (F-number)) may be used in each filter application process PF.

Further, the filtering process unit 41 may acquire the filter application process data D4 using a filter determined irrespective of the characteristics of the optical system (the lens 14, the diaphragm 15, and the like) used when the original image data D1 is acquired by imaging, in at least any one filtering process among the plurality of times of filtering processes (the first filtering process F1 to the N-th filtering process FN). As the "filter determined irrespective of the characteristics of the optical system", a contour emphasis filter may be suitably used, for example.

In addition, the filter used in the filter application process PF may be changed based on a pixel position of the processing target data D3. The filtering process unit 41 may acquire the filter application process data D4 using a filter having a frequency characteristic according to the pixel position in the processing target data D3, in at least one filtering process among the plurality of times of filtering processes (the first filtering process F1 to the N-th filtering process FN). Further, without depending on the pixel position of the processing target data D3, the same filter may be applied to the processing target data D3. The filtering process unit 41 may acquire the filter application process data D4 using a filter having a frequency characteristic irrespective of the pixel position in the processing target data D3, in at least any one filtering process among the plurality of times of filtering processes.

On the other hand, a gain applied to the filter application process data D4 in the gain application process PG in each of the plurality of times of filtering processes (the first filtering process F1 to the N-th filtering process FN) in the image filtering process P is acquired based on the "target frequency characteristic of the image filtering process P" specified based on the individual optical characteristic of the optical system used when the original image data D1 is acquired. For example, it is possible to show the target frequency characteristic of the image filtering process P according to the frequency characteristic based on the point spread function (optical transfer function) of the optical system (the lens 14, the diaphragm 15, and the like) used when the original image data D1 is acquired through imaging, and to use an inverse filter design method using an arbitrary design standard of a Wiener filter or the like. Details about the gain acquisition method will be described later.

The target frequency characteristic of the image filtering process P is not limited to the frequency characteristic based on the point spread function (optical transfer function) of the optical system (the lens 14, the diaphragm 15, and the like), and various frequency characteristics derived based on the imaging conditions (the above-described various factors of the diaphragm value (F-number) or the like) of the optical system (the lens 14, the diaphragm 15, and the like) may be used as the "target frequency characteristic of the image filtering process P". Accordingly, for example, a "frequency characteristic having different peaks according to the diaphragm value (F-number)" may be set as the "target frequency characteristic of the image filtering process P".

Next, a circuit configuration example in which the image filtering process P (the plurality of times of filtering processes) is performed will be described.

It is preferable that the number N of filtering processes (the first filtering process F1 to the N-th filtering process FN) that form the image filtering process P is smaller than the number M of filters in a case where the filters are designed according to factors in the method according to the related art. The number N of filtering processes that form the image filtering process P is set so that N is preferably equal to or lower than 50% of M, more preferably, is equal to or lower than 30% of M, and still more preferably, is equal to or lower than 10% of M. Here, an upper limit of the number N of filtering processes that form the image filtering process P is the number of taps (maximum tap number) of a filter having the maximum tap number among filters used in the plurality of times of filtering processes. This is because the types of filters do not increase to exceed the number of taps of the filter.

The number N of filtering processes that form the image filtering process P is preferably equal to or smaller than 10, more preferably, is equal to or smaller than 6, and still more preferably, is equal to or smaller than 4, but a specific numerical value example of the number N of filtering processes is not limited thereto. Further, the number of taps of a plurality of filters used in the plurality of times of filtering processes (filtering process unit 41) that form the image filtering process P may be the same between filters, or may be different from each other.

In the following description relating to FIGS. 8 to 11, for ease of description, a case where plurality of times of filtering processes performed by the filtering process unit 41 are configured by the first filtering process F1 and the second filtering process F2 assuming that "N=2" will be described. Here, in a case where "N" is an integer which is equal to or greater than 3 and three or more times of filtering processes are performed by the filtering process unit 41, it is similarly possible to realize the filtering process unit 41 using the same design method.

Figure 8:
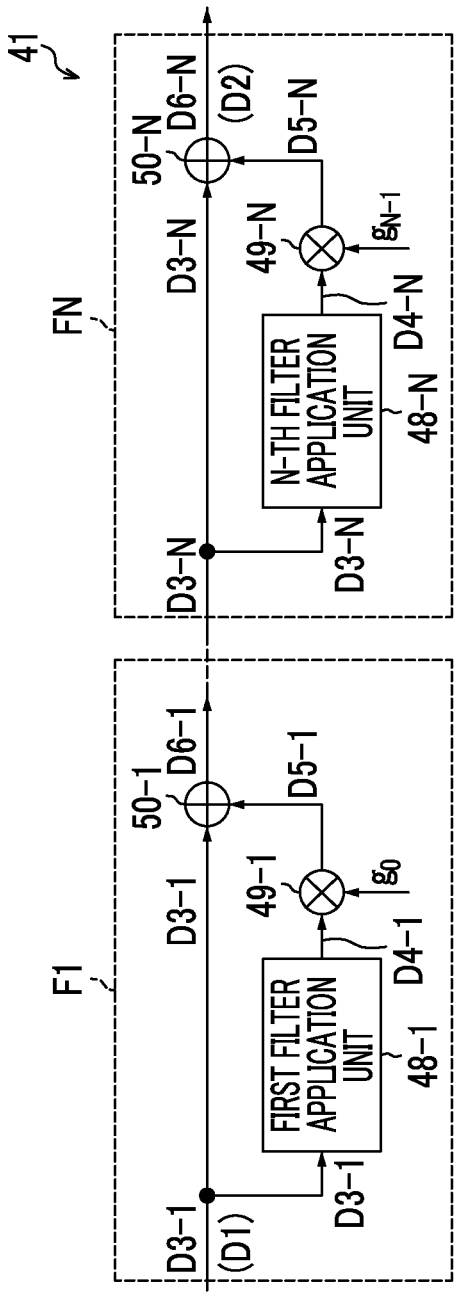
FIG. 8 is a diagram showing an example of a circuit configuration of a filtering process unit.

FIG. 8 is a diagram showing an example of a circuit configuration of the filtering process unit 41. FIG. 8 shows an example of a case where circuits that respectively perform the first filtering process F1 to the N-th filtering process FN (here, in this example, "N=2") are connected in series.

The filtering process unit 41 in this example uses filtering process data D6-1 acquired in the first filtering process F1 as processing target data D3-2 in the second filtering process F2. That is, the filtering process unit 41 includes a first filter application unit 48-1, a first gain application unit 49-1, and a first process data calculation unit 50-1, and accordingly, the first filtering process F1 is performed. Further, the filtering process unit 41 includes a second filter application unit 48-2, a second gain application unit 49-2, and a second process data calculation unit 50-2, and accordingly, the second filtering process F2 is performed.

The first filter application unit 48-1 applies a filter for the first filtering process to processing target data D3-1 of the first filtering process F1 to acquire filter application process data D4-1. The first gain application unit 49-1 applies a gain $g_0$ for the first filtering process to the filter application process data D4-1 output from the first filter application unit 48-1 to acquire gain application process data D5-1. Similarly, the second filter application unit 48-2 applies a filter for the second filtering process to processing target data D3-2 of the second filtering process F2 to acquire filter application process data D4-2. The second gain application unit 49-2 applies a gain $g_1$ for the second filtering process to the filter application process data D4-2 output from the second filter application unit 48-2 to acquire gain application process data D5-2.

The filter used in each filtering process may be retained by each filter application unit 48 (the first filter application unit 48-1 and the second filter application unit 48-2), or may be stored in a memory (not shown) to be appropriately read by each filter application unit 48. Further, the gain used in each filtering process may be supplied to each gain application unit 49 (the first gain application unit 49-1 and the second gain application unit 49-2) by the gain specifying unit 43 shown in FIG. 3 and the gain acquisition unit 45 shown in FIG. 4 or 5.

Further, the filtering process unit 41 in this example further includes a first process data calculation unit 50-1 and a second process data calculation unit 50-2 that add the processing target data D3 and the gain application process data D5 and output filtering process data D6. That is, the first process data calculation unit 50-1 adds the processing target data D3-1 to the gain application process data D5-1 output from the first gain application unit 49-1 and outputs the result to the filtering process data D6-1. Similarly, the second process data calculation unit 50-2 adds the processing target data D3-2 to the gain application process data D5-2 output from the second gain application unit 49-2 and outputs the result to the filtering process data D6-2.

In this example in which the image filtering process P is configured by the first filtering process F1 and the second filtering process F2, the processing target data D3-1 in the first filtering process F1 corresponds to the original image data D1, and the filtering process data D6-2 in the second filtering process F2 corresponds to the processed image data D2.

Figure 9:
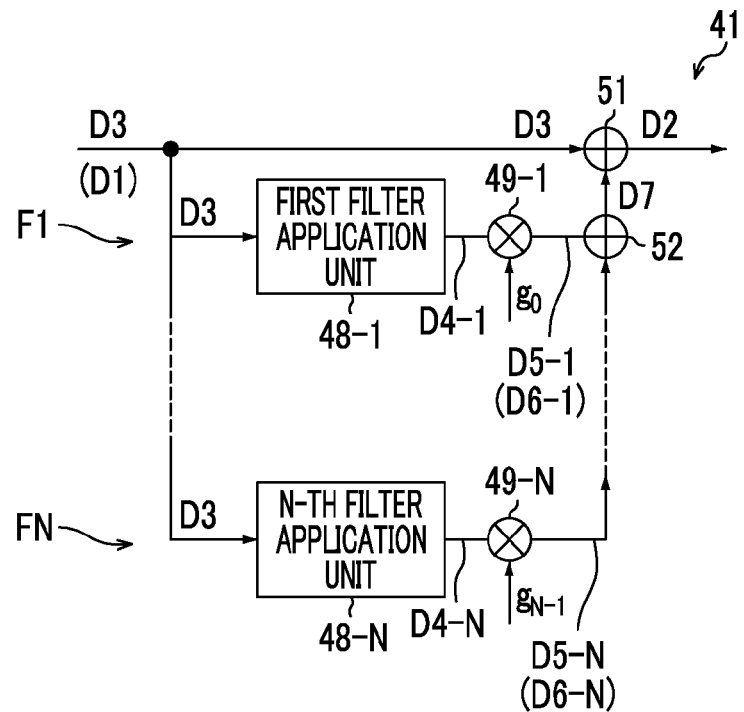
FIG. 9 is a diagram showing another example of the circuit configuration of the filtering process unit.

FIG. 9 is a diagram showing another example of the circuit configuration of the filtering process unit 41. FIG. 9 shows an example of a case where circuits that respectively perform the first filtering process F1 to the N-th filtering process FN (here, in this example, "N=2") are connected in parallel.

In this example, the first filter application unit 48-1 and the first gain application unit 49-1 relating to the first filtering process F1 are connected in series, and the second filter application unit 48-2 and the second gain application unit 49-2 relating to the second filtering process F2 are connected in series. Further, "the first filter application unit 48-1 and the first gain application unit 49-1 relating to the first filtering process F1" and "the second filter application unit 48-2 and the second gain application unit 49-2 relating to the second filtering process F2" are connected in parallel. In addition, the filtering process unit 41 includes an adder unit 52 that adds the gain application process data D5-1 output from the first gain application unit 49-1 and the gain application process data D5-2 output from the second gain application unit 49-2. Furthermore, the filtering process unit 41 includes a processed image data calculation unit 51 that acquires processed image data D2 by adding up addition data D7 obtained by adding up the gain application process data D5 (filtering process data D6) acquired in all the filtering processes (in this example, the first filtering process F1 and the second filtering process F2) and the processing target data D3.

The filtering process unit 41 in this example having the circuit configuration shown in FIG. 9 uses the same data (that is, the original image data D1) as the processing target data D3 in the first filtering process F1 and the second filtering process F2. Further, the filtering process unit 41 acquires the processed image data D2 based on the filtering process data D6-1 acquired in the first filtering process F1 and the filtering process data D6-2 acquired in the second filtering process F2. In this example, the gain application process data D5 output from the gain application unit 49 of each filtering process becomes the filtering process data D6 obtained in each filtering process.

Figure 10:
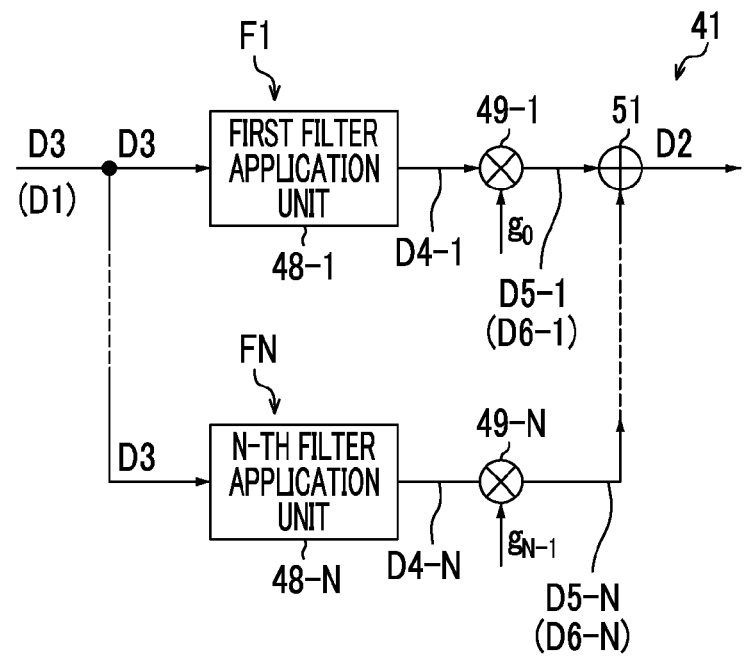
FIG. 10 is a diagram showing another example of the circuit configuration of the filtering process unit.

FIG. 10 is a diagram showing another example of the circuit configuration of the filtering process unit 41. FIG. 10 shows another example in which circuits that perform each of the first filtering process F1 to the N-th filtering process FN (here, in this example, "N=2") are connected in parallel.

Even in this example, similar to the example shown in FIG. 9, the first filter application unit 48-1 and the first gain application unit 49-1 relating to the first filtering process F1 are connected in series, and the second filter application unit 48-2 and the second gain application unit 49-2 relating to the second filtering process F2 are connected in series. Further, "the first filter application unit 48-1 and the first gain application unit 49-1 relating to the first filtering process F1" and "the second filter application unit 48-2 and the second gain application unit 49-2 relating to the second filtering process F2" are connected in parallel. Accordingly, the filtering process unit 41 in this example also uses the same data (that is, the original image data D1) as the processing target data D3 in the first filtering process F1 and the second filtering process F2.

Here, in this example, the gain application process data D5 (the filtering process data D6) acquired in all the filtering processes (in this example, the first filtering process F1 and the second filtering process F2) is added up by the processed image data calculation unit 51 to acquire the processed image data D2. That is, the filtering process unit 41 adds the filtering process data D6-1 acquired in the first filtering process F1 and the filtering process data D6-2 acquired in the second filtering process F2 in the processed image data calculation unit 51 to acquire the processed image data D2. In this example, the gain application process data D5 output from the gain application unit 49 in each filtering process becomes the filtering process data D6 obtained in each filtering process.

Further, it is preferable that the image filtering process P (the first filtering process F1 to the N-th filtering process FN) in this example is set so that a filter response in a case where a frequency ($\omega$) is 0 is set to 1 ($\phi_n(0)=1$) and a brightness relating to an arbitrary gain is uniformly adjusted in order to prevent change in brightness (direct current (DC) component) of a processing target image.

In the above-described examples shown in FIGS. 8 to 10, "the filter application unit 48 and the gain application unit 49" are individually provided with respect to each of the plurality of times of filtering processes, but the plurality of times of filtering processes may be performed by "the filter application unit 48 and the gain application unit 49" which are commonly provided.

Figure 11:
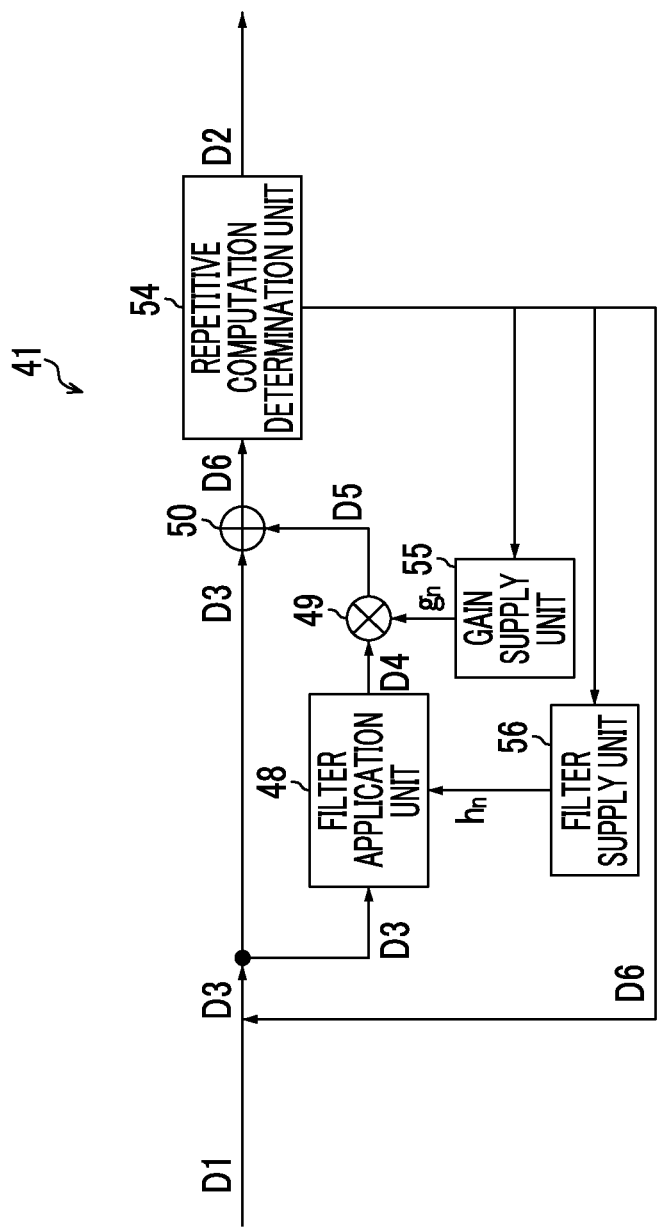
FIG. 11 is a diagram showing another example of the circuit configuration of the filtering process unit.

FIG. 11 is a diagram showing another example of the circuit configuration of the filtering process unit 41. FIG. 11 shows an example of a configuration of a circuit that performs a plurality of times of filtering processes by "the single filter application unit 48 and the single gain application unit 49". The circuit configuration example shown in FIG. 11 shows a function which is equivalent to the circuit configuration of the above-described serial connection type shown in FIG. 8 with respect to the filter application process PF and the gain application process PG, but is different from the circuit configuration shown in FIG. 8 in that the plurality of times of filtering processes are performed by the single "filter application unit 48 and gain application unit 49".

That is, the filtering process unit 41 in this example includes the filter application unit 48 that applies a filter to the processing target data D3 to acquire the filter application process data D4, and the gain application unit 49 that applies a gain to the filter application process data D4 to acquire the gain application process data D5. Further, the filtering process unit 41 includes the process data calculation unit 50 that adds the gain application process data D5 and the processing target data D3 to acquire the filtering process data D6, and a repetitive computation determination unit 54 that determines whether repetition of computation processes in the filter application unit 48, the gain application unit 49, and the process data calculation unit 50 is necessary.

The repetitive computation determination unit 54 determines whether the number of times of filtering processes in the filter application unit 48, the gain application unit 49, and the process data calculation unit 50 reaches a predetermined number N (in this example, "N=2"). In a case where the number of times of filtering processes in the filter application unit 48, the gain application unit 49, and the process data calculation unit 50 does not reach N, the repetitive computation determination unit 54 feeds back the filtering process data D6 output from the process data calculation unit 50. If the filtering process data D6 is fed back, the filter application unit 48, the gain application unit 49, and the process data calculation unit 50 repeat the series of processes using the fed-back filtering process data D6 as new processing target data D3. In a case where the number of times of filtering processes by the filter application unit 48, the gain application unit 49, and the process data calculation unit 50 reaches N, the repetitive computation determination unit 54 outputs the filtering process data D6 which is finally output from the process data calculation unit 50 as the processed image data D2.

In this example, a filter $h_n$ used in the filter application unit 48 is supplied to the filter application unit 48 from a filter supply unit 56, a gain $g_n$ used in the gain application unit 49 is supplied to the gain application unit 49 from a gain supply unit 55. That is, "information about a filter $h_{n-1}$ and a gain $g_{n-1}$ used in an n-th filtering process (here, "$1 \leq n \leq N$") is retained in the filter supply unit 56 and the gain supply unit 55, or is retained in a memory (not shown). The filter supply unit 56 and the gain supply unit 55 receives information indicating that "a filtering process performed in the filter application unit 48, the gain application unit 49, and the process data calculation unit 50 is an n-th filtering process" from the repetitive computation determination unit 54, and supplies the filter $h_{n-1}$ and the gain $g_{n-1}$ to the filter application unit 48 and the gain application unit 49 based on the information from the repetitive computation determination unit 54.

Accordingly, the filter application unit 48 shown in FIG. 11 acquires the filter application process data D4 using a filter $h_0$ for the first filtering process in the first filtering process F1, and acquires the filter application process data D4 using a filter $h_1$ for the second filtering process in the second filtering process F2. Further, the gain application unit 49 acquires the gain application process data D5 using a gain $g_0$ for the first filtering process in the first filtering process F1, and acquires the gain application process data D5 using a gain $g_1$ for the second filtering process in the second filtering process F2.

The gain supply unit 55 that supplies a gain to the gain application unit 49 is configured by the gain specifying unit 43 in a case where the image processing unit 35 includes a system configuration shown in FIG. 3, and is configured by the gain acquisition unit 45 in a case where the image processing unit 35 includes a system configuration shown in FIG. 4 or FIG. 5.

The above-described circuit configurations shown in FIGS. 8 to 11 are only examples, and the filtering process unit 41 that performs the plurality of times of filtering processes may be realized by various circuit configurations, and a specific circuit configuration thereof is not particularly limited.

For example, in FIG. 11, an example of a circuit configuration in which a filtering process (image filtering process P) which is equivalent to the serial connection type shown in FIG. 8 by the single "filter application unit 48 and gain application unit 49" is shown, but similarly, a filtering process (image filtering process P) which is equivalent to the juxtaposition connection type shown in FIG. 9 or 10 may be performed by the circuit configuration having the single "filter application unit 48 and gain application unit 49".

Further, in the circuit configuration of the serial connection type shown in FIG. 8, the first process data calculation unit 50-1 and the second process data calculation unit 50-2 may not be provided. That is, the gain application process data D5-1 output from the first gain application unit 49-1 may be used as the filtering process data D6-1 of the first filtering process F1 and the processing target data D3-2 of the second filtering process F2, and the gain application process data D5-2 output from the second gain application unit 49-2 may be used as the filtering process data D6-2 of the second filtering process F2 and the processed image data D2. Similarly, in the circuit configuration shown in FIG. 11, the process data calculation unit 50 may not be provided, and in this case, the gain application process data D5 output from the gain application unit 49 may be used as the filtering process data D6.

<Gain Determination Method>

Next, a gain determination method used in the gain application unit 49 (a first gain application unit 49-1 to an N-th gain application unit 49-N) will be described.

Figure 12:
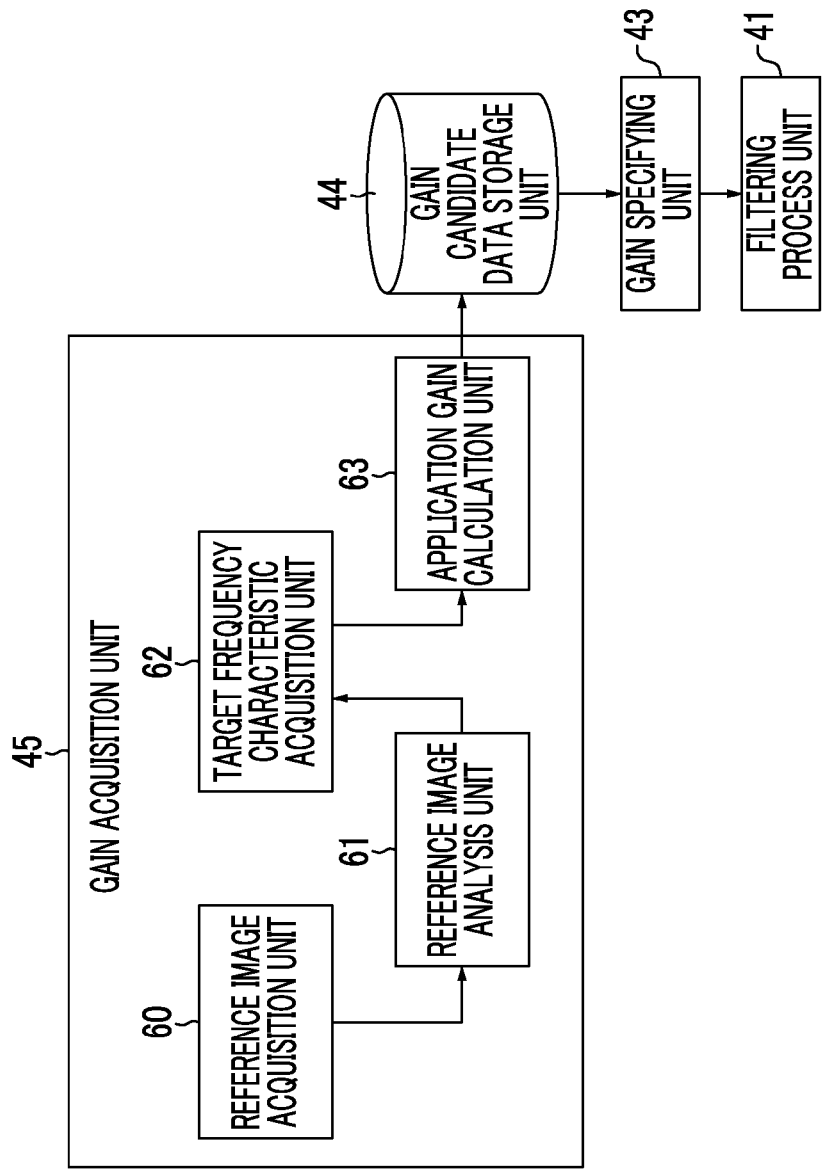
FIG. 12 is a block diagram showing an example of a functional configuration of a gain acquisition unit, and shows a gain acquisition unit which is suitably combined with the image processing unit shown in FIG. 3.

FIG. 12 is a block diagram showing an example of a functional configuration of the gain acquisition unit 45, and shows the gain acquisition unit 45 which is suitably combined with the image processing unit 35 shown in FIG. 3. The gain acquisition unit 45 in this example includes a reference image acquisition unit 60, a reference image analysis unit 61, a target frequency characteristic acquisition unit 62, and an application gain calculation unit 63.

The reference image acquisition unit 60 acquires reference image data in which the individual optical characteristic of the optical system used when the original image data D1 which is a target of the image filtering process P is acquired is reflected. A method for acquiring the reference image data by the reference image acquisition unit 60 is not particularly limited. For example, as described later, a method for performing imaging while guiding a user in a state where the lens unit 11 including the optical system which is a measurement target is mounted in a camera main body 12 to input reference image data to the reference image acquisition unit 60 from the imaging element 24 may be used. Further, in a case where reference image data acquired by performing imaging in advance using the lens unit 11 including the optical system which is a measurement target is stored in a memory (the main body storage unit 29 or the like shown in FIG. 1), the reference image acquisition unit 60 may read the reference image data relating to the optical system which is the measurement target from the memory.

A subject for reference image data is not particularly limited, and the reference image data may be acquired by imaging a subject having a specific shape, pattern, and color, or may be acquired by imaging a subject having an unspecified shape, pattern, and color. In a case where reference image data is acquired by imaging a subject having a specific shape, pattern, and color, it is preferable that the reference image acquisition unit 60 controls a display or the like on the display unit 27 in cooperation with the device controller 34 (display controller 36 or the like) as described later and guides a user to perform induction of imaging of the subject. Further, in a case where reference image data is acquired by imaging a subject having an unspecific shape, pattern, and color, the reference image acquisition unit 60 may analyze previously captured image data stored in the main body storage unit 29, may select data having a preferable image characteristic as reference image data, acquired using the lens unit 11 including the optical system which is the measurement target, from the previously captured image data, and may specify the result as reference image data.

The reference image analysis unit 61 performs analysis of the reference image data acquired by the reference image acquisition unit 60, and acquires the individual optical characteristic of the optical system used when the original image data D1 is acquired. Specifically, the reference image analysis unit 61 may perform frequency analysis of the reference image data, for example, to acquire the point spread function (optical transfer function) as the individual optical characteristic of the optical system which is the measurement target, for example.

The target frequency characteristic acquisition unit 62 specifies a target frequency characteristic, in the image filtering process P, of the original image data D1 which is acquired through imaging using the optical system, based on the individual optical characteristic of the optical system acquired by the reference image analysis unit 61. For example, in a case where the image filtering process P is a point image restoration process for canceling a point spread phenomenon of the optical system, the target frequency characteristic acquisition unit 62 may build a filter by an inverse filter design method using an arbitrary design standard such as a Wiener filter, based on the individual point spread function (optical transfer function) of the optical system acquired by the reference image analysis unit 61, to acquire the target frequency characteristic of the image filtering process P.

The application gain calculation unit 63 acquires a gain (candidate data) to be applied to filter application process data in each of a plurality of times of filtering processes, based on the "target frequency characteristic of the image filtering process P" specified by the target frequency characteristic acquisition unit 62. A gain acquisition method in the application gain calculation unit 63 is not particularly limited, and for example, a method for calculating a gain using a least squares method may be used, for example. That is, the application gain calculation unit 63 may fit the frequency characteristic of the image filtering process P using the least squares method based on the frequency characteristic of each of the plurality of times of filtering processes, with respect to the "target frequency characteristic of the image filtering process P" specified by the target frequency characteristic acquisition unit 62, to acquire a gain to be applied to the filter application process data in each of the plurality of times of filtering processes.

The application gain calculation unit 63 stores the acquired gain in the gain candidate data storage unit 44 as "gain candidate data". It is preferable that the gain candidate data is stored in the gain candidate data storage unit 44 in association with gain selection conditions relating to the target frequency characteristic of the image filtering process P. As the gain selection conditions, characteristic data indicating various factors capable of affecting the target frequency characteristic of the image filtering process P may be suitably used. Accordingly, in a case where the target frequency characteristic of the image filtering process P is "the frequency characteristic based on the point spread function (optical transfer function) of the optical system (lens 14, diaphragm 15, and the like) used when the original image data D1 is acquired by imaging", characteristic data relating to various factors that affect the point spread function (for example, imaging conditions such as a diaphragm value (F-number), a zoom value (focal length), a subject distance, a focal position, an optical system type, a sensor SN ratio of the imaging element 24, an image height (an in-image position), or an individual optical system difference, in imaging for acquiring the original image data D1) may be associated with the gain candidate data as the "gain selection conditions".

In this way, in a case where the gain candidate data is stored in the gain candidate data storage unit 44 in association with the gain selection condition, it is preferable that the reference image acquisition unit 60 acquires a plurality of pieces of reference image data which are acquired through imaging under a plurality of gain selection conditions, and it is preferable that the reference image analysis unit 61 analyzes a plurality of pieces of reference image data which are acquired through imaging under the plurality of gain selection conditions to acquire optical characteristics. Further, it is preferable that the target frequency characteristic acquisition unit 62 acquires the target frequency characteristic of the image filtering process P relating to the plurality of gain selection conditions from optical characteristics under the plurality of gain selection conditions, and it is preferable that the application gain calculation unit 63 acquires gains associated with the plurality of gain selection conditions, and stores the gains associated with the corresponding gain selection conditions in the gain candidate data storage unit 44.

Figure 13:
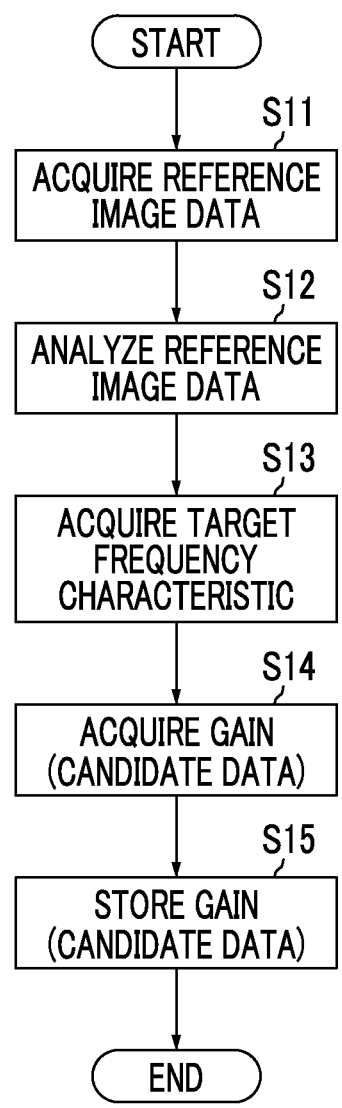
FIG. 13 is a flowchart showing a gain acquisition flow of the gain acquisition unit shown in FIG. 12.

FIG. 13 is a flowchart showing a gain acquisition flow of the gain acquisition unit 45 shown in FIG. 12. In this example, as described above, first, reference image data which is acquired through imaging using the optical system (lens unit 11) which is a measurement target is acquired by the reference image acquisition unit 60 (S11 in FIG. 13), and analysis of the reference image data is performed by the reference image analysis unit 61 to acquire an individual optical characteristic of the optical system which is the measurement target (S12). Further, the target frequency characteristic of the image filtering process P is acquired by the target frequency characteristic acquisition unit 62 from the individual optical characteristic of the optical system which is the measurement target is acquired (S13), and gain candidate data is acquired from the target frequency characteristic by the application gain calculation unit 63 (S14).

The candidate data of the gain acquired in this way is stored in the gain candidate data storage unit 44 by the application gain calculation unit 63 as "gain table information" associated with the individual optical characteristic of the optical system which is the measurement target (S15).

Thus, the gain specifying unit 43 may specify a gain to be applied to the filter application process data in each of the plurality of times of filtering processes from the gain candidate data stored in the gain candidate data storage unit 44, and may transmit the specified gain to the filtering process unit 41.

Figure 14:
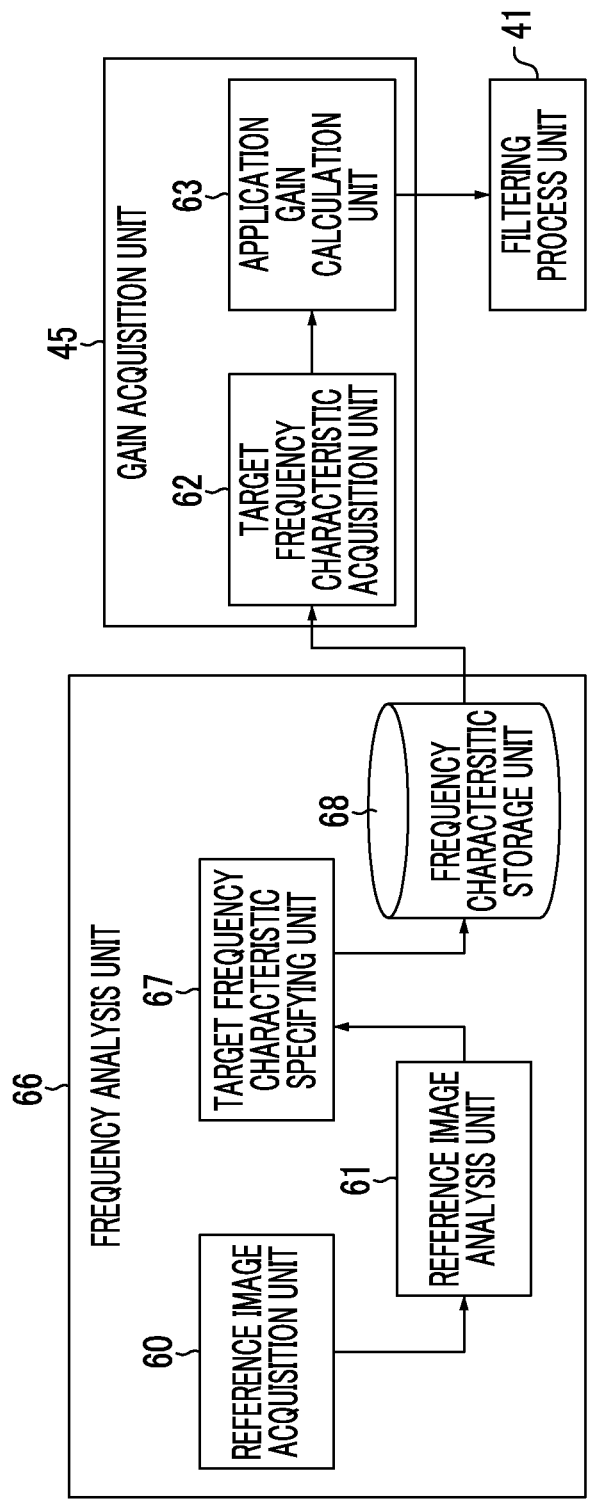
FIG. 14 is a block diagram showing another example of the functional configuration of the gain acquisition unit, and shows a gain acquisition unit which is suitably combined with the image processing unit shown in FIGS. 4 and 5.

FIG. 14 is a block diagram showing another example of the functional configuration of the gain acquisition unit 45, and shows the gain acquisition unit 45 which is suitably combined with the image processing unit 35 shown in FIGS. 4 and 5. The gain acquisition unit 45 in this example includes the target frequency characteristic acquisition unit 62 and the application gain calculation unit 63, in which the target frequency characteristic acquisition unit 62 acquires a target frequency characteristic of the image filtering process P from the frequency characteristic storage unit 68 of the frequency analysis unit 66.

The frequency analysis unit 66 includes the reference image acquisition unit 60, the reference image analysis unit 61, a target frequency characteristic specifying unit 67, and a frequency characteristic storage unit 68. The reference image acquisition unit 60 and the reference image analysis unit 61 in this example acquire reference image data, similar to the above-described reference image acquisition unit 60 and the reference image analysis unit 61 as shown in FIG. 12, and acquires the individual optical characteristic of the optical system used when the original image data D1 is acquired. Further, the target frequency characteristic specifying unit 67 in this example specifies a target frequency characteristic, in the image filtering process P, of the original image data D1 which is acquired through imaging using the optical system, based on the individual optical characteristic of the optical system acquired by the reference image analysis unit 61, similar to the above-described target frequency characteristic acquisition unit 62 shown in FIG. 12.

Here, the target frequency characteristic specifying unit 67 in this example stores data relating to the target frequency characteristic of the specified image filtering process P in the frequency characteristic storage unit 68 in association with data on a corresponding optical system. Here, the "data on the corresponding optical system" may be arbitrary data capable of specifying each optical system which is a measurement target, and for example, may be represented as an ID number allocated to the individual optical system, or the like.

The target frequency characteristic acquisition unit 62 in this example acquires an ID number of an optical system (data on a corresponding optical system) used in imaging of the original image data D1 which is a target of the image filtering process P in the filtering process unit 41, and acquires data relating to a target frequency characteristic of the image filtering process P associated with the optical system used in imaging of the original image data D1 from the frequency characteristic storage unit 68, based on the ID number. The application gain calculation unit 63 acquires the gain to be applied to the filter application process data in each of the plurality of times of filtering processes based on the "target frequency characteristic of the image filtering process P" specified by the target frequency characteristic acquisition unit 62, and supplies the result to the filtering process unit 41.

In this way, the gain acquisition unit 45 in this example reads out the "target frequency characteristic of the image filtering process P" relating to the optical system used in imaging of the original image data D1" from the frequency characteristic storage unit 68 to acquire the gain. Accordingly, it is possible to separate the "process for acquiring the target frequency characteristic of the image filtering process P" in the frequency analysis unit 66 and the "process for acquiring the gain which is actually used in the filtering process unit 41" in the gain acquisition unit 45.

Figure 15:
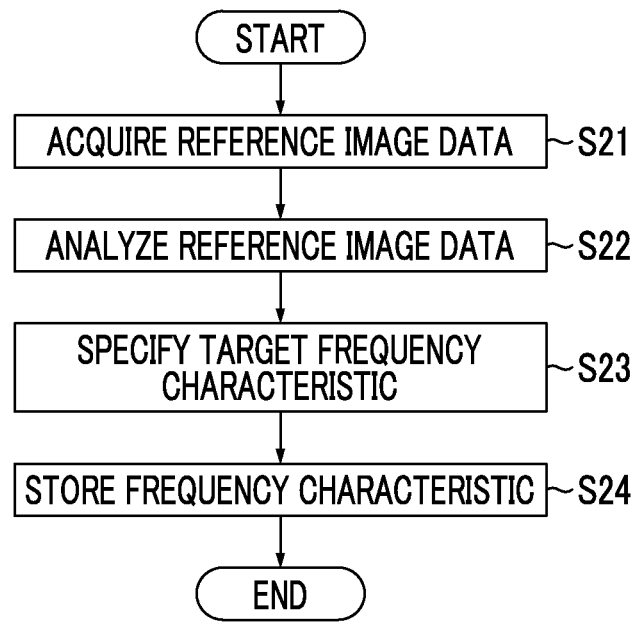
FIG. 15 is a flowchart showing a frequency characteristic acquisition flow of a frequency analysis unit shown in FIG. 14.

FIG. 15 is a flowchart showing a frequency characteristic acquisition flow of the frequency analysis unit 66 shown in FIG. 14. In this example, as described above, first, reference image data which is acquired through imaging using the optical system which is a measurement target is acquired by the reference image acquisition unit 60 (S21 in FIG. 15), and analysis of the reference image data is performed by the reference image analysis unit 61, and an individual optical characteristic of the optical system which is the measurement target is acquired (S22). Further, the target frequency characteristic of the image filtering process P is specified from the individual optical characteristic of the optical system which is the measurement target by the target frequency characteristic specifying unit 67 (S23), and is stored in the frequency characteristic storage unit 68 (S24).

Figure 16:
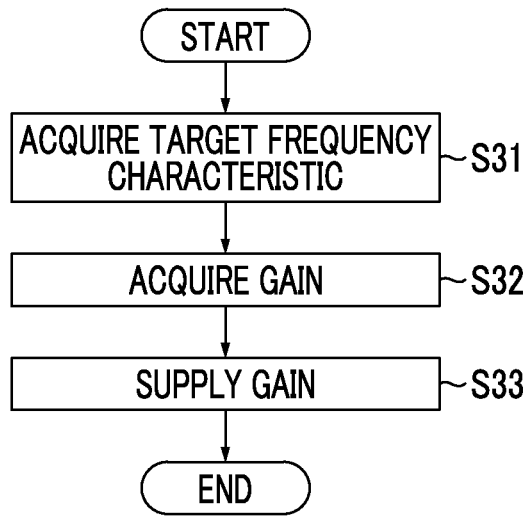
FIG. 16 is a flowchart showing a gain acquisition flow of the gain acquisition unit shown in FIG. 14.

FIG. 16 is a flowchart showing a gain acquisition flow of the gain acquisition unit 45 shown in FIG. 14. In this example, as described above, first, data relating to a target frequency characteristic of the image filtering process P associated with an optical system used in imaging of the original image data D1 which is a target of the image filtering process P in the filtering process unit 41 is acquired from the frequency characteristic storage unit 68 by the target frequency characteristic acquisition unit 62 (S31 in FIG. 16). Further, a gain to be used in the filtering process is acquired from the target frequency characteristic by the application gain calculation unit 63 (S32), and is supplied to the filtering process unit 41 (S33).

<Gain Coefficient (Gain Value Vector) Calculation Method>

Hereinafter, a specific flow of a computation process in the above-described gain acquisition unit 45 (particularly, the application gain calculation unit 63) will be described. An example, a case in which the filtering process unit 41 has the circuit configuration shown in FIG. 10 will be mainly described, but in a case where the filtering process unit 41 has another circuit configuration (see FIGS. 8, 9, and 11), it is similarly possible to calculate a gain by the same computation process.

A method described below employs a least squares standard in which weighting is performed based on each of a frequency and an in-image position (pixel position), and calculates a gain so that a frequency characteristic of the entirety of the image filtering process P performed by the filtering process unit 41 is close to a desired target frequency characteristic.

In the circuit configuration shown in FIG. 10, when a frequency characteristic of a filter used in a filter application unit 48-$n$ that performs an n-th filtering process Fn (here, "1≤n≤N") is represented as "$\phi_{n-1}(\omega)$" and a gain used in a gain application unit 49-$n$ is represented as "$g_{n-1}$", the frequency characteristic of the n-th filtering process Fn is represented as "$g_{n-1}\phi_{n-1}(\omega)$". Accordingly, when the frequency characteristic of the entirety of the image filtering process P (first filtering process F1 to N-th filtering process FN) performed by the filtering process unit 41 is represented as "f($\omega$)", "f($\omega$)=$g_0\phi_0(\omega)$ . . . +$g_{N-1}\phi_{N-1}(\omega)$ (here, "N" is an integer which is equal to or greater than 2) is established.

In the circuit configuration shown in FIGS. 8 and 11, when the frequency characteristic of the entirety of the n-th filtering process Fn is represented as "1+$g_{n-1}(\psi_{n-1}(\omega)-1)$", the frequency characteristic $\phi_{n-1}(\omega)$ of the filter used in each filter application unit 48 is represented as "$\phi_{n-1}(\omega)=\psi_{n-1}(\omega)-$ 1", and the frequency characteristic f($\omega$) of the entirety of the image filtering process P is represented as "f($\omega$)=(1+$g_0\phi_0(\omega)$) . . . ×(1+$g_{N-1}\phi_{N-1}(\omega)$). Further, in the circuit configuration shown in FIG. 9, the frequency characteristic f($\omega$) of the entirety of the image filtering process P is represented as "f($\omega$)=1+$g_0\phi_0(\omega)$ . . . +$g_{N-1}\phi_{N-1}(\omega)$).

Accordingly, the following description relating to the circuit configuration shown in FIG. 10 may be applied to the circuit configuration shown in FIG. 9 by applying the frequency characteristic "f($\omega$)=$g_0\phi_0(\omega)$ . . . +$g_{N-1}\phi_{N-1}(\omega)$" of the circuit configuration shown in FIG. 10 to the frequency characteristic "f($\omega$)=1+$g_0\phi_0(\omega)$ . . . +$g_{N-1}\phi_{N-1}(\omega)$. For example, by considering "1+$g_0\phi_0(\omega)$" in the frequency characteristic f($\omega$) of the circuit configuration shown in FIG. 9 as "$g_0\phi_0(\omega)$" in the frequency characteristic f($\omega$) of the circuit configuration shown in FIG. 10, the following description relating to the circuit configuration shown in FIG. 10 may be suitably applied to the circuit configuration shown in FIG. 9. Similarly, the following description relating to the circuit configuration shown in FIG. 10 may be applied to the circuit configuration shown in FIGS. 8 and 11 by applying the frequency characteristic "f($\omega$)=$g_0\phi_0(\omega)$ . . . +$g_{N-1}\phi_{N-1}(\omega)$" of the circuit configuration shown in FIG. 10 to "f($\omega$)=(1+$g_0\phi_0(\omega)$) . . . ×(1+$g_{N-1}\phi_{N-1}(\omega)$)". In this case, a product computing expression of the frequency characteristic f($\omega$) of the circuit configuration shown in FIGS. 8 and 11 is converted into a sum computing expression using logarithmic processing, and the following description relating to the circuit configuration of FIG. 10 is easily applied to the circuit configuration shown in FIGS. 8 and 11.

Here, it is assumed that the filter used in the filter application unit 48-$n$ of the n-th filtering process Fn is a filter for image restoration based on the point spread function of the optical system (the lens 14, the diaphragm 15, and the like) used when the original image data D1 is acquired through imaging. As described later, since the filter for image restoration based on the point spread function has a two-dimensional degree of freedom with respect to the frequency $\omega$ and has a two-dimensional degree of freedom with respect to an in-image position (pixel position) r, a frequency characteristic having total "four degrees of freedom" is obtained.

$$\omega \in R^2$$

$$r \in R^2$$

$R^2$: two-dimensional real number column vector space

If the frequency vector $\omega$ and the in-image position vector r are used, the frequency characteristic of the filter used in the filter application unit 48-$n$ of the n-th filtering process Fn may be represented as "$\phi_{n-1}(\omega, r)$". By performing discretization of the frequency characteristic $\phi_n(\omega, r)$ of the filter with respect to $N_\omega$ sampling points relating to the frequency and $N_r$ sampling points relating to the in-image position, the following vector $\phi_n$ is obtained.

$$\phi_n \in C^{N_\omega N_r}$$

$$\phi_n = \sum_{k=1}^{N_r} e'_k \otimes \left( \sum_{j=1}^{N_\omega} e_j \otimes \phi_n(\omega_j, r_k) \right)$$

$C^N$: N-dimensional complex column vector space
$\otimes$ : Kronecker product
$e_j$: standard base of $N_\omega$-dimensional column vector
$e'_k$: standard base of $N_r$-dimensional column vector The frequency "$\omega_j$" and the in-image position "$r_k$" may be represented as the following expressions, in which "$\omega_j$" represents $N_\omega$ sampling points relating to the frequency, and "$r_k$" represents $N_r$ sampling points relating to the in-image position.

$$\{\omega_j\}_{j=1}^{N_\omega}$$

$$\{r_k\}_{k=1}^{N_r}$$

The gain vector (gain group) g configured by gains used in the plurality of times of filtering processes (the first filtering process F1 to the N-th filtering process FN) is represented as the following expression.

$$g=[g_0 g_1 \cdots g_{N-1}]^T$$

T: transpose

The frequency characteristic "$f(\omega, r|g)$" of the entirety (entirety of the filtering process unit 41) of the image filtering process P in which the gains represented as the above expression are set is represented as the following expression in the circuit configuration shown in FIG. 10.

$$f(\omega, r|g) = \sum_{i=0}^{N-1} g_i \phi_i(\omega, r)$$

On the other hand, a "target frequency characteristic "$d(\omega, r)$" of the image filtering process P" to be realized may be determined by an arbitrary method, and the determination method is not particularly limited. Generally, a restoration filter based on a point spread function may be suitably realized by a convolution-type filter. As a method for determining a frequency characteristic of the filter based on the point spread function, various methods may be used, and for example, a Wiener filter is widely used in consideration of an SN ratio of an imaging optical system. In the Wiener filter, a frequency characteristic of the filter may be represented based on an optical transfer function (OTF) of the point spread function and information about the SN ratio, like the following expression. Accordingly, the target frequency characteristic "$d(\omega, r)$" of the image filtering process P to be realized may be determined based on the Wiener filter.

$$d(\omega, r) = \frac{H^*(\omega, r)}{\|H(\omega, r)\|^2 + 1/SNR(\omega, r)}$$

$H(\omega, r)$: OTF of optical system
$H^*(\omega, r)$: complex conjugate of OTF of optical system
$SNR(\omega, r)$: SN ratio of imaging system The frequency characteristic of the entirety of the image filtering process P is represented as "$f(w, r|g)$", the target frequency characteristic of the image filtering process P to be realized is represented as "$d(\omega, r)$", and an approximation weight function is represented as "$w(\omega, r)$". In this case, a gain vector that minimizes a generic function "$J_{LMS}[g]$" based on a weighted least squares standard represented as the following expression may be used as a gain vector indicating an optimal frequency characteristic in the image filtering process P.

$$J_{LMS}[g] = \iint w(\omega,r)\|f(\omega,r|g)-d(\omega,r)\|^2 d\omega dr$$

If the above expression is discretized by sampling points of the frequency and the in-image position, the following expression is obtained.

$$J_{LMS}[g] = \|W^{1/2}(Ag-d)\|^2$$

where $$W = \text{diag}[w]$$

$$A = [\phi_0 \phi_1 \cdots \phi_{N-1}]$$

In the above expression, "diag" represents a diagonal matrix in which an argument vector is a diagonal element, "w" and "d" in the above expression are obtained by respectively vectoring "$w(\omega, r)$" and "$d(\omega, r)$, in a similar way to the above-described method relating to "vector $\phi_n$".

An optimal solution $g_{OPT}$ of the gain vector is represented as the following expression, based on the above expression.

$$g_{OPT} = \arg\min_g J'_{LMS}[g] = (A^H W A)^{-1} A^H W d$$

H: Hermitian Transpose

If the approximation weight function and the frequency characteristic (filter coefficient) of each filter are determined, a portion of "$(A^H W A)^{-1} A^H W$" in the above expression is represented as a matrix capable of being calculated in advance. The optimal solution $g_{OPT}$ of the gain vector may be calculated by a computation for applying a matrix to a filter characteristic acquired based on a point spread function indicating an individual image deterioration characteristic.

In a case where the filtering process unit 41 employs the circuit configuration shown in FIG. 10, in order to prevent change in a DC component (brightness) of an image, it is preferable that a constraint condition that an amplification factor (gain) of the DC component is set to 1.0 times is applied, in addition to the above-described condition. Specifically, acquisition of the optimal solution $g_{OPT}$ of the gain vector according to the following expression corresponds to "the setting of the amplification factor of the DC component to 1.0 time in order to prevent change in the brightness of the entire image".

$$\phi_i(0, r) = \phi_i(0) \quad 0 \le i < N, \forall r$$

$$g_{OPT} = \arg\min_g J'_{LMS}[g]$$

$$\text{subject to: } \sum_{i=0}^{N-1} g_i \times \phi_i(0) = 1$$

The above expression may be considered as a quadratic programming (QP) problem, and may be solved by a small amount of calculation when "N" is small. Further, as an example, by setting a limit to an amplification factor of a DC component of each filter as represented as the following expression, it is possible to exclude the limit (constraint condition) to the amplification factor of the DC component.

$$\phi_0(0)=1, \phi_i(0)=0 (1 \le i < N)$$

<Review of Weighting>

In the above-described least squares method, the approximation accuracy of the frequency characteristic is given a weight based on each of the frequency and the in-image position (pixel position) represented as "$w(\omega, r)$". For example, in a case where the approximation of the frequency characteristic based on the least squares method is performed based on the approximation error evaluation function $J_{LMS}[g]$, the approximation error evaluation function $J_{LMS}[g]$ is given a weight based on the frequency and the in-image position (pixel position). By adjusting the weight, it is possible to control image quality. That is, when approximating to the target frequency characteristic of the image filtering process P using the least squares method, by adjusting a weight with respect to a specific frequency or a specific pixel position, it is possible to enhance approximation accuracy relating to the specific frequency or the specific pixel position in the least squares method, and to control image quality.

For example, in the above-described least squares method, a weight in a low-frequency band may be set to be larger than a weight in a high-frequency band. Generally, since a low-frequency component is easily perceived compared with a high-frequency component in view of human visual properties, it is possible to process the low-frequency component with high accuracy by prioritizing the low-frequency component with respect to the high-frequency component as the accuracy of the "approximation to the target frequency characteristic of the image filtering process P".

Here, "the low-frequency band (low-frequency component)" and "the high-frequency band (high-frequency component)" represent relative frequency ranges (frequency bands). For example, a range where a sampling frequency is equal to or smaller than ¼ (=0.25 fs) may be considered as "the low-frequency band (low-frequency component)", and a range where the sampling frequency is larger than 0.25 fs and is equal to or smaller than 0.5 fs may be considered as "the high-frequency band (high-frequency component)".

Further, in the above-described least squares method, a weight in the high-frequency band may be set to be larger than a weight in the low-frequency band according to an imaging condition when the original image data D1 is acquired. Generally, if a high-frequency characteristic of a filter is bad in a case where noise is large, the noise is amplified. Accordingly, in the image filtering process P of the original image data D1 acquired under an imaging condition that it is predicted that noise is large, it may be preferable to prioritize the high-frequency component with respect to the low-frequency component as the accuracy of "the approximation to the target frequency characteristic of the image filtering process P".

Here, "the imaging condition when the original image data D1 is acquired" is not particularly limited. arbitrary factors capable of affecting the amount of noise may be used as imaging conditions, and for example, a diaphragm value (F-number) and an imaging sensitivity of the imaging element 24 may be used as "the imaging condition when the original image data D1 is acquired" capable of affecting the amount of noise.

Further, the above-described weighting in the least squares method may be determined according to pixel positions in the original image data D1. For example, in a case where the original image data D1 is acquired through imaging using a normal digital camera used by a general user, since a main subject is disposed at a central portion of an image in many cases, there is a tendency that high-frequency components of pixel positions at the central portion of the image are is emphasized. On the other hand, in a case where the importance of an image in the vicinity of a boundary of an imaging range is relatively high in a monitoring camera or the like, there is a tendency that high-frequency components of pixel positions in a peripheral portion of an image is emphasized. In this way, there is a case where the importance is changed according to pixel positions in the original image data D1, and in this case, pixel positions with high weights (prioritized pixel positions) may be determined according to the type of an imaging device or a usage (product) of a captured image.

For example, in an optical system provided in the digital camera 10 used by a general user, there is a tendency that a central portion generally has a high resolution and thus has an excellent resolution characteristic regardless of frequencies and resolution performance in a peripheral portion becomes low. Accordingly, in the image filtering process P of the original image data D1 acquired by imaging using the digital camera 10 shown in FIG. 1, by increasing a weight in a high-frequency band at a central portion of an image and increasing a weight in a low-frequency band at a peripheral portion of the image, it is possible to enhance image quality according to optical characteristics. That is, in the above-described least squares method, at pixel positions (pixel positions with a low image height) which are equal to or shorter than a first distance from the center of an image in the original image data D1, weights in a high-frequency band may be set to be larger than those at pixel positions (pixel positions with a high image height) which is longer than the first distance from the center of the image in the original image data D1. Further, in the above-described least squares method, at pixel positions (pixel positions with a high image height) which is longer than a second distance from the center of the image in the original image data D1, weights in a low-frequency band may be set to be larger than those at pixel positions (pixel positions with a low image height) which is equal to or shorter than the second distance from the center of the image in the original image data D1.

Here, it is preferable that "the high-frequency band" is included in a range which is larger than 0.25 fs and is equal to or smaller than 0.5 fs, and it is preferable that "the low-frequency band" is included in a range which is equal to or smaller than 0.25 fs. Further, "the first distance" and "the second distance" may be the same or may be different from each other.

<Review in a Case where Filter Frequency Characteristic does not Include Frequency Attenuation>

In a case where a plurality of times of filtering processes is performed by the filtering process unit 41 having the circuit configuration of the serial connection type shown in FIG. 8, it is preferable that a control method is devised according to whether a filter frequency characteristic applied to the processing target data D3 has frequency attenuation in each filter application unit 48. The frequency attenuation acts effectively particularly in a case where "the level of spread (blurring) of a point image represented by a point spread function of an optical system is large" and "an SN ratio is low", and shows an effect of reducing a noise component in a high-frequency band.

For example, in a case where it is not necessary to give an effect of frequency attenuation to a filter used in each filter application unit 48, a frequency characteristic $\phi_n(\omega)$ of the filter used in each filter application unit 48 of the filtering process unit 41 shown in FIG. 10 may be set based on the following expression.

$$\phi_n(\omega) = \begin{cases} \phi_n(\omega) & (|\phi_n(\omega)| > 1) \\ 1 & \text{otherwise} \end{cases}$$

The above expression means that a filter having the original frequency characteristic $\phi_n(\omega)$ is used in a case where the frequency characteristic $\phi_n(\omega)$ of the filter used in each filter application unit 48 satisfies "$|\phi_n(\omega)|>1$" and a filter in which "frequency characteristic (response) is 1" is used in a case where "$|\phi_n(\omega)| \leq 1$" is satisfied.

In a case where it is not necessary to give the effect of frequency attenuation to the filter used in each filter application unit 48, the frequency characteristic $\phi_n(\omega)$ of the filter used in each filter application unit 48 of the filtering process unit 41 shown in FIGS. 8, 9, and 11 may be set based on the following expression, for example.

$$\phi_n(\omega) = \begin{cases} \phi_n(\omega) & (|\varphi_n|(=|1+\phi_n(\omega)|) > 1) \\ 0 & \text{otherwise} \end{cases}$$

Further, in a case where the circuit configuration that forms the filtering process unit 41 is the serial connection type shown in FIG. 8, a frequency characteristic of the entirety of the image filtering process P is represented based on the product of frequency characteristics of filters used in each filter application unit 48. In order to similarly handle "the frequency characteristic of the entirety of the image filtering process P of the serial connection type" and "the frequency characteristic of the entirety of the image filtering process P of the juxtaposition connection type", it is preferable to convert a matter of "the product" into a matter of "the sum" by performing logarithmic processing with respect to the frequency characteristics of all the filters used in the image filtering process P of the serial connection type. In this case, using the same arithmetic process as the calculation method of the optimal solution $g_{OPT}$ of the gain vector relating to the filtering process unit 41 having the circuit configuration of the juxtaposition connection type, it is possible to calculate the optimal solution $g_{OPT}$ of the gain vector relating to the filtering process unit 41 having the circuit configuration of the serial connection type. In a case where the frequency characteristic of the filter does not include the attenuation characteristic, the frequency characteristic of the filter does not becomes a large negative value by the above-described logarithmic-processing, and logarithmic processing of a complex number may be performed using the following expression.

$$\log z = \log|z| + j(\angle z + 2n\pi)$$

z: complex number ($=x+jy=r_c e^{j\theta}$)
j: imaginary unit
$r_c$: absolute value ($=\sqrt{(x^2+y^2)}$)
$x=r_c \cos\theta$
$y=r_c \sin\theta$
$\theta$: argument ($=\angle z$)

<Review in a Case where Frequency Characteristic of Filter Includes Frequency Attenuation>

For example, in the filtering process unit 41 having the circuit configuration of the serial connection type as shown in FIG. 8, a frequency characteristic of a filter used in each filter application unit 48 includes frequency attenuation, it is preferable to note the following points. That is, in a case where a frequency amplification factor is close to 0, a value after logarithmic processing becomes a large negative value, and thus, in a case where fitting of the frequency characteristic is performed using a least squares standard after the logarithmic processing is performed, for example, there is a concern that the large negative value greatly affects a frequency characteristic approximation standard. Thus, in the logarithmic processing, it is preferable to perform a countermeasure such as clipping using a predetermined negative minimum value or adjustment of reducing a weight in a frequency band where frequency attenuation easily occurs.

For example, in the case of clipping, it is preferable that the filtering process unit 41 uses a filter that makes the filtering process data D6 equal to the filter application process data D4 in each of the plurality of times of filtering processes at a frequency where the ratio of the processed image data D2 to the original image data D1 in a target frequency characteristic of the image filtering process P is smaller than 1.

By determining and adjusting a gain used in each filtering process as described above, for example, it is possible to greatly reduce the number of parameters to be retained, compared with a case where a filter (filter coefficient) is retained based on a point spread function with respect to all combinations of imaging conditions, for example. Further, in a general method, if an image deterioration characteristic such as a point spread function is not known, it is difficult to appropriately perform filter design (filter coefficient design), but according to this embodiment, even before perceiving respective image deterioration characteristics, it is possible to complete design of an FIR filter of a finite tap length for which a large amount of calculation is necessary. In this case, it is possible to calculate an optimal gain vector by a simple calculation after a specific image deterioration characteristic is acquired.

<Acquisition of Reference Image Data>

Hereinafter, an example of a method for prompting a user to capture a reference image by a guide display on the display unit 27 will be described. A "display control of the display unit 27 by the display controller 36" to be described hereinafter is performed under the control of the reference image acquisition unit 60 (see FIGS. 12 and 14).

The display controller 36 (see FIG. 2) controlled by the reference image acquisition unit 60 controls the display unit 27 (see FIG. 1), and causes the display unit 27 to display a guide portion for prompting a user to capture of a reference image. The user mounts the lens unit 11 including an optical system which is a measurement target to the camera main body 12 while being supported by the guide portion displayed on the display unit 27, and performs imaging of the reference image to acquire reference image data.

FIGS. 17A to 17D are diagrams showing an example of imaging guide on the display unit 27. Each of FIGS. 17A to 17D shows a guide portion 70 displayed on the display unit 27 by the display controller 36, and shows a display pattern of the guide portion 70. In the example shown in each of FIGS. 17A to 17D, an auto-focus area 71 is displayed at a central portion of the display unit 27.

In the following description, terms "right", "left", "bottom" and "top" are used, and these terms are used as meanings of "right in the figure", "left in the figure", "bottom in the figure", and "top in the figure".

The guide portion 70 shown in FIGS. 17A to 17D has a linear shape along a tangential direction in a captured image displayed on the display unit 27. Here, the linear shape of the guide portion 70 is not particularly limited as long as it is a linear shape, and for example, the guide portion 70 may be a straight line which is a solid line, a straight line which is a dotted line, or a semitransparent straight line such that a captured image can be seen.

It is preferable that the guide portion 70 is a linear shape along a sagittal direction or a tangential direction in a captured image. Particularly, in a case where a filter is a filter based on an optical transfer function, from a viewpoint of adjusting parameters of the image filtering process P, it is preferable that the guide portion 70 is disposed in the sagittal direction or the tangential direction in the captured image. That is, in a case where a subject is imaged so as to match the guide portion 70 disposed in the sagittal direction or the tangential direction in the captured image, it is possible to obtain useful data from the viewpoint of adjusting the parameters of the filter based on the optical transfer function.

Here, "the guide portion 70 along the sagittal direction or the tangential direction" may deviate from the sagittal direction or the tangential direction in a range without obstructing the effect.

Further, a reference of the sagittal direction and the tangential direction is assumed as a captured image. In principle, it is preferable that the sagittal direction and the tangential direction is defined as a sagittal direction or a tangential direction of an optical image projected onto a light receiving surface of the imaging element 24, but it is not essential that image data is obtained only based on image data received and acquired by the imaging element 24. Accordingly, although the sagittal direction and the tangential direction are considered using a captured image as a reference, there is no problem. Here, the tangential direction refers to a tangential direction with respect to a circumference around the center of a captured image, and the sagittal direction refers to a direction perpendicular to the tangential direction.

In FIG. 17A, the guide portion 70 is disposed in an upper left area on the display unit 27 as a guide display pattern 1. A user captures a reference image and acquires captured image data with reference to the guide portion 70 shown in FIG. 17A. In this case, an image determined based on the guide portion 70 shown in FIG. 17A (for example, see reference numeral "72a" in FIG. 18 which will be described later) becomes a reference image.

In FIG. 17B, two guide portions 70a and 70b are respectively disposed in an upper left area and an upper right area on the display unit 27 as a guide display pattern 2. Further, the two guide portions shown in FIG. 17B are configured by "the first guide portion 70a" and "the second guide portion 70b which is not parallel to the first guide portion 70a". That is, the guide portion 70a (the first guide portion) disposed in the upper left area of the display unit 27 in FIG. 17B and the guide portion (the second guide portion) 70b disposed in the upper left therein are disposed so as not to be parallel to each other.

In FIG. 17C, two guide portions 70a and 70c are respectively disposed in an upper left area and a lower right area on the display unit 27 as a guide display pattern 3. In FIG. 17D, four guide portions 70a, 70b, 70c, and 70d are respectively disposed in an upper left area, an upper right area, a lower right area, and a lower left area on the display unit 27 as a guide display pattern 4.

The guide display patterns in the displays of the guide portions 70 shown in FIGS. 17A to 17D are not limiting, and various types of guide display patterns may be used.

Figure 18:
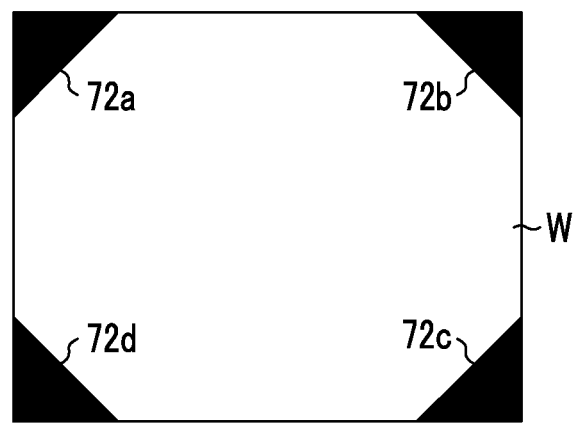
FIG. 18 is a diagram showing an example of a subject suitable for a guide display shown in FIG. 17.

FIG. 18 is a diagram showing an example of a subject W suitable for the guide display shown in FIGS. 17A to 17D. For example, in the guide display pattern 1 shown in FIG. 17A, it is preferable to capture an image in a black portion represented as a reference numeral "72a" in FIG. 18, in the subject W, along the guide portion 70. Further, in the guide display pattern 2 shown in FIG. 17B, it is preferable to capture an image in black portions represented as the reference numeral "72a" and a reference numeral "72b" in FIG. 18, in the subject W, along the guide portion 70. Further, in the guide display pattern 3 shown in FIG. 17C, it is preferable to capture an image in black portions represented as the reference numeral "72a" and a reference numeral "72c" in FIG. 18, in the subject W, along the guide portion 70. Furthermore, in the guide display pattern 2 shown in FIG. 17D, it is preferable to capture an image in black portions represented as the reference numeral "72a", the reference numeral "72b", the reference numeral "72c", and a reference numeral "72d" in FIG. 18, in the subject W, along the guide portion 70.

Figure 19A:
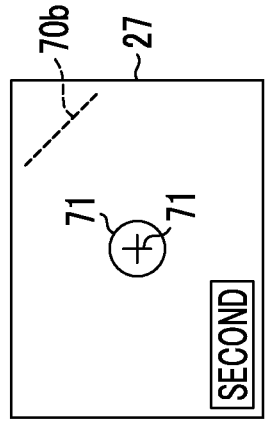
FIGS. 19A to 19D are diagrams showing another example of the imaging guide on the display unit.
Figure 19B:
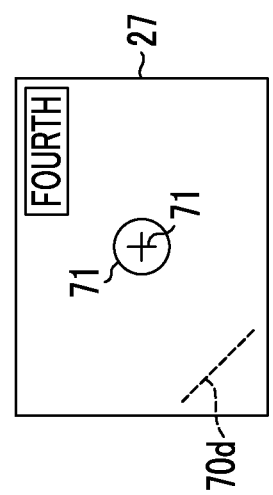
Figure 19C:
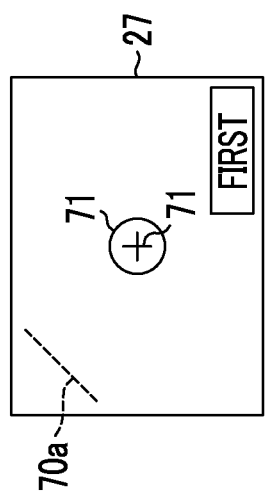
Figure 19D:
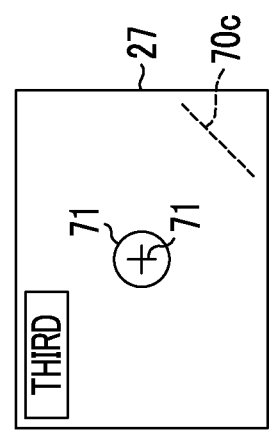

FIGS. 19A to 19D are diagrams showing another example of the imaging guide on the display unit 27. In this example, the imaging guide is performed so that imaging of a subject that satisfies display of the guide portion 70 at each of four corners of the display unit 27, that is, so that the imaging is performed for each display of the guide portion 70 at each of four corners. That is, in this example, first, imaging for a captured image is performed so as to satisfy the guide portion 70a disposed in the upper right area as shown in FIG. 19A. Then, the imaging for the captured image is performed so as to satisfy the guide portion 70b disposed in the upper right area as shown in FIG. 19B. Then, the imaging for the captured image is performed so as to satisfy the guide portion 70c disposed in the lower right area as shown in FIG. 19C. Then, the imaging for the captured image is performed so as to satisfy the guide portion 70d disposed in the lower left area as shown in FIG. 19D. In this way, four pieces of captured image data acquired by the support of the guide portions 70a to 70d as shown in FIGS. 19A to 19D are acquired as a second image.

The number of displayed guide portions 70 is not limited to four as shown in FIG. 19, and an arbitrary number of guide portions 70 having different display positions may be displayed on the display unit 27 to prompt a user to perform imaging. According to this example, it is possible to easily find a subject that satisfies each of the guide portions 70a to 70d, and to acquire a captured image that reliably satisfies the guide portions 70a to 70d.

FIGS. 20A to 20D are diagrams showing another example of the imaging guide on the display unit 27. In this example, an imaging condition display portion 73 is displayed on the display unit 27 together with a guide portion 70. That is, the display controller 36 causes the display unit 27 to display the imaging condition display portion 73 for imaging and acquisition of reference image data to inform a user of a necessary imaging condition. Thus, the user can perform imaging under the necessary imaging condition to acquire the reference image data.

Figure 20A:
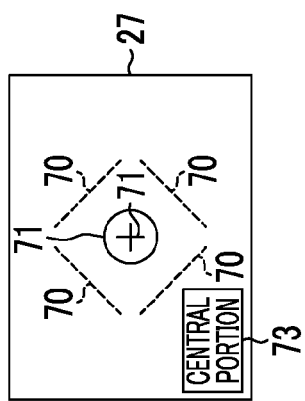
FIGS. 20A to 20D are diagrams showing another example of the imaging guide on the display unit.
Figure 20B:
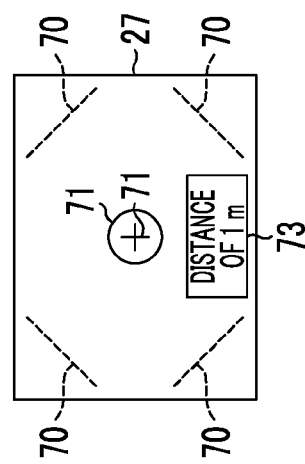

Specifically, in FIGS. 20A and 20B, the imaging condition display portion 73 relating to an image height position is displayed on the display unit 27. That is, in the example shown in FIG. 20A, the acquisition of the reference image data is supported such that the guide portion 70 is satisfied in a portion where the image height position is high (portion around a captured image). On the other hand, in the example shown in FIG. 20B, the acquisition of the reference image data is supported such that the guide portion 70 is satisfied in a portion where the image height position is low (in a central portion of a captured image). In this way, by disposing the guide portion 70 according to an image height of a captured image, it is possible to acquire reference image data according to the image height.

Figure 20C:
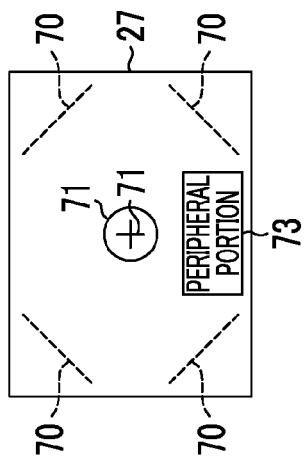
Figure 20D:
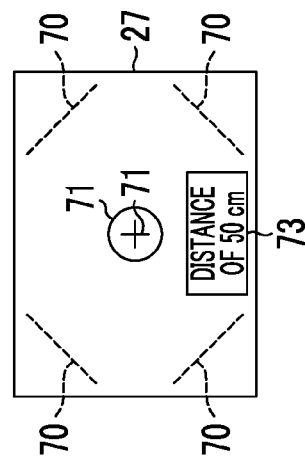

Further, in FIGS. 20C and 20D, a distance to a subject (subject distance) is displayed on the display unit 27 as the imaging condition display portion 73. That is, in the example shown in FIG. 20C, acquisition of reference image data in which an imaging distance to a subject is 50 cm is supported. On the other hand, in the example shown in FIG. 20D, acquisition of reference image data in which an imaging distance to a subject is 1 m is supported. In this way, by displaying the imaging condition display portion 73 indicating an imaging distance to a subject on the display unit 27 together with the guide portion 70, it is possible to acquire reference image data having an imaging distance to a desired subject.

In this way, according to the example shown in FIGS. 20A to 20D, it is possible to image and acquire reference image data under a suitable imaging condition by the imaging condition display portion 73.

Figure 21:
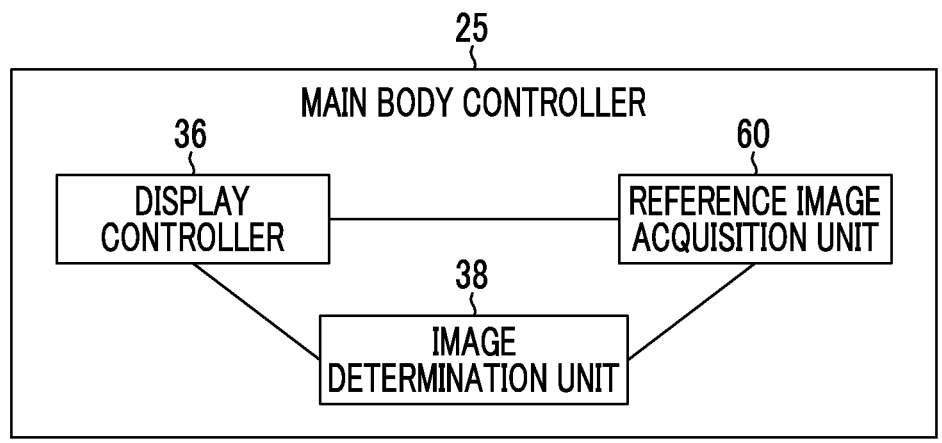
FIG. 21 is a block diagram showing an example of a functional configuration of a display controller, a reference image acquisition unit, and an image determination unit in the main body controller.

FIG. 21 is a block diagram showing an example of a functional configuration of the display controller 36, the reference image acquisition unit 60, and an image determination unit 38 in the main body controller 25.

The main body controller 25 in this example further includes the image determination unit 38, in addition to the display controller 36 and the reference image acquisition unit 60 described above. The image determination unit 38 determines whether captured image data generated by the imaging element 24 through imaging performed by being prompted by the guide portion 70 satisfies a first reference. The reference image acquisition unit 60 acquires the captured image data for which it is determined that the first reference is satisfied in the image determination unit 38 as "reference image data", and transmits the acquired data to the reference image analysis unit 61. Accordingly, the reference image data obtained in this embodiment is the captured image data that satisfies the first reference.

On the other hand, in a case where it is determined in the image determination unit 38 that the captured image data generated by the imaging element 24 through the imaging performed by being prompted by the guide portion 70 does not satisfy the first reference, the display controller 36 causes the display unit 27 to display the guide portion 70 for prompting a user to perform imaging for a reference image, again.

The "first reference" which is a reference for suitability of reference image data is not particularly limited, and for example, a matching degree of the guide portion 70 and a reference image which is actually captured may be set as the "first reference". That is, the image determination unit 38 may determine whether captured image data which is induced and captured by the guide portion 70 is suitable or not as reference image data, based on the matching degree.

Specifically, the matching degree of the guide portion 70 and the captured image data may be determined as an overlapping degree of a field angle of the guide portion 70 and the captured image data. Here, the "matching" does not necessarily means matching in a strict meaning. That is, it is sufficient if the guide portion 70 and the captured image data match each other in a range where usable reference image data can be acquired. Specifically, the guide portion 70 and the reference image of the captured image data may overlap each other over a portion corresponding to 40% or more of the guide portion 70, preferably, may overlap each other over a portion corresponding to 60% or more of the guide portion 70, and more preferably, may overlap each other over a portion corresponding to 80% or more of the guide portion 70.

Figure 22A:
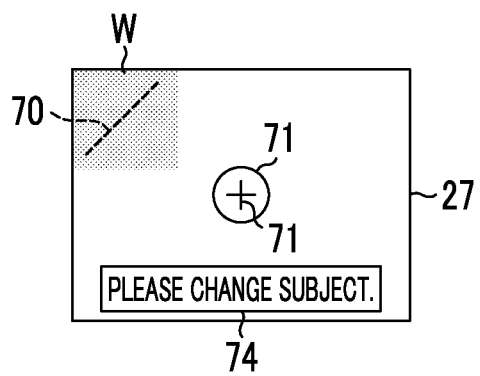
FIGS. 22A and 22B are diagrams showing another example of the imaging guide on the display unit.
Figure 22B:
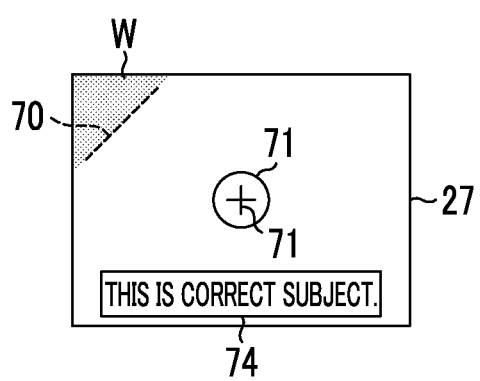

FIGS. 22A and 22B are diagrams showing another example of the imaging guide on the display unit 27. The display controller 36 in this example causes the display unit 27 to display determination information portion 74 indicating whether the data is suitable captured image data that satisfies the first reference based on the matching degree with the guide portion 70 together with the guide portion 70.

Specifically, FIG. 22A shows a case where captured image data acquired by the guide portion 70 through imaging performed by being prompted by the guide portion 70 does not sufficiently match the guide portion 70 and does not satisfy the first reference. In the example shown in FIG. 22A, a subject W does not match the guide portion 70 disposed in an upper left area. Further, a determination information portion 74 indicating "please, change a subject" is displayed on the display unit 27. On the other hand, FIG. 22B shows a case where the captured image data acquired through imaging performed by being prompted by the guide portion 70 sufficiently matches the guide portion 70 and satisfies the first reference. In the example shown in FIG. 22B, the subject W matches the guide portion 70 disposed at the upper left area. Further, a determination information portion 74 indicating "correct subject" is displayed on the display unit 27.

Figure 23:
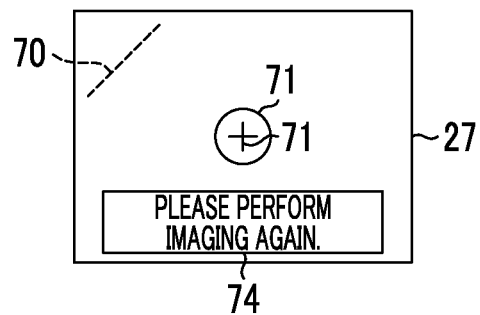
FIG. 23 is a diagram showing another example of the imaging guide on the display unit.

FIG. 23 is a diagram showing another example of the imaging guide on the display unit 27. In this example, in a case where captured image data does not satisfy the first reference, a user is prompted to perform imaging, again. That is, in the example shown in FIGS. 22A and 22B, details of the determination information portion 74 are set to details for prompting imaging of another subject (see FIG. 22A), but details of the determination information portion 74 shown in FIG. 23 are set to information for prompting a user to performing imaging again.

Figure 24A:
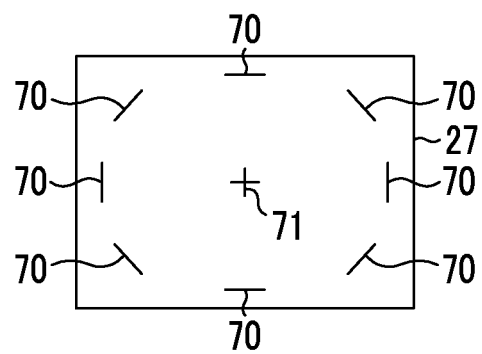
FIGS. 24A and 24B are diagrams showing another example of the imaging guide on the display unit.
Figure 24B:
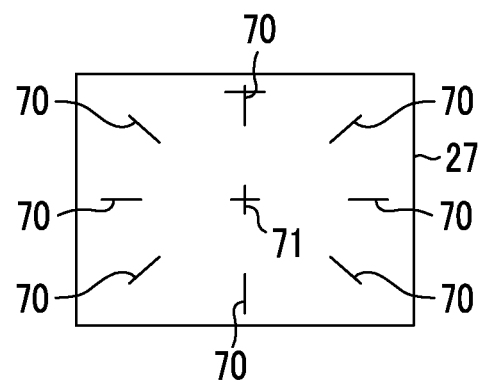

FIGS. 24A and 24B are diagrams showing another example of the imaging guide on the display unit 27. As shown in FIGS. 24A and 24B, the guide portions 70 may be disposed at portions other than four corners of the display unit 27, and a disposition form of the guide portions 70 on the display unit 27 is not particularly limited.

When comparing a guide display pattern shown in FIG. 24A with a guide display pattern shown in FIG. 24B, each guide portion 70 is rotated by 90° between the guide display patterns. That is, the guide portion 70 shown in FIG. 24A has a linear shape along the tangential direction in a captured image, and the guide portion 70 shown in FIG. 24B has a linear shape along the sagittal direction in a captured image. In this way, the guide portion 70 is not disposed only in the tangential direction, but may also be disposed in the sagittal direction.

In this way, a user can appropriately capture and acquire reference image data relating to a reference image according to guidance of the guide portions 70 on the display unit 27.

<Filter Design Method>

Next, a specific example of a filter design method used in each filter application unit 48 of the filtering process unit 41 will be described.

Figure 25:
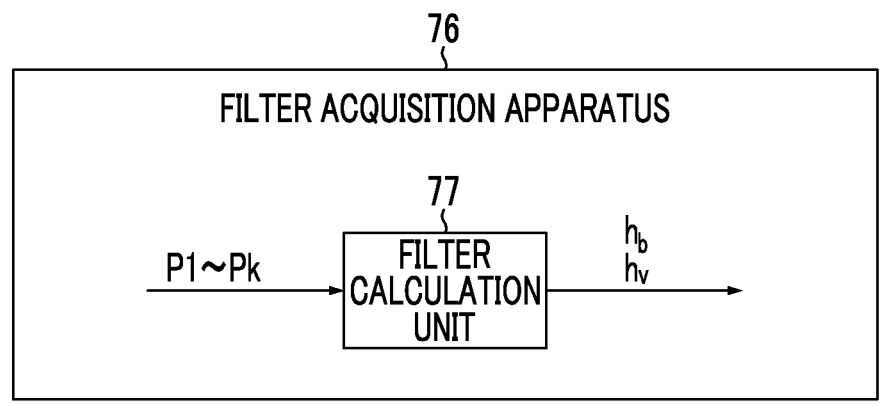
FIG. 25 is a block diagram showing an example of a functional configuration of a filter acquisition apparatus.

FIG. 25 is a block diagram showing an example of a functional configuration of a filter acquisition apparatus 76.

The filter acquisition apparatus 76 that performs design and acquisition of a filter used in each filter application unit 48 includes a filter calculation unit 77. The filter calculation unit 77 in this example acquires frequency characteristic data of a plurality of types of image filtering processes (a first image filtering process P1 to a k-th image filtering process Pk (here, "k" is an integer which is equal to or greater than 2)) specified according to optical characteristics of a plurality of optical systems, and outputs a plurality of filters including a reference filter $h_b$ and a variance filter $h_v$. That is, the filter calculation unit 77 acquires the reference filter $h_b$ determined according to an average of frequency characteristics of the plurality of types of image filtering processes P1 to Pk, based on the frequency characteristics of the plurality of types of image filtering processes P1 to Pk specified according to the optical characteristics of the plurality of optical systems. Further, the filter calculation unit 77 acquires at least one variance filter $h_v$ determined according to a variance of the frequency characteristics of the plurality of types of image filtering processes P1 to Pk, based on the frequency characteristics of the plurality of types of image filtering processes P1 to Pk.

Figure 26:
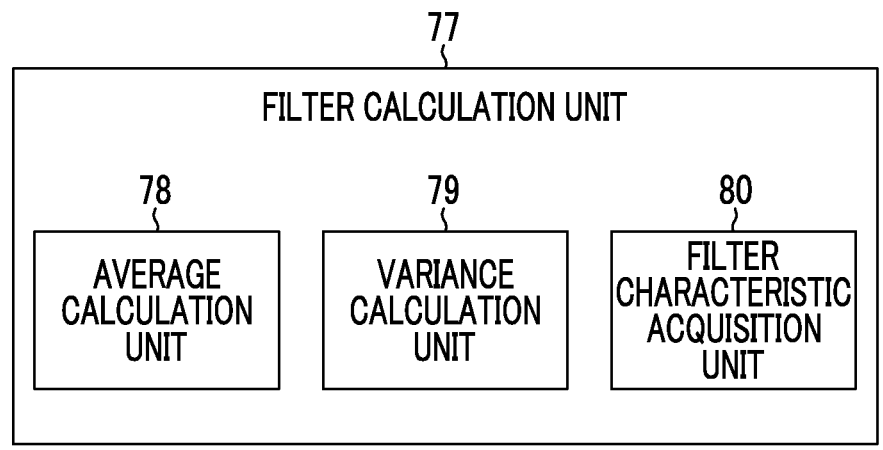
FIG. 26 is a block diagram showing an example of a functional configuration of a filter calculation unit.

FIG. 26 is a block diagram showing an example of a functional configuration of the filter calculation unit 77.

The filter calculation unit 77 in this example includes an average calculation unit 78, a variance calculation unit 79, and a filter characteristic acquisition unit 80. The average calculation unit 78 calculates the average of the frequency characteristics of the plurality of types of image filtering processes P1 to Pk from the frequency characteristics data of the plurality of types of image filtering processes P1 to Pk. The variance calculation unit 79 calculates a variance of frequency characteristics of the plurality of types of image filtering processes P1 to Pk, from the frequency characteristics data of the plurality of types off image filtering processes P1 to Pk. The filter characteristic acquisition unit 80 calculates the reference filter $h_b$ based on the average of the frequency characteristics of the plurality of types of image filtering processes P1 to Pk calculated in the average calculation unit 78. Further, the filter characteristic acquisition unit 80 calculates the variance filter based on the average of the frequency characteristics of the plurality of types of image filtering processes P1 to Pk calculated in the average calculation unit 78 and the variance of the frequency characteristic of the plurality of types of image filtering processes P1 to Pk calculated in the variance calculation unit 79.

The frequency characteristics data of the plurality of types of image filtering processes P1 to Pk used in the filter calculation unit 77 (the average calculation unit 78, the variance calculation unit 79, and the filter characteristic acquisition unit 80) in this example is specified according to the optical characteristics of the plurality of optical systems. In this way, by determining the "frequency characteristic data of the plurality of types of image filtering processes P1 to Pk" which are bases of calculation of the filters (the reference filter $h_b$ and the variance filter $h_v$) with reference to the plurality of optical systems, it is possible to calculate the filters (the reference filter $h_b$ and the variance filter $h_v$) suitable for such a plurality of optical systems. Accordingly, by assuming a plurality of optical systems in which variation in optical characteristics due to manufacturing errors is reflected as such a plurality of optical systems, it is possible to realize the "target frequency characteristic of the image filtering process" with high accuracy by the filtering process unit 41.

<Frequency Characteristic of Plurality of Types of Image Filtering Processes>

Here, a frequency characteristic of each of "the plurality of types of image filtering processes P1 to Pk" forms "the target frequency characteristic of the image filtering process P", and in this example, is determined by a frequency characteristic based on an optical characteristic of an optical system used in imaging.

For example, in a case where "the frequency characteristics of the plurality of types of image filtering processes P1 to Pk" are frequency characteristics based on a point spread function of an optical system, the point spread function may be changed due to the influence of variation in optical characteristic of the optical systems due to manufacturing errors. Thus, it is possible to determine "the frequency characteristics of the plurality of types of image filtering processes P1 to Pk" according to frequency characteristics of a plurality of types of point spread functions estimated based on the variation of the optical characteristic of the optical systems. Further, for example, in a case where "the frequency characteristics of the plurality of types of image filtering processes P1 to Pk" are the frequency characteristics based on the point spread function of the optical systems, since the point spread function is changed as imaging conditions are changed, it is possible to determine "the frequency characteristics of the plurality of types of image filtering processes P1 to Pk" according to frequency characteristics of a plurality of types of point spread functions under different imaging conditions. "The plurality of types of point spread functions" may be acquired by an arbitrary method. For example, the plurality of types of point spread functions may be acquired based on actual measurement values, or may be acquired based on estimation values. "The frequency characteristics of the plurality of types of image filtering processes P1 to Pk" may be calculated based on an arbitrary design standard such as a Wiener filter using the plurality of types of acquired point spread functions.

"The frequency characteristics of the plurality of types of image filtering processes P1 to Pk" may be acquired by an arbitrary device. For example, the frequency characteristics of the plurality of types of image filtering processes P1 to Pk may be acquired by the filter acquisition apparatus 76, may be acquired by another device, or may be read and acquired from a memory (not shown) by the filter calculation unit 77 of the filter acquisition apparatus 76.

<Variation in Frequency Characteristics of Plurality of Types of Image Filtering Processes>

Variation in frequency characteristics of a plurality of types of image filtering processes may be represented based on a unimodal distribution, or may be represented based on a multimodal distribution.

Figure 27:
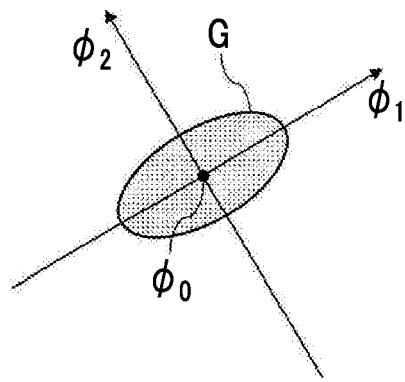
FIG. 27 is a conceptual diagram showing variation in frequency characteristics of a plurality of types of image filtering processes as a unimodal distribution.
Figure 28:
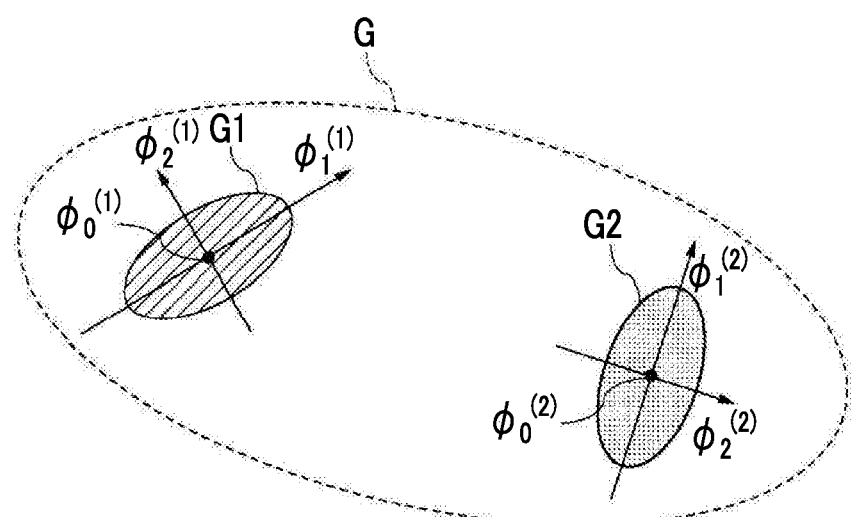
FIG. 28 is a conceptual diagram showing variation in frequency characteristics of a plurality of types of image filtering processes as a multimodal distribution.

FIG. 27 is a conceptual diagram showing variation in frequency characteristics of a plurality of types of image filtering processes as a unimodal distribution. FIG. 28 is a conceptual diagram showing variation in frequency characteristics of a plurality of types of image filtering processes as a multimodal distribution.

A variation representation method based on the unimodal distribution shown in FIG. 27 is a method for representing variation in frequency characteristics of a plurality of types of image filtering processes by one multi-dimensional complex normal distribution (see "variation distribution G" in FIG. 27). On the other hand, a representation method based on the multimodal distribution is a method for representing variation in frequency characteristics of a plurality of types of image filtering processes by a plurality of multi-dimensional complex normal distributions (see "a first variation distribution G1" and "a second variation distribution G2" in FIG. 28).

FIG. 27 shows a case where a variation distribution G of frequency characteristics of a plurality of types of image filtering processes is represented by a frequency characteristic $\phi_0$ of a filter of a first filtering process F1, a frequency characteristic $\phi_1$ of a filter of a second filtering process F2, and a frequency characteristic $\phi_2$ of a filter of a third filtering process F3. Further, FIG. 28 shows a case where a first variation distribution G1 and a second variation distribution G2 that form a variation distribution G of frequency characteristics of a plurality of types of image filtering processes are respectively represented by a frequency characteristic ($\phi_0^{(1)}$, $\phi_0^{(2)}$) of a filter of a first filtering process F1, a frequency characteristic ($\phi_1^{(1)}$, $\phi_1^{(2)}$) of a filter of a second filtering process F2, and a frequency characteristic ($\phi_2^{(1)}$, $\phi_2^{(2)}$) of a filter of a third filtering process F3. FIGS. 27 and 28 show the frequency characteristics $\phi_0$ to $\phi_2$ of the filters under the premise that the filtering process unit 41 has the circuit configuration shown in FIG. 10 as an example.

In a case where variation in frequency characteristics of a plurality of types of image filtering processes has the variation distribution G of an oval shape as shown in FIG. 27, for example, in order to realize the respective image filtering processes by a plurality of filtering processes (the first filtering process F1 to the third filtering process F3 in the example shown in FIG. 27) with high accuracy, it is preferable to determine the frequency characteristics $\phi_0$, $\phi_1$, and $\phi_2$ of the respective filtering processes based on the center, the long axis, and the short axis of the variation distribution G. Similarly, in a case where variation of frequency characteristics of a plurality of types of image filtering processes has the first variation distribution G1 and the second variation distribution G2 which are formed in oval shapes as shown in FIG. 28, for example, in order to represent the image filtering processes included in the first variation distribution G1 and the second variation distribution G2 by a plurality of filtering processes (in the example shown in FIG. 28, the first filtering process F1 to the third filtering process F3) with high accuracy, it is preferable to determine the frequency characteristics $\phi_0^{(1)}$, $\phi_1^{(1)}$, $\phi_2^{(1)}$, $\phi_0^{(2)}$, $\phi_1^{(2)}$, and $\phi_2^{(2)}$ in the respective filtering processes based on the center, the long axis, and the short axis of each of the respective first variation distribution G1 and second variation distribution G2.

<Unimodal Distribution>

Next, an example of a method for designing a filter and a gain in a case where variation of frequency characteristics of a plurality of types of image filtering processes is considered as a unimodal distribution (see FIG. 27) will be described.

The following method relates to a method for obtaining, in a case where a variation sample of frequency characteristics of a plurality of types of image filtering processes of an arbitrary number is actually acquired, frequency characteristics of a desired number of base filters (FIR filters) capable of compensating variation of the frequency characteristics of the image filtering processes with high accuracy. Further, a case where modeling is performed using a unimodal distribution as a multi-dimensional complex normal distribution to perform estimation of a maximum likelihood (ML) will be described.

A variation distribution G of a unimodal distribution can be represented based on a multi-dimensional complex normal distribution, and the multi-dimensional complex normal distribution is characterized by a covariance matrix, and is obtained by the following expression.

$$\Psi_0 = \frac{1}{N_p} \sum_{i=1}^{N_p} \beta_i$$

$$R_0 = \frac{1}{N_p} \sum_{i=1}^{N_p} (\beta_i - \Psi_o)(\beta_i - \Psi_o)^H$$

In the above expression, "$\beta_i$" represents a vector obtained by discretizing a frequency characteristic $\beta(\omega, r)$ which is individually acquired with respect to each of a plurality of types of image filtering processes based on a frequency ($\omega$) and a position (r), and "$N_p$" represents the number of the plurality of types of image filtering processes. Accordingly, "$\psi_0$" in the above expression represents an average (average matrix) of frequency characteristics of the plurality of types of image filtering processes, and "$R_0$" in the above expression represents a variance (covariance matrix) of the frequency characteristics of the plurality of types of image filtering processes.

By performing characteristic value decomposition of the covariance matrix represented as the above expression according to the following expression, it is possible to obtain a characteristic vector $\psi_i$ (here, "i" is an integer which is equal to or greater than 1 and is equal to or smaller than $N_P$).

$$R_0 = \sum_{i=1}^{N_P} \lambda_i \Psi_i \Psi_i^H, (\lambda_1 \geq \lambda_2 \geq \ldots \geq \lambda_{N_p})$$

$$\{\Psi_i\}_{i=1}^{N_P}$$

According to Karhunen-Loeve expansion, in order to averagely approximate a variation distribution by an m-dimensional linear partial space, it is most preferable to use a partial space spread by m corresponding characteristic vectors $\psi_i$ (here, "i" is an integer which is equal or greater than 1 and is equal to or smaller than m) in a descending order of characteristic values.

Accordingly, optimal frequency characteristics $\phi_0$ to $\phi_{N-1}$ of filters for filtering processes for reproducing the respective frequency characteristics of the plurality of types of image filtering processes having the unimodal variation distribution G with high accuracy can be acquired based on the following expression.

$$\phi_0 = \Psi_0$$
$$\phi_1 = \Psi_1$$
$$\vdots$$
$$\phi_{N-1} = \Psi_{N-1}$$

As described above, since the frequency characteristic $\phi_0$ of the filter of the first filtering process F1 corresponds to the center of the distribution of the frequency characteristics of the plurality of types of image filtering processes, it is preferable that a gain in the first filtering process F1 is fixed to "1.0" from a viewpoint of fixing the center of the distribution to stabilize the process. With respect to gains in the other filtering processes, it is possible to calculate optimal values by the above-described weighted least squares standard, for example.

Figure 29:
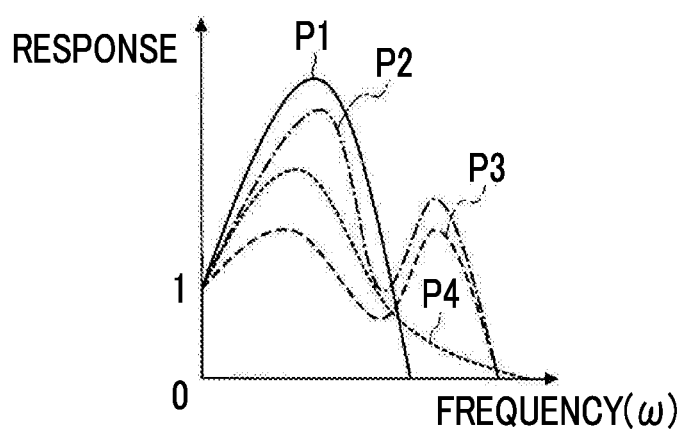
FIG. 29 is a diagram schematically showing an example of frequency characteristics of a plurality of types of image filtering processes capable of being classified as a unimodal distribution, in which a lateral axis represents a frequency and a longitudinal axis represents a response.

FIG. 29 is a diagram schematically showing an example of frequency characteristics of a plurality of types of image filtering processes capable of being classified as a unimodal distribution, in which a lateral axis represents a frequency ($\omega$) and a longitudinal axis represents a response. Here, the response refers to the ratio of frequency component amounts before and after each image filtering process (that is, frequency component amount after process/frequency component amount of data before process), and "response=1" means that data before and after the image filtering process is the same.

FIG. 29 shows frequency characteristics of four types of image filtering processes (a first image filtering process P1, a second image filtering process P2, a third image filtering process P3, and a fourth image filtering process P4). The four types of image filtering processes P1 to P4 have different frequency characteristics, but in any case, a response in a case where a frequency ($\omega$) is "0" shows "1".

Figure 30:
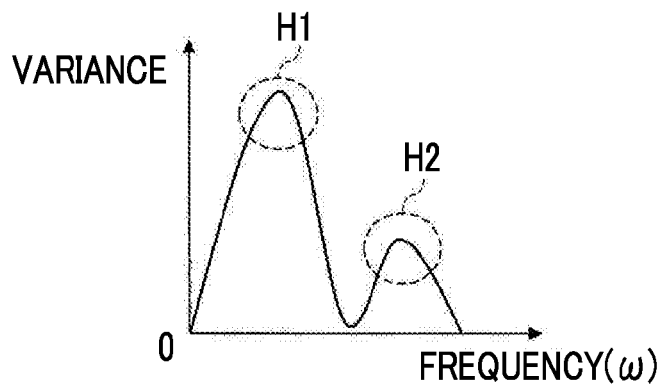
FIG. 30 is a diagram schematically showing an example of a variance of frequency characteristics of the plurality of types of image filtering processes shown in FIG. 29, in which a lateral axis represents a frequency and a longitudinal axis represents a variance.

FIG. 30 is a diagram schematically showing an example of a variance of the frequency characteristics of the plurality of types of image filtering processes shown in FIG. 29, in which a lateral axis represents a frequency ($\omega$) and a longitudinal axis represents a variance. FIG. 30 does not strictly show the variance of the frequency characteristics of the plurality of types of image filtering processes P1 to P4 shown in FIG. 29, for ease of description.

Since the response in a case where the frequency ($\omega$) is "0" shows "1" in any case of the four types of image filtering processes P1 to P4 shown in FIG. 29, the variance in a case where the frequency ($\omega$) is "0" becomes "0". In the example shown in FIG. 30, with respect to the frequency characteristics of the plurality of types of image filtering processes P1 to P4, "a component indicating a largest variation (see reference numeral "H1" in FIG. 30)" and "a component indicating a second largest variation (see reference numeral "H2" in FIG. 30)" are shown.

Figure 31A:
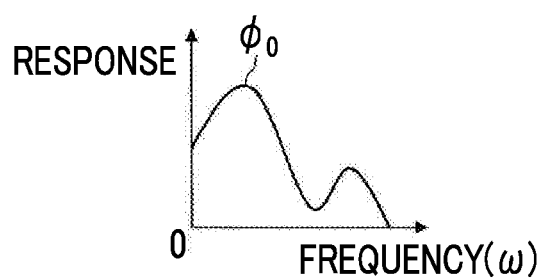
Figure 31B:
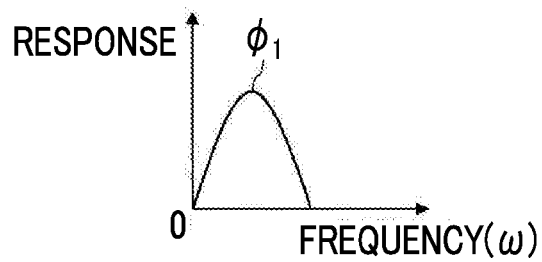
Figure 31C:
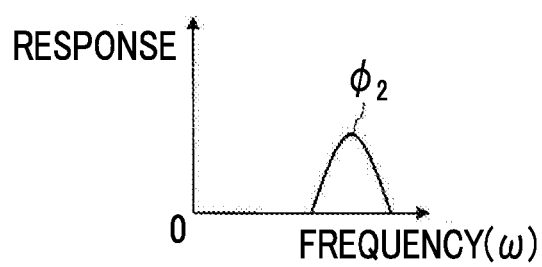

FIGS. 31A to 31C are diagrams schematically showing examples of base filters (characteristic vectors) acquired from an average and a variance of the frequency characteristics of the plurality of types of image filtering processes shown in FIG. 29, in which FIG. 31A shows "$\phi_0$", FIG. 31B shows "$\phi_1$", and FIG. 31C shows "$\phi_2$".

As described above, it is preferable that the frequency characteristic $\phi_0$ of the filter used in the first filtering process F1 is determined based on the center (average) of the distribution of the frequency characteristics of the plurality of types of image filtering processes P1 to P4.

Further, it is preferable that the frequency characteristics of the filters used in the other filtering processes P1 to P4 are determined sequentially from a large component in variation (variance) of the frequency characteristics of the plurality of types of image filtering processes shown in FIG. 30. Accordingly, it is preferable that the frequency characteristic $\phi_1$ of the filter used in the second filtering process F2 is determined based on the largest component (see "H1" in FIG. 30) in the variation of the frequency characteristics of the plurality of types of image filtering processes P1 to P4. Similarly, it is preferable that the frequency characteristic $\phi_2$ of the filter used in the third filtering process F3 is determined based on the second largest component (see "H2" in FIG. 30) in the variation of the frequency characteristics of the plurality of types of image filtering processes.

The above-described example relates to a case where the image filtering process P includes the first filtering process F1 to the third filtering process F3, but the image filtering process P may be configured by two filtering processes, or may be configured by four or more filtering processes. For example, in a case where the image filtering process P is configured by the first filtering process F1 and the second filtering process F2, the frequency characteristic of the filter used in the first filtering process F1 may be determined based on the above-described "$\phi_0$" (see FIG. 31A), and the frequency characteristic of the filter used in the second filtering process F2 may be determined based on the above-described "$\phi_1$" (see FIG. 31B).

FIGS. 32A and 32B show a frequency characteristic f($\omega$) (see FIG. 32A) and a gain example (see FIG. 32B) relating to the image filtering process P (first filtering process F1 to third filtering process F3) performed by the filtering process unit 41 having the circuit configuration shown in FIG. 10.

As described above, it is preferable that a gain $g_0$ in the first filtering process F1 is fixed to "1.0" from a viewpoint of fixing the center of a distribution of frequency characteristics of a plurality of types of image filtering processes stabilize the process. Accordingly, FIG. 32B shows gains $g_0$ to $g_2$ for realizing the respective frequency characteristics of the image filtering processes P1 to P4 shown in FIG. 29 by a frequency characteristic of the entire system shown in FIG. 32A with high accuracy in a case where a filter used in each filter application unit 48 of the filtering process unit 41 having the circuit configuration shown in FIG. 10 is fixed and the gain $g_0$ in the first filtering process F1 is fixed to "1.0", for example.

As shown in FIG. 32B, according to the above-described example, it is possible to compress data on the frequency characteristics of the plurality of types of image filtering processes P1 to P4 into frequency characteristics $\phi_0$ to $\phi_2$ (tap coefficients) of three filters and 12 gains (8 gains in a case where $g_0$ is fixed to "1.0").

In this way, the filtering process unit 41 in this example acquires the filter application process data D4-1 using the frequency characteristic of the reference filter $h_b$ determined according to the average of the frequency characteristics of the plurality of types of image filtering processes P1 to P4 as the "filter frequency characteristic $\phi_0$" in the first filtering process F1, and acquires the filter application process data D4-2 and D4-3 using the frequency characteristics of two variance filters $h_v$ determined according to the variance of the frequency characteristics of the plurality of types of image filtering processes P1 to P4 as the "filter frequency characteristic $\phi_1$" and the "filter frequency characteristic $\phi_2$" in the second filtering process F2 and the third filtering process F3.

Particularly, it is preferable that the filtering process unit 41 acquires the filter application process data D4-1 using "the reference filter $h_b$ determined according to the average of the frequency characteristics of the plurality of types of image filtering processes determined according to the individual optical characteristic of the optical system used when the original image data D1 is acquired" in the first filtering process F1, and that the filtering process unit 41 acquires the filter application process data D4-2 and D4-3 using "the variance filter $h_v$ determined according to the variance of the frequency characteristics of the plurality of types of image filtering processes determined according to the individual optical characteristic of the optical system used when the original image data D1 is acquired" in the second filtering process F2 and the third filtering process F3. In this case, it is preferable that a gain applied to the filter application process data D4 in each of the plurality of times of filtering processes is determined based on the individual optical characteristic of the optical system used when the original image data D1 is acquired.

Figure 33:
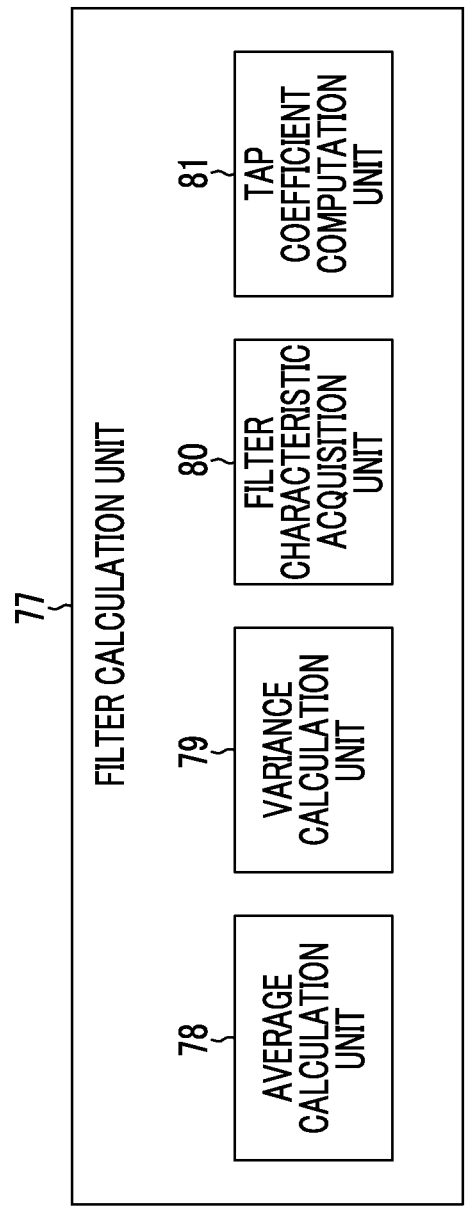
FIG. 33 is a block diagram showing an example of a functional configuration of a filter calculation unit that calculates a filter coefficient based on a unimodal distribution.

FIG. 33 is a block diagram showing an example of a functional configuration of the filter calculation unit 77 that calculates a filter coefficient based on a unimodal distribution. In order to calculate a filter coefficient represented in an actual space from a filter characteristic represented in a frequency space, the filter calculation unit 77 in this example further includes a tap coefficient computation unit 81, in addition to the above-described average calculation unit 78, the variance calculation unit 79, and the filter characteristic acquisition unit 80 (see FIG. 26).

The tap coefficient computation unit 81 of the filter calculation unit 77 has a plurality of taps and acquires the reference filter $h_b$ which has a plurality of taps, to which a coefficient is allocated to each tap, and acquires at least one variance filter $h_v$ which has a plurality of taps, to which a coefficient is allocated to each tap. A "method for allocating the coefficient to each respective tap" is not particularly limited, but the tap coefficient computation unit 81 (filter calculation unit 77) may calculate the coefficient allocated to each tap of each of the reference filter $h_b$ and the at least one variance filter $h_v$, based on a SAGE algorithm or an OMP algorithm (which will be described later), for example.

<Multimodal Distribution>

Next, an example of a method for designing a filter and gain in a case where variation of frequency characteristics of a plurality of types of image filtering processes is considered as a multimodal distribution (see FIG. 28) will be described.

In the example shown in FIG. 28, in a case where the entire distribution is considered as one distribution (unimodal distribution), the variation distribution of the frequency characteristics of the plurality of types of image filtering processes can be represented by the "variation distribution G" shown in FIG. 28, but approximation accuracy becomes low. On the other hand, by separating the variation distribution of the frequency characteristics of the plurality of types of image filtering processes into "the first variation distribution G1" and "the second variation distribution G2" in FIG. 28 and considering "the first variation distribution G1" and "the second variation distribution G2" as individual multi-dimensional complex normal distributions (multimodal distribution), it is possible to enhance the approximation accuracy. As a parameter estimation algorithm of ML estimation in the multimodal distribution, for example, estimation of a mixed normal distribution based on an expectation maximization (EM) algorithm may be suitably used, to thereby perform efficient parameter estimation.

The filter determination method based on the multimodal distribution may be basically performed by the same method as the filter determination method based on the above-described unimodal distribution. That is, it is possible to classify frequency characteristics of a plurality of types of image filtering processes into a plurality of distributions that forms the multimodal distribution (the first variation distribution G1 and the second variation distribution G2 in the example shown in FIG. 28), to obtain a filter in the same procedure as that of "the variation distribution G" of the above-described unimodal distribution with respect to each distribution.

Figure 34:
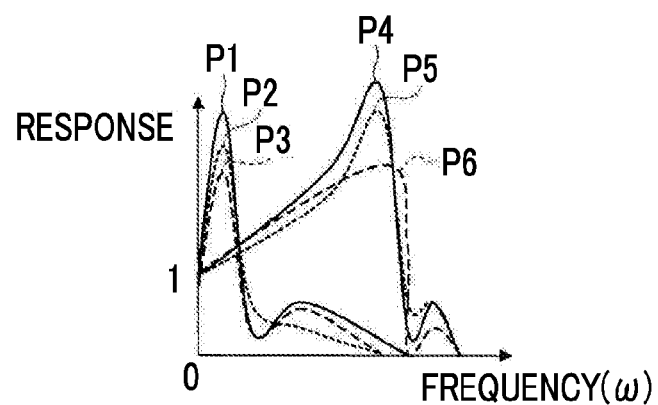
FIG. 34 is a diagram schematically showing an example of frequency characteristic of image filtering processes capable of being classified as a multimodal distribution, in which a lateral axis represents a frequency and a longitudinal axis represents a response.

FIG. 34 is a diagram schematically showing an example of frequency characteristics of image filtering processes capable of being classified as a multimodal distribution, in which a lateral axis represents a frequency ($\omega$) and a longitudinal axis represents a response.

FIG. 34 shows frequency characteristics of six types of image filtering processes (a first image filtering process P1, a second image filtering process P2, a third image filtering process P3, a fourth image filtering process P4, a fifth image filtering process P5, and a sixth image filtering process P6). The six types of image filtering processes P1 to P6 show different frequency characteristics, but in any case, a response in a case where the frequency ($\omega$) is "0" shows "1".

In the example shown in FIG. 34, for example, it is possible to classify "frequency characteristic data of the first image filtering process P1, frequency characteristic data of the second image filtering process P2, and frequency characteristic data of the third image filtering process P3" into the first variation distribution G1, and to classify "frequency characteristic data of the fourth image filtering process P4, frequency characteristic data of the fifth image filtering process P5, and frequency characteristic data of the sixth image filtering process P6" into the second variation distribution G2, for example.

Figure 35A:
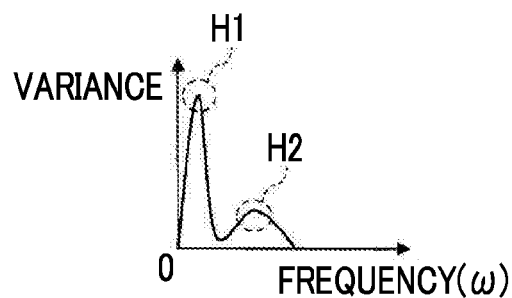
Figure 35B:
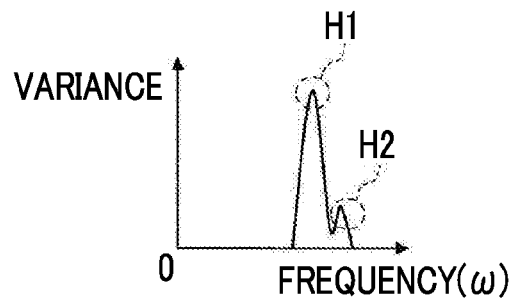

FIGS. 35A and 35B are diagrams schematically showing an example of a variance of the frequency characteristics of the plurality of types of image filtering processes shown in FIG. 34, in which FIG. 35A shows a variance of the frequency characteristic data of the first image filtering process P1 to the third image filtering process P3 classified as the first variation distribution G1, and FIG. 35B shows a variance of the frequency characteristic data of the fourth image filtering process P4 to the sixth image filtering process P6 classified as the second variation distribution G2. A lateral axis in each of FIGS. 35A and 35B represents a frequency ($\omega$), and a longitudinal axis represents a variance. FIGS. 35A and 35B do not strictly represent the variances of the frequency characteristics of the plurality of types of image filtering processes P1 to P6 shown in FIG. 34, for ease of description.

In any case of the frequency characteristics of the six image filtering processes P1 to P6 shown in FIG. 34, since the response in a case where the frequency ($\omega$) is "0" is "1", a variance in a case where the frequency ($\omega$) is "0" becomes "0". As shown in FIGS. 35A and 35B, with respect to "the variances of the frequency characteristics of the plurality of types of image filtering processes" of the first variation distribution G1 and the second variation distribution G2, respectively, "a component indicating the largest variation (see "H1" in FIGS. 35A and 35B)" and "a component indicating the second largest variation "see "H2" in FIGS. 35A and 35B)" are shown.

Figure 36A:
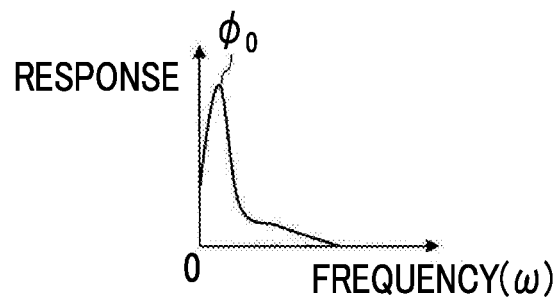
Figure 36B:
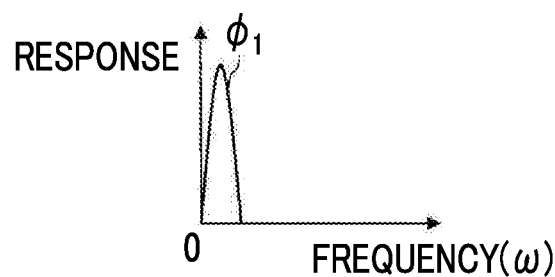
Figure 36C:
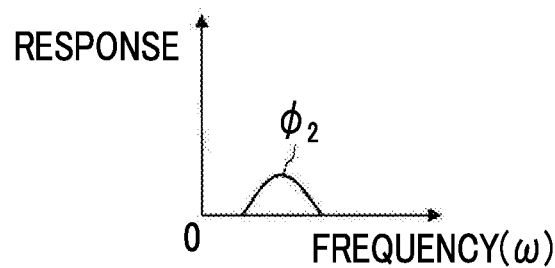
Figure 37A:
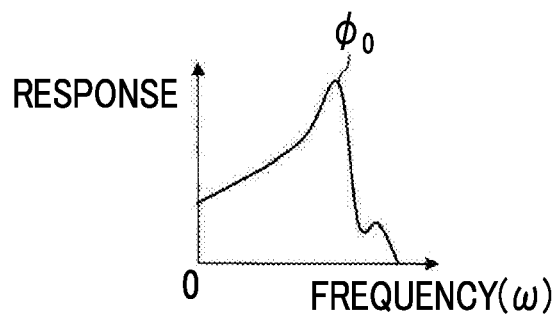
Figure 37B:
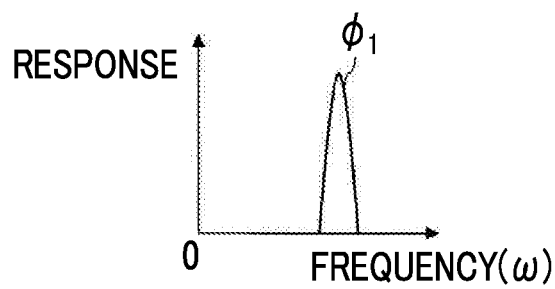
Figure 37C:
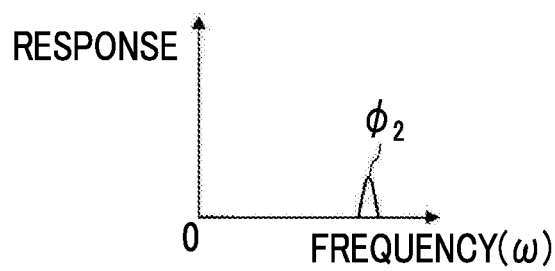

FIGS. 36A to 36C are diagrams schematically showing examples of base filters (characteristic vectors) acquired from an average and the variance of the frequency characteristics of the first image filtering process P1 to the third image filtering process P3 classified as the first variation distribution G1, in which FIG. 36A shows "$\phi_0$", FIG. 36B shows "$\phi_1$", and FIG. 36C shows "$\phi_2$". FIGS. 37A to 37C are diagrams schematically showing examples of base filters (characteristic vectors) acquired from an average and the variance of the frequency characteristics of the fourth image filtering process P4 to the sixth image filtering process P6 classified as the second variation distribution G2, in which FIG. 37A shows "$\phi_0$", FIG. 37B shows "$\phi_1$", and FIG. 37C shows "$\phi_2$".

As described above, it is preferable that the frequency characteristic $\phi_0$ of the filter used in the first filtering process F1 is determined based on the center (average) of a distribution of the frequency characteristics of the plurality of types of image filtering processes.

Further, it is preferable that the frequency characteristics of the filters used in the other filtering processes are determined according to components of which the variations (variances) of the frequency characteristics of the plurality of types of image filtering processes shown in each of FIGS. 35A and 35B are large. Accordingly, it is preferable that the frequency characteristic $\phi_1$ of the filter used in the second filtering process F2 is determined based on the component having the largest variation of the frequency characteristics of the plurality of types of image filtering processes (see "H1" in FIGS. 35A and 35B). Similarly, it is preferable that the frequency characteristic $\phi_2$ of the filter used in the third filtering process F3 is determined based on the component having the second largest variation of the frequency characteristics of the plurality of types of image filtering processes (see "H2" in FIGS. 35A and 35B).

FIGS. 38A and 38B show a frequency characteristic f($\omega$) (see FIG. 38A) and a gain example (see FIG. 38B) relating to the image filtering process P (first filtering process F1 to third filtering process F3) performed by the filtering process unit 41 having the circuit configuration shown in FIG. 10. In the frequency characteristic f($\omega$) relating to a multimodal distribution shown in FIG. 38A, "$\phi_0^{(i)}(\omega)$" represents a frequency characteristic of a filter used in a first filter application unit 48-1 of the first filtering process F1, and "$g_0$" represents a gain used in a first gain application unit 49-1 of the first filtering process F1. Further, "$\phi_1^{(i)}(\omega)$" represents a frequency characteristic of a filter used in a second filter application unit 48-2 of the second filtering process F2, and "$g_1$" represents a gain used in a second gain application unit 49-2 of the second filtering process F2. Furthermore, "$\phi_2^{(i)}(\omega)$" represents a frequency characteristic of a filter used in a third filter application unit 48-3 of the third filtering process F3, and "$g_2$" represents a gain used in a third gain application unit 49-3 of the third filtering process F3.

The sign "i" in the frequency characteristics $\phi_1^{(i)}(\omega)$ to $\phi_3^{(i)}(\omega)$ of the respective filters represents a cluster index indicating a group classified according to the multimodal distribution. For example, in the first image filtering process P1 to the third image filtering process P3 classified as the first variation distribution G1, "1" may be allocated as the cluster index i as shown in FIG. 38B. On the other hand, in the fourth image filtering process P4 to the sixth image filtering process P6 classified as the second variation distribution G2, "2" may be allocated as the cluster index i as shown in FIG. 38B.

FIG. 38B shows gains $g_0$ to $g_2$ for realizing respective frequency characteristics of the image filtering processes P1 to P6 shown in FIG. 34 by a frequency characteristic of the entire system shown in FIG. 38A with high accuracy in a case where a filter used in each filter application unit 48 of the filtering process unit 41 having the circuit configuration shown in FIG. 10 is fixed and the gain $g_0$ used in the first filtering process F1 is fixed to "1.0", for example.

As shown in FIG. 38B, according to the above-described example, it is possible to compress data on the frequency characteristics of the plurality of types of image filtering processes P1 to P6 into six filter frequency characteristics $\phi_0^{(1)}$ to $\phi_2^{(1)}$, $\phi_0^{(2)}$ to $\phi_2^{(2)}$ (tap coefficients) and 18 gains (12 gains in a case where $g_0$ is fixed to "1.0").

In this way, according to the filter determination method based on the multimodal distribution, filter setting according to the number of groups that form the multimodal distribution (the first variation distribution G1 and the second variation distribution G2 in the example shown in FIG. 28) is necessary. Accordingly, in a case where the multimodal distribution is used, compared with a case where a unimodal distribution is used, the number of filters that needs to be stored in a memory in advance increases, and a necessary storage capacity also increases. Further, in order to associate each filter with a group to be classified, it is necessary to store association information such as the above-described cluster index in a memory in advance.

Figure 39:
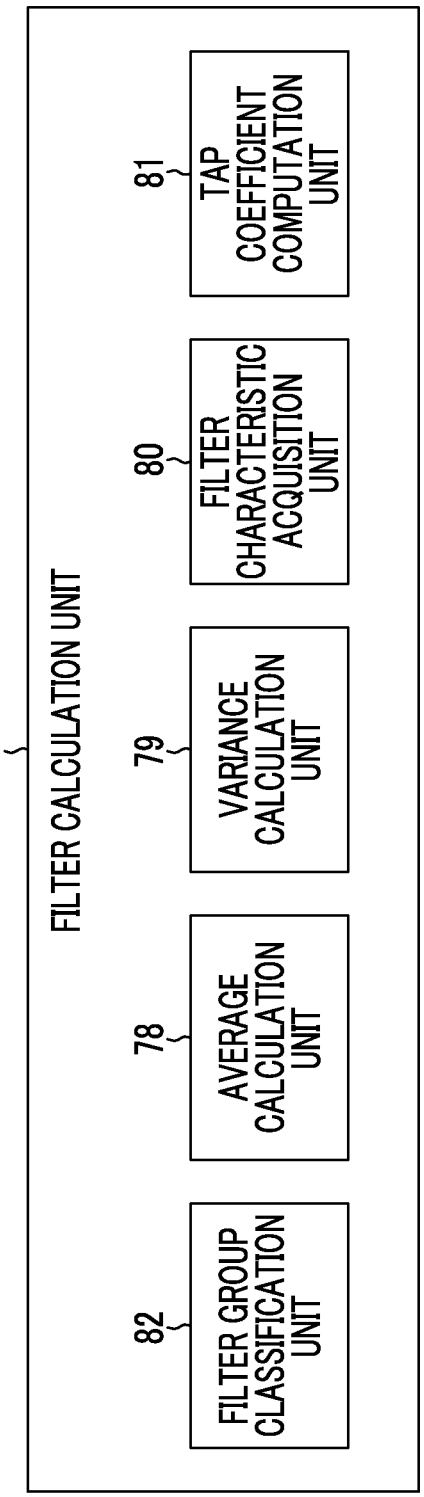
FIG. 39 is a block diagram showing an example of a functional configuration of a filter calculation unit that calculates a filter coefficient based on a multimodal distribution.

FIG. 39 is a block diagram showing an example of a functional configuration of the filter calculation unit 77 that calculates a filter coefficient based on a multimodal distribution. The filter calculation unit 77 in this example further includes a filter group classification unit 82, in addition to the average calculation unit 78, the variance calculation unit 79, the filter characteristic acquisition unit 80 and the tap coefficient computation unit 81 described above (see FIG. 33), in order to classify a plurality of types of frequency characteristics of image filtering processes into a plurality of groups that form a multimodal distribution.

The filter group classification unit 82 in this example classifies frequency characteristics of a plurality of types of image filtering processes (in the example shown in FIG. 34, the first image filtering process P1 to the sixth image filtering process P6) into a plurality of filter groups (the first variation distribution G1 and the second variation distribution G2 in the example shown in FIG. 28) with reference to a mixed normal distribution.

Figure 40:
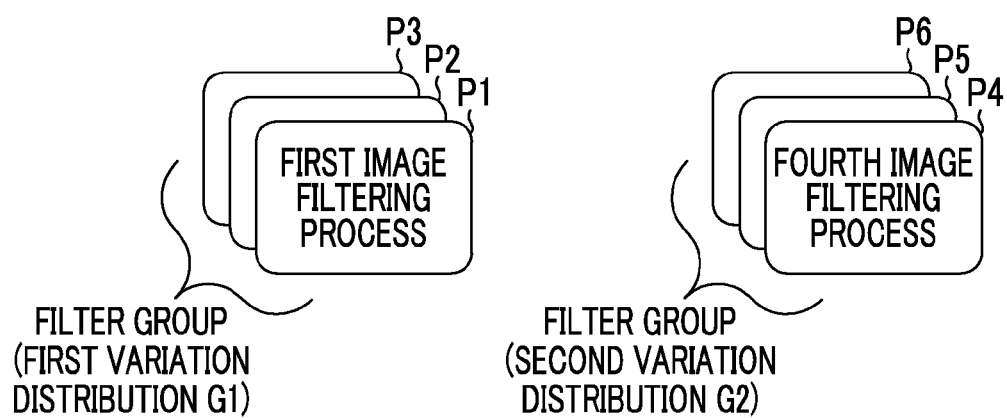
FIG. 40 is a conceptual diagram of a plurality of types of image filtering processes (frequency characteristics) classified as a plurality of filter groups by a filter group classification unit.

FIG. 40 is a conceptual diagram of a plurality of types of image filtering processes (frequency characteristics) classified into a plurality of filter groups by the filter group classification unit 82. The filter group classification unit 82 analyzes similarity of frequency characteristic data of the plurality of types of image filtering processes, and classifies the frequency characteristics of the respective image filtering processes into corresponding filter groups. In the above-described example, the first image filtering process P1 to the third image filtering process P3 are classified into a filter group of the first variation distribution G1, and the fourth image filtering process P4 to the sixth image filtering process P6 are classified into a filter group of the second variation distribution G2, by the filter group classification unit 82.

The average calculation unit 78, the variance calculation unit 79, the filter characteristic acquisition unit 80, and the tap coefficient computation unit 81 that form the filter calculation unit 77 acquire a reference filter $h_b$ and at least one variance filter $h_v$ relating to each of the plurality of filter groups, based on frequency characteristics of a plurality of types of image filtering processes included in each of the plurality of filter groups among the frequency characteristics of the plurality of types of image filtering processes which are classified into the plurality of filter groups.

According to the above-described example, in a case where a variation distribution of frequency characteristics of a plurality of types of image filtering processes is already known, it is possible to design an optimal filter for covering the variation with high accuracy. Particularly, by selecting an appropriate distribution type among a unimodal distribution and a multimodal distribution according to the variation distribution of the frequency characteristics of the plurality of types of image filtering processes, it is possible to acquire a filter (filter coefficient) and a gain capable of reproducing a frequency characteristic of a desired image filtering process with high accuracy.

As described above, according to this embodiment, it is possible to reduce the number of filters (data amount), to prevent retention of FIR filters (filter coefficients (tap coefficients)) relating to all conditions, and to perform an image filtering process using an averagely excellent filter.

<Design of FIR Filter>

Next, a method for designing an FIR filter for which there is a limit in the number of taps will be described.

By flexibly adjusting a frequency characteristic of a filter by the above-described method, it is possible to design an optimal filter for effectively covering variation of frequency characteristics of a plurality of types of image filtering processes. However, in a case where a filter to be actually used is realized by an FIR filter for which there is a limit in the number of taps, it is difficult to ideally obtain a desired frequency characteristic.

Generally, it is extremely difficult to realize a rapid frequency characteristic with a small number of taps. Particularly, a characteristic vector corresponding to a small characteristic value tends to have a rapid zigzag shape. Accordingly, even if an ideal frequency characteristic of a filter is acquired by the above-described method, in a case where a sufficient number of taps of a filter to be actually used is not prepared, it is difficult to sufficiently cover variation of frequency characteristics of a plurality of types of image filtering processes.

This problem relates to a parametric function of which a base is non-linear, and is similar to a problem that a base parameter is determined to approximate a certain vector by a linear sum of as a small number of bases as possible. Various methods for solving such a problem have been proposed. For example, a SAGE algorithm is an algorithm used in incoming wave analysis in radio wave transmission, for example, and is a method for obtaining bases one by one to minimize a residual based on a point of view of an EM algorithm. Further, an OMP algorithm is an algorithm used in a case where a sparse coefficient vector using an overcomplete dictionary is obtained in a compressed sensing filed. The OMP method itself is not a method for obtaining a parametric base, but it is possible to apply the OMP method in design of an FIR filter by changing a situation setting for selection from a dictionary in OMP to a situation setting for selection of a parametric base close to a parametric base function.

An example of a specific computation method of the SAGE algorithm and the OMP algorithm will be described later, but the tap coefficient computation unit 81 (see FIGS. 33 and 39) of the filter calculation unit 77 may calculate a coefficient allocated to each tap of at least one variance filter $h_v$ from a variation distribution function (see a covariance matrix "$R_i$" which will be described later) determined based on a coefficient allocated to each tap of the reference filter $h_b$, which is a variation distribution function indicating a variance of frequency characteristics of a plurality of types of image filtering processes, based on the algorithms.

According to the SAGE algorithm and the OMP algorithm (which will be described later), the tap coefficient computation unit 81 of the filter calculation unit 77 acquires, in a case where "I" is set to an integer which is equal to or greater than 2, a first to an I-th variance filters $h_v$, and calculates a coefficient allocated to each tap of the first variance filter $h_v$ from a variation distribution function determined based on a coefficient allocated to each tap of the reference filter $h_b$. Further, the tap coefficient computation unit 81 of the filter calculation unit 77 calculates, in a case where "J" is set to an integer which is equal to or greater than 2 and is equal to or smaller than I, a coefficient allocated to each tap of a J-th variance filter $h_v$, from the variation distribution function determined based on the coefficient allocated to each tap of the reference filter $h_b$ and a coefficient allocated to each tap of the variance filter $h_v$ which belongs to a first to a (J−1)-th variance filters $h_v$.

Further, in the SAGE algorithm, the tap coefficient computation unit 81 of the filter calculation unit 77 updates a coefficient allocated to each tap of at least one of the reference filter $h_b$ and the at least one variance filter $h_v$, based on a variation distribution function (see a covariance matrix "$Q_j$" (which will be described later)) indicating a residual component determined based on the coefficient allocated to each tap of the reference filter $h_b$ and at least one variance filter $h_v$, which is a variation distribution function of frequency characteristics of a plurality of types of image filtering processes.

The SAGE algorithm and the OMP algorithm are described in various literatures, and for example, may make reference to J. A. Fessler and A. O. Hero, "Space-Alternating Generalized Expectation-Maximization Algorithm," IEEE Transactions on Signal Processing, Vol. 17, No. 10, pp. 2664-2677, 1994; B. H. Fleury, M. Tschudin, R. Heddergott, D. Dahlhaus, and K. I. Pedersen, "Channel Parameter Estimation in Mobile Radio Environments Using the SAGE Algorithm," IEEE J. Selected Areas in Communications, Vol. 17, No. 3, pp. 434-449, March 1999; and Y Pati, R. Rezaiifar, P. Krishnaprasad, "Orthogonal Matching Pursuit: recursive function approximation with application to wavelet decomposition", in Asilomar Conf. on Signals, Systems and Comput., 1993. Here, since both the SAGE algorithm and the OMP algorithm are provided for the purpose of vector base decomposition and do not originally handle partial space approximation in filter design, it is necessary to perform appropriate modification with respect to a calculation expression.

<Calculation of Optimal Filter Group Based on Application of OMP Algorithm>

Hereinafter, an example of filter design based on the OMP algorithm will be described. Processes of respective steps described hereinbelow is basically performed by the filter calculation unit 77 (tap coefficient computation unit 81), but a part or all of the processes of the respective steps may be performed by another unit.

Hereinafter, a case where a unimodal distribution is premised will be described. With respect to a case where a multimodal distribution is premised, as described above, a case where the unimodal distribution is premised may be applied. That is, by handling each of a plurality of filter groups (in the example shown in FIG. 28, the first variation distribution G1 and the second variation distribution G2) as the variation distribution G of the unimodal distribution, it is possible to handle a case where the multimodal distribution is premised.

Step 1

First, a tap coefficient of an FIR filter that most closely approximates an average (a central value) of frequency characteristics of a plurality of types of image filtering processes represented as the above-described "$\psi_0$" is acquired by an arbitrary method, and a frequency characteristic of a filter which is actually realized by the tap coefficient is set as "a frequency characteristic $\phi_0$ of a filter used in a first filtering process F1.

Step 2

A covariance matrix $R_0$ in a case where "the frequency characteristic $\phi_0$ of the filter which is actually used in the first filtering process F1" is assumed as the average (central value) of the frequency characteristics of the plurality of types of image filtering processes is calculated based on the following expression.

$$R_0 = \frac{1}{N_p} \sum_{i=1}^{N_p} (\beta_i - \phi_0)(\beta_i - \phi_o)^H$$

Step 3

The covariance matrix $R_0$ is set as a covariance matrix $R_1$, and the parameter "i" is set to "1" as shown in the following expression.

$R_i = R_0$ $i \leftarrow 1$

Step 4

A characteristic vector $\psi_i$ corresponding to a maximum characteristic value of the covariance matrix $R_i$ is obtained by the above-described method.

Step 5

A tap coefficient of an FIR filter that most closely approximates a frequency characteristic of the characteristic vector $\psi_i$ is acquired by an arbitrary method, and a frequency characteristic of a filter which is actually realized by the tap coefficient is set to "$\phi_i$". A filter having the frequency characteristic $\phi_i$ corresponds to a filter used in an "i+1"-th filtering process, and for example, if "i=1", a frequency characteristic $\phi_2$ of a filter used in the second filtering process F2 is obtained. The tap coefficient of the filter relating to "$\phi_{i+1}$" is stored in a memory (not shown).

Step 6

Using the already obtained "$\phi_1$ to $\phi_i$" as bases, a component capable of being represented by a partial space where the bases are spread is excluded from the covariance matrix, and a residual is calculated. For example, if "$\phi_i=[\phi_1\ \phi_2\ \ldots\ \phi_i]$" is defined by setting "i" to an integer which is equal to or greater than 3, when a Moore-Penrose generalized inverse of $\phi_i$ is represented as "$\phi_i^+$", an orthogonal projection matrix to a span $\{\phi_1, \phi_2, \ldots \phi_i\}$ is represented as "$\phi_i\phi_i^+$". If the orthogonal projection matrix $\phi_i\phi_i^+$ is used, the covariance matrix "$R_{i+1}$" is represented as the following expression.

$$R_{i+1}=(I-\Phi_i\Phi_i^+)R_0(I-\Phi_i\Phi_i^+)^H$$

I: unit matrix

Step 7

As represented by the following expression, "i" is newly set to "i=i+1", and then, "step 4" to "step 7" are repeated until "i=N−1" is satisfied. In this way, the filter frequency characteristics $\phi_1$ to $\phi_{N-1}$ are obtained.

$$i \leftarrow i+1$$

<Calculation of Optimal Filter Group Based on Application of SAGE Algorithm>

Next, an example of filter design based on the SAGE algorithm will be described. Hereinafter, a case where a unimodal distribution is premised will be described, this example may be applied to a case where a multimodal distribution is premised, which is the same as the above-described OMP algorithm.

The SAGE algorithm is different from the OMP algorithm in that updating of the residual of the covariance matrix in the above-described step 6 is simply based on subtraction of a selected base (FIR filter) and the updating is individually continued with respect to each base even after all bases are once obtained.

More specifically, step 1 to step 5 of the above-described OMP algorithm are similarly performed in the SAGE algorithm. Here, the covariance matrix "$R_{i+1}$" used in step 6 in the above-described OMP algorithm is obtained by the following expression in the SAGE algorithm.

$$R_{i+1}=(I-\phi_i\phi_i^H)R_i(I-\phi_i\phi_i^H)^H$$

In step 7 of the above-described OMP algorithm is similarly performed in the SAGE algorithm. Here, in the SAGE algorithm, step 8 to step 12 are performed after step 7.

Step 8

As represented by the following expression, a parameter "j" is set to an initial value "1".

$$j \leftarrow 1$$

Step 9

As represented by the following expression, a component capable of being expressed by a partial space where bases from which a j-th base is excluded are spread is excluded from the covariance matrix, and a residual is calculated.

$$\psi_j=[\phi_1\phi_2\cdots\phi_{j-1}\phi_{j-2}\cdots\phi_{N-1}]$$

$$Q_j=(I-\psi_j\psi_j^+)R_0(I-\psi_j\psi_j^+)^H$$

Step 10

A characteristic vector $\psi_j$ corresponding to a maximum characteristic value of a covariance matrix $Q_j$ indicating the residual component represented by the above expression is obtained according to the above-described method.

Step 11

A tap coefficient of an FIR filter that most closely approximates a frequency characteristic of the characteristic vector $\psi_j$ is acquired by an arbitrary method, and a frequency characteristic of a filter that is actually realized by the tap coefficient is set to "$\phi_j$". Thus, the frequency characteristic $\phi_j$" (tap coefficient) of the filter used in a "j+1"-th filtering process is updated, and the result is stored in a memory (not shown).

Step 12

Until an overall approximation error "$J_{TOTAL}$" defined as the following expression is within a specific target range or the number of loops (calculation time) reaches a specific upper limit, "step 9" to "step 12" are repeated while changing the parameter "j" as represented by the following expression.

$$\Phi_{ALL}=[\phi_1\phi_2\cdots\phi_{N-1}]$$

$$J_{TOTAL}=tr(I-\Phi_{ALL}\Phi_{ALL}^+)R_0(I-\Phi_{ALL}\Phi_{ALL}^+)^H$$

tr: trace (diagonal partial sum)

$$j \leftarrow \begin{cases} j+1 & j<N-1 \\ 1 & \text{otherwise} \end{cases}$$

By using the above-described SAGE algorithm or OMP algorithm, if variation (for example, average and variance) of frequency characteristics of a plurality of types of image filtering processes can be calculated, it is possible to design a tap coefficient of an FIR filter with high accuracy. Further, before calculation of a frequency characteristic of an individual specific image filtering process, it is possible to determine a tap coefficient of a filter that can be actually used in an image filtering process (a plurality of filtering processes).

<Combination of Filter and Contour Emphasis Filter Based on Point Spread Function>

A point spread function (PSF) is most easily calculated from design values of an optical system, but the optical system is not necessarily manufactured according to the design values, and a point spread function of an actual optical system may show a frequency characteristic different from a frequency characteristic derived from design values.

For example, in a case where an actual MTF in a central portion of the lens 14 included in the optical system is different from an MTF estimated from design values, even though an image filtering process based on a point spread function is performed, there is a case where a resolution of a central portion of the original image data D1 is not sufficiently improved. In order to handle such a case, a method for setting a filter response to be stronger than an estimated value may be considered. However, in this case, the resolution of the central portion (a portion with a low balance) of the original image data D1 is improved, but there is a case where a resolution of a peripheral portion (a portion with a high balance) of the original image data D1 may excessively higher than the resolution of the central portion.

The above-mentioned problem does not occur only in a case where variation in design and manufacturing occurs, but also occurs in a case where individual variation of an optical system occurs.

As an approach with respect to such a problem, a method for actually measuring a point spread function with respect to each of a central portion and a peripheral portion of an individual optical system (lens 14) and individually creating a filter relating to each of the central portion and the peripheral portion of the optical system based on the measured point spread function may be considered.

However, the process of measuring the point spread function for each position of an optical system to create a filter causes an extremely large workload, and the amount of data of the created filter is extremely enormous. Thus, it is necessary to provide a resource such as a high-performance and high-cost computation circuit, a memory, and the like. Particularly, in a case where calibration is performed by a user himself/herself, it is necessary to provide such a computational circuit and a memory to a product itself of the digital camera 10, which causes a large workload in guaranteeing such a quality that an algorithm stably works for various inputs.

Figure 41A:
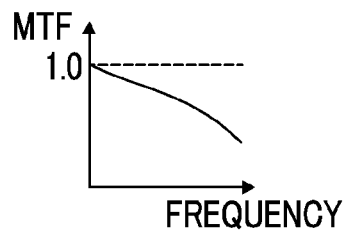
Figure 41B:
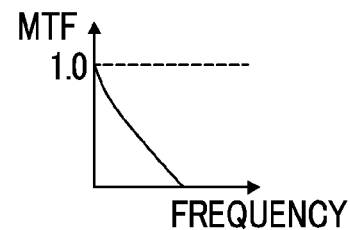
Figure 42A:
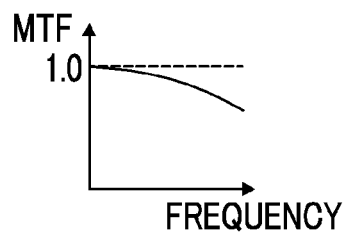
Figure 42B:
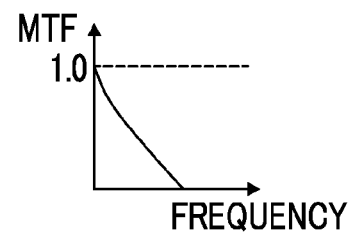

FIGS. 41A and 41B are graphs showing an example of an "MTF of an optical system (lens 14)" derived from design values, in which FIG. 41A shows an MTF of a central portion of the optical system, and FIG. 41B shows an MTF of a peripheral portion of the optical system. In each of FIGS. 41A and 41B, a lateral axis represents a frequency, and a longitudinal axis represents a normalized MTF. FIGS. 42A and 42B are graphs showing an example of an "MTF of an optical system (lens 14)" derived from an actual measurement value, in which FIG. 42A shows an MTF of a central portion of the optical system, and FIG. 42B shows an MTF of a peripheral portion of the optical system. In each of FIGS. 42A and 42B, a lateral axis represents a frequency, and a longitudinal axis represents a normalized MTF. Assuming that FIGS. 41A and 41B, and FIGS. 42A and 42B relate to the same optical system, in this example, the MTF (see FIG. 42B) derived from the actual measurement value approximately matches the MTF (see FIG. 41B) derived from the design value in the "peripheral portion" of the optical system, but the MTF (see FIG. 42A) derived from the actual measurement value is better than the MTF (see FIG. 41A) derived from the design value in the "central portion" of the optical system.

MTFs in a case where a filter application process PF and a gain application process PG is performed with respect to image data acquired through imaging using such an optical system will be reviewed.

Figure 43A:
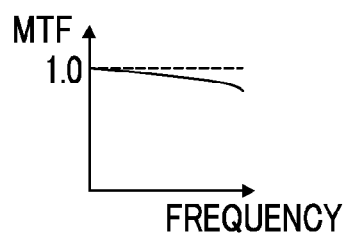
Figure 43B:
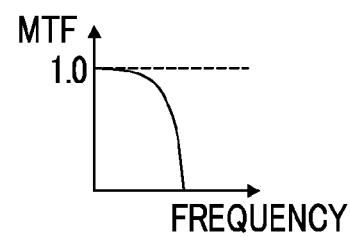
Figure 44A:
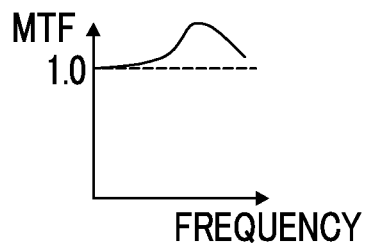
Figure 44B:
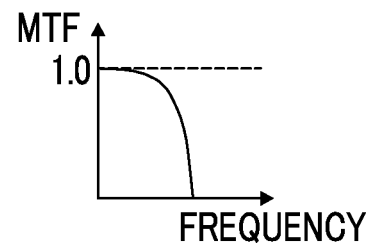

FIGS. 43A and 43B are graphs showing an example of an "MTF relating to an image filtering process" in a case where the filter application process PF and the gain application processing PG are performed based on the MTF shown in FIGS. 41A and 41B, in which FIG. 43A shows an MTF of a central portion of the optical system, and FIG. 43B shows an MTF of a peripheral portion of the optical system. FIGS. 44A and 44B are graphs showing an example of an "MTF relating to an image filtering process" in a case where the filter application process PF and the gain application process PG are performed based on the MTF shown in FIGS. 42A and 42B, in which FIG. 44A shows an MTF of a central portion of the optical system, and FIG. 44B shows an MTF of a peripheral portion of the optical system. In the examples shown in FIGS. 43A and 43B, and FIGS. 44A and 44B, the same filter is used in the filter application process PF, and the same gain "1.0" is used in the gain application process PG, for example. In this example, since the filter used in the filter application process PF is acquired based on the design value, an appropriate MTF is obtained in a case where the design value is a reference (see FIGS. 43A and 43B), but in a case where the actual measurement value is a reference, the MTF in the central portion and/or the peripheral portion of the optical system may become excessively large. That is, in the example shown in FIGS. 44A and 44B, the MTF of the peripheral portion of the optical system is within an allowable range (see FIG. 44B), but the MTF of the central portion of the optical system becomes excessively large according to a frequency band (see FIG. 44A).

Figure 45A:
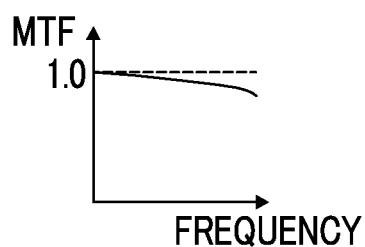
Figure 45B:
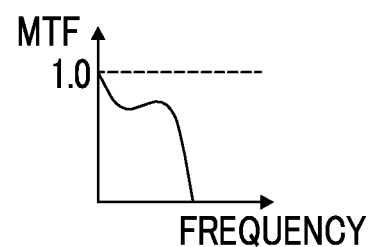

FIGS. 45A and 45B are graphs showing an example of an "MTF of an optical system (lens 14)" in a case where the filter application process PF and the gain application process PG are performed based on the MTF shown in FIGS. 42A and 42B, in which FIG. 45A shows an MTF of a central portion of the optical system, and FIG. 45B shows an MTF of a peripheral portion of the optical system. In the example shown in FIGS. 45A and 45B, the same filter as the example shown in FIGS. 44A and 44B is used in the filter application process PF, but a gain (<1.0) smaller than the gain used in the example shown in FIGS. 44A and 44B is used in the gain application process PG. In the example shown in FIGS. 45A and 45B, the MTF in the central portion of the optical system is within an allowable range (see FIG. 45A), but the MTF in the peripheral portion of the optical system becomes excessively small according to a frequency band (see FIG. 45B).

As described above, it is difficult to adjust point spread functions of all positions (central portion and peripheral portion) of the optical system (lens 14) with good balance.

Figure 46A:
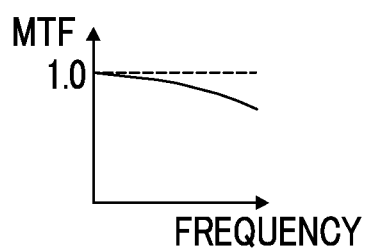
Figure 46B:
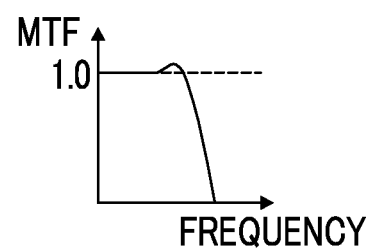

In the following embodiment, by combining a filtering process (hereinafter, may be referred to as a "point image restoration process") that uses a filter derived from a point spread function and a filtering process (hereinafter, may be referred to as a "contour emphasis process") that uses a contour emphasis filter, the overall point spread function of the optical system is preferably adjusted. FIGS. 46A and 46B are graphs showing an example of an "MTF of an optical system (lens 14)" in a case where a point image restoration process and a contour emphasis process (which will be described hereinafter) are combined based on the MTF shown in FIGS. 42A and 42B, in which FIG. 46A shows an MTF of a central portion of the optical system, and FIG. 46B shows an MTF of a peripheral portion of the optical system. According to the following embodiment, as shown in FIGS. 46A and 46B, it is possible to realize an excellent MTF in both areas of the central portion and the peripheral portion of the optical system.

In the following embodiment, "the filter derived from the point spread function" is configured by a filter of which a frequency characteristic is changed depending on an in-image position (pixel position), and on the other hand, and "the contour emphasis filter" is configured by a filter having a uniform frequency characteristic without depending on the in-image position (pixel position).

Figure 47:
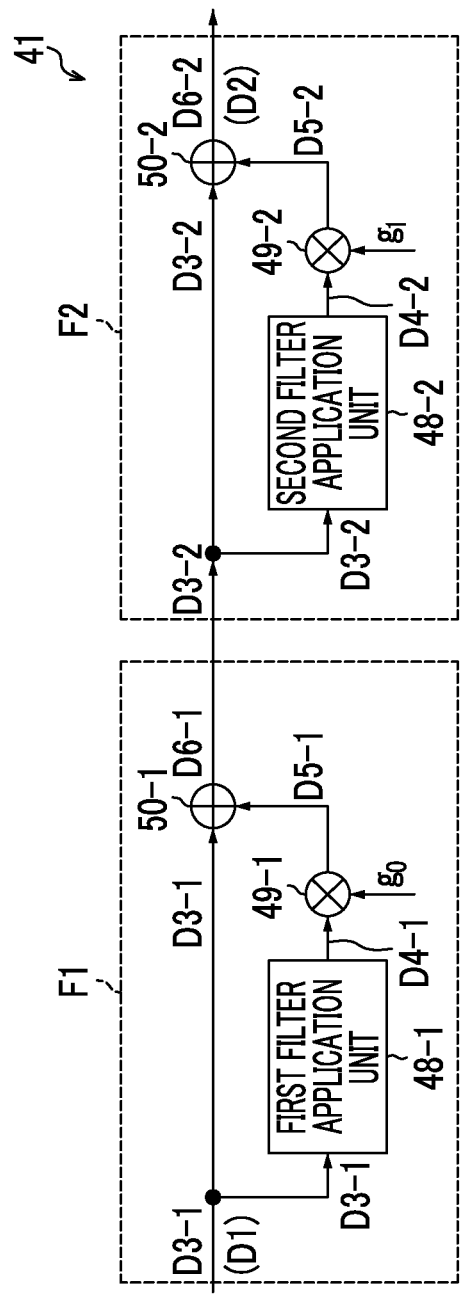
FIG. 47 is a circuit configuration diagram showing an example of a case where a circuit that performs a filtering process using a filter derived from a point spread function and a circuit that performs a filtering process using a contour emphasis filter are connected to each other in series.

FIG. 47 is a circuit configuration diagram showing an example of a case where a circuit that performs a filtering process using a filter derived from a point spread function and a circuit that performs a filtering process using a contour emphasis filter are connected to each other in series. The example of the circuit configuration shown in FIG. 47 is approximately the same as the example of the circuit configuration shown in FIG. 8. That is, the circuit configuration shown in FIG. 47 is obtained by setting "N=2" in the example of the circuit configuration shown in FIG. 8, by setting the filter used in the first filter application unit 48-1 therein as "the filter derived from the point spread function", and by setting the filter used in the second filter application unit 48-2 therein as "the contour emphasis filter".

Figure 48:
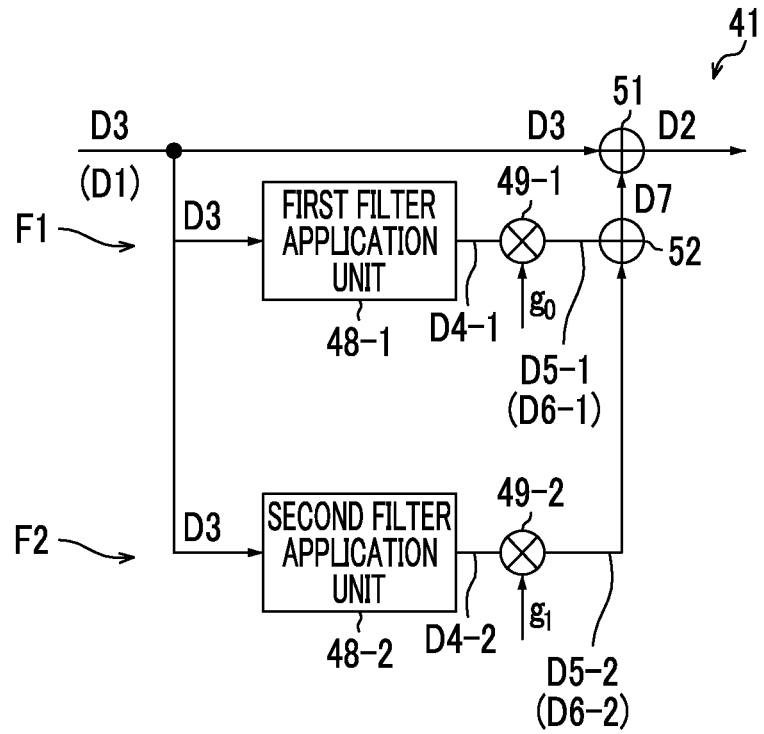
FIG. 48 is a circuit configuration diagram showing an example of a case where a circuit that performs a filtering process using a filter derived from a point spread function and a circuit that performs a filtering process using a contour emphasis filter are connected to each other in parallel.

FIG. 48 is a circuit configuration diagram showing an example of a case where a circuit that performs a filtering process using a filter derived from a point spread function and a circuit that performs a filtering process using a contour emphasis filter are connected to each other in parallel. The example of the circuit configuration shown in FIG. 48 is approximately the same as the example of the circuit configuration shown in FIG. 9. That is, the circuit configuration shown in FIG. 48 is obtained by setting "N=2" in the example of the circuit configuration shown in FIG. 9, by setting the filter used in the first filter application unit 48-1 therein as "the filter derived from the point spread function", and by setting the filter used in the second filter application unit 48-2 therein as "the contour emphasis filter".

Figure 49:
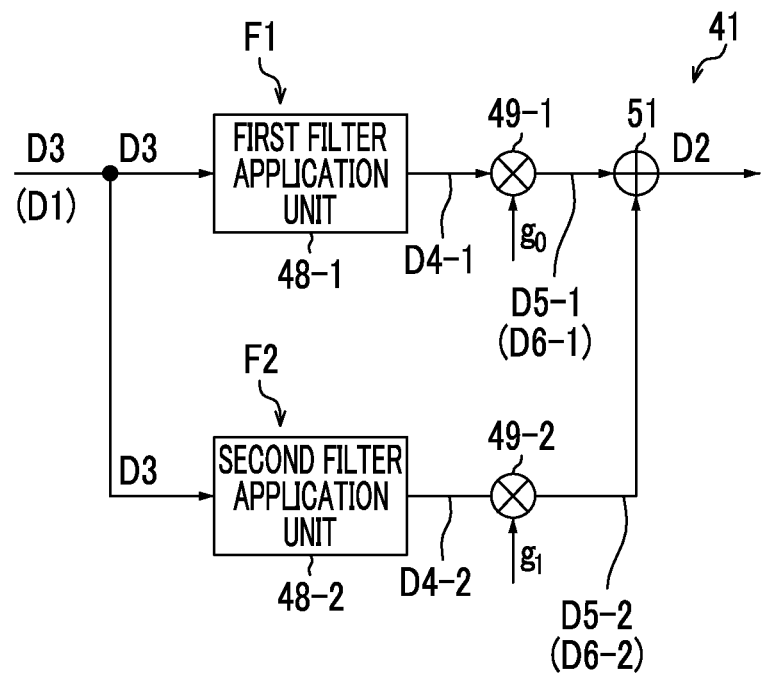
FIG. 49 is a circuit configuration diagram showing an example of a case where a circuit that performs a filtering process using a filter derived from a point spread function and a circuit that performs a filtering process using a contour emphasis filter are connected to each other in parallel.

FIG. 49 is a circuit configuration diagram showing an example of a case where a circuit that performs a filtering process using a filter derived from a point spread function and a circuit that performs a filtering process using a contour emphasis filter are connected to each other in parallel. The example of the circuit configuration shown in FIG. 49 is approximately the same as the example of the circuit configuration shown in FIG. 10. That is, the circuit configuration shown in FIG. 49 is obtained by setting "N=2" in the example of the circuit configuration shown in FIG. 10, by setting the filter used in the first filter application unit 48-1 therein as "the filter derived from the point spread function", and by setting the filter used in the second filter application unit 48-2 therein as "the contour emphasis filter".

In the examples shown in FIGS. 47 to 49, similar to the above-described examples shown in FIGS. 8 to 10, "the target frequency characteristic of the image filtering process" is approximately realized by adjusting the gains $g_0$ and $g_1$ used in the first gain application unit 49-1 and the second gain application unit 49-2. First, in the examples shown in FIGS. 47 to 49, the gains $g_0$ and $g_1$ are adjusted so that excessive separation does not occur in resolutions between a central portion and a peripheral portion of optical systems. Thus, it is not necessary to design a filter (particularly, a filter derived from a point spread function) again, and to reduce the number of parameters (tap coefficients or the like) to be retained with respect to various imaging conditions. Further, in calibration for correcting individual variation of an optical system, it is not necessary to perform a design operation of an FIR filter having a finite tap length for which a large amount of calculation is necessary.

Hereinafter, a gain calculation method in a case where the filtering process unit 41 has the circuit configuration shown in FIG. 49 will be described as an example.

As described above, the point image restoration process is performed using the "filter derived from the point spread function" in the first filtering process F1, and the contour emphasis process is performed using the "contour emphasis filter" in the second filtering process F2.

When a frequency characteristic of the filter (that is, the filter used in the first filter application unit 48-1) used in the point image restoration process is represented as "$\phi_0(\omega, r)$", by performing discretization of "$\phi_0(\omega, r)$" with reference to $N_\omega$ sampling points relating to a frequency and $N_r$ sampling points relating to an in-image position (pixel position), the following expression is established using the Kronecker product as described above.

$$\phi_0 = \sum_{k=1}^{N_r} e'_k \otimes \left( \sum_{j=1}^{N_\omega} e_j \otimes \phi_0(\omega_j, r_k) \right)$$

On the other hand, a frequency characteristic of the filter (that is, the filter used in the second filter application unit 48-2) used in the contour emphasis process is represented as "$\tau(\omega)$". The frequency characteristic $\tau(\omega)$ of the contour emphasis filter does not depend on an in-image position, but as represented by the same expression format as that of the frequency characteristic of the filter of the point image restoration process described above, the following expression is established with reference to discretization of "$\tau(\omega)$".

$$\tau = \sum_{k=1}^{N_r} e'_k \otimes \left( \sum_{j=1}^{N_\omega} e_j \otimes \tau(\omega_j) \right)$$

In this case, a gain vector (gain group) g configured by gains used in the first filtering process F1 and the second filtering process F2 is represented as the following expression.

$$g = [g_0 g_1]^T$$

When a frequency characteristic of the entirety of the image filtering process P in which the gains represented as the above expression are set (the entirety of the filtering process unit 41) is represented by "$f(\omega, r|g)$", a target frequency characteristic of the image filtering process P to be realized is represented by "$d(\omega, r)$", and an approximation weight function is represented by "$w(\omega, r)$", the following relational expression is obtained in a similar way to the above-described process relating to FIG. 10.

$$J_{LMS}[g] = \int \int w(\omega, r) \| f(\omega, r | g) - d(\omega, r) \|^2 d\omega dr$$

$$J'_{LMS}[g] = \| W^{1/2}(Ag - d) \|^2$$

where $$W = \text{diag}[w]$$

$$A = [\phi_0 \ \tau]$$

$$g_{OPT} = \underset{g}{\text{argmin}} J'_{LMS}[g] = (A^H W A)^{-1} A^H W d$$

As described above, since the portion of "$(A^H WA)^{-1}A^H W$)" is represented by a matrix (2×2 matrix) capable of being calculated in advance, the optimal solution $g_{OPT}$ of the gain vector can be calculated by a computation of applying a matrix to a filter characteristic acquired based on a point spread function indicating an individual image deterioration characteristic.

In a case where the filtering process unit 41 uses the circuit configuration shown in FIG. 49, in order to prevent change in a DC component (brightness) of an image, it is preferable that a constraint condition that an amplification factor (gain) of the DC component is set to 1.0 times is applied, in addition to the above-described condition. Specifically, acquisition of the optimal solution $g_{OPT}$ of the gain vector according to the following expression corresponds to "the setting of the amplification factor of the DC component to 1.0 times in order to prevent change in the brightness of the entire image".

$$\phi_i(0, r) = \phi_i(0) \ \forall \ i, \forall \ r$$

$$g_{OPT} = \underset{g}{\mathrm{argmin}} J'_{LMS}[g]$$

$$\text{subject to: } g_0 \times \phi_i(0) + g_1 \times \tau(0) = 1$$

The above expression may be considered as a quadratic programming (QP) problem, and may be solved by a small amount of calculation in optimization of a small number of dimensions. Further, as an example, by setting a limit to an amplification factor of a DC component of each filter as represented as the following expression, it is possible to exclude the limit (constraint condition) to the amplification factor of the DC component.

$$\phi_i(0)=1, \psi(0)=0$$

<Design Method of Contour Emphasis Filter>

In a case where variation distribution information of a point spread function (PSF) due to imaging conditions or individual variation is already known, it is possible to design an optimal contour emphasis filter for covering variation of the point spread function.

A set of actual measurement values or estimation values of the point spread function which are a sample of the variation of the point spread function may be represented by the following "$OTF_i(\omega, r)$" using an OTF obtained by expressing the point spread function in a frequency space.

$$\{OTF_i(\omega, r)\}_{i=1}^{N_P}$$

A frequency of an optimal filter which is individually calculated based on the "$OTF_i(\omega, r)$" is represented as "$d_i(\omega, r)$" by the following expression, and a frequency of a filter of a point image restoration process which is determined in advance with respect to an imaging condition of each sample is represented as "$\phi_1(\omega, r)$" by the following expression.

$$\{d_i(\omega, r)\}_{i=1}^{N_P}$$

$$\{\phi_i(\omega, r)\}_{i=1}^{N_P}$$

In this case, as described above, an optimal gain vector "$g_i$" relating to an i-th sample is represented as the following expression.

$$g_i = \underset{g}{\mathrm{argmin}} J'_{LMS}[g] = (A^H W A)^{-1} A^H W d_i$$

$$W = \mathrm{diag}[w]$$

$$A = [\phi_i \ \tau]$$

In this case, a frequency characteristic of the entirety of the image filtering process P (first filtering process F1 and second filtering process F2) performed by the filtering process unit 41 is represented by the following expression.

$$Ag_j = A(A^H W A)^{-1} A^H W d_i = W^{-1/2}(W^{1/2} A (A^H W A)^{-1} A^H W^{1/2}) W^{1/2} = P_{R(W^{1/2} A)} d_j$$

Here, the following expression relating to "P" represents an orthogonal projection matrix to the following linear partial space "$R(W^{1/2}A)$".

$$P_{R(W^{1/2}A)}$$

$$R(W^{1/2}A) = \{W^{1/2} A x | x \in C^{N_\omega N_r}\}$$

A "space orthogonal" to the linear partial space is represented by the following expression.

$$R(W^{1/2}A)^\perp$$

An approximation error can be represented by a projection matrix to the "orthogonal space", and is thus represented by the following expression.

$$P_{R(W^{1/2}A)^\perp} d_i = (I - P_{R(W^{1/2}A)}) d_i$$

A frequency characteristic of a contour emphasis filter that minimizes a sampling average of the approximation errors is a calculation target, and a minimization reference may be represented as the following generic function.

$$J[\tau] = \sum_{i=1}^{N_r} \left\| P_{R(W^{1/2}A)^\perp} d_i \right\|^2 = \sum_{i=1}^{N_r} \| (I - W^{1/2}[\phi_i \ \tau])(I - W^{1/2}[\phi_i \ \tau])^+) d_i \|^2$$

A frequency characteristic τ that minimizes the reference can averagely and most preferably cover variation of frequencies. Accordingly, it is preferable to design a finite tap length FIR filter that approximately realizes the frequency characteristic τ calculated in this way, and to use the FIR filter in a contour emphasis process (the second gain application unit 49-2) as a contour emphasis filter.

Other Modification Examples

The above-described respective functional configurations may be realized by arbitrary hardware, software, or a combination of the hardware and software. For example, the invention may be applied to a program that causes a computer to execute the image processing method (image processing procedure and function), the gain acquisition method (gain acquisition processing procedure and function), and the filter acquisition method (filter acquisition processing procedure and function) in the above-described respective apparatuses and processing units, a computer-readable recording medium (non-transitory recording medium) in which the program is recorded, or a computer in which the program can be installed.

Further, the purpose of the image filtering process (the plurality of times of filtering processes) is not particularly limited, and in each filtering process (each filter application unit 48), various filters such as a restoration filter or a contour emphasis filter based on a point spread function for the purpose of improving image quality, or an art filter or a diffusing filter for the purpose of providing a special effect, may be used.

<Application Example to EDoF System>

For example, the image filtering process according to the invention may be applied to a restoration process with respect to image data (original image data D1) which is acquired through imaging by an optical system (an imaging lens or the like) having an extended depth of field (focus) (EDof). By performing the restoration process with respect to image data of a blurred image which is acquired through imaging in a state where the EDof (focal depth) is extended by the EDof optical system, it is possible to restore and generate image data with a high resolution in a focused state in a wide range. In this case, a restoration process using a restoration filter which is based on an optical transfer function (PSF, OTF, MTF, PTF, or the like) of the EDoF optical system and has a filter coefficient set so that excellent image restoration can be performed in the range of the extended depth of field (focal depth), may be performed.

Hereinafter, an example of a system (EDoF system) relating to restoration of image data which is acquired through imaging using the EDoF optical system will be described. In the example shown hereinafter, an example in which a restoration process is performed with respect to a brightness signal (Y data) obtained from image data (RGB data) after demosaicing will be described, but a timing when the restoration process is performed is not particularly limited, and for example, the restoration process may be performed with respect to "image data (mosaic image data) before the demosaicing" or "image data (demosaiced image data) after the demosaicing and before brightness signal conversion".

Figure 50:
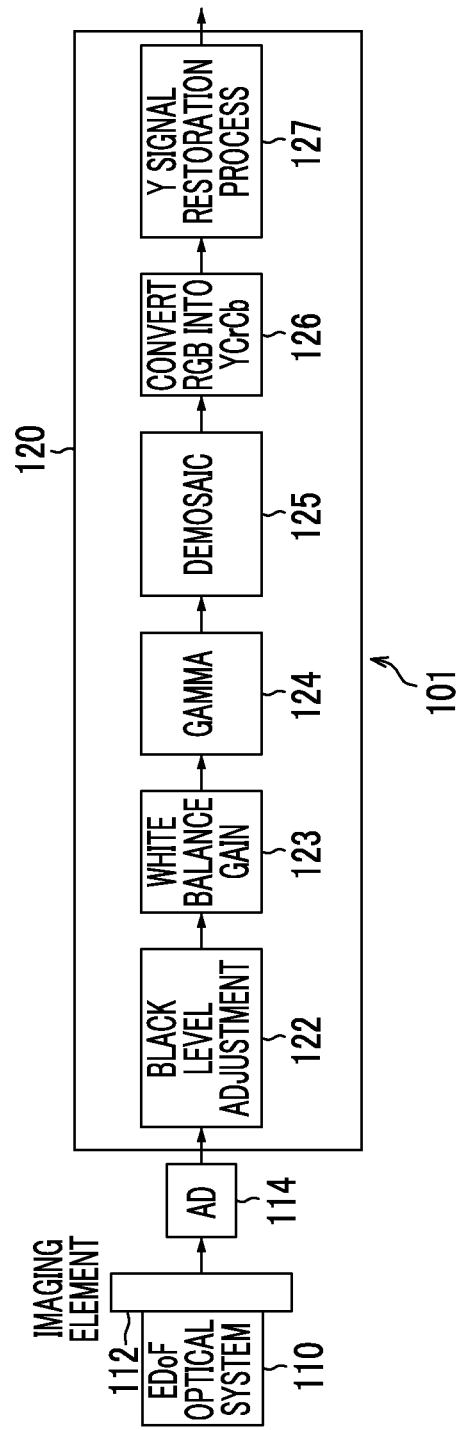
FIG. 50 is a block diagram showing a form of an imaging module that includes an EDoF optical system.

FIG. 50 is a block diagram showing a form of an imaging module 101 that includes an EDoF optical system. The imaging module 101 (a digital camera or the like) in this example includes an EDoF optical system (lens unit) 110, an imaging element 112, an AD converter 114, and a restoration process block (image processing unit 35) 120.

Figure 51:
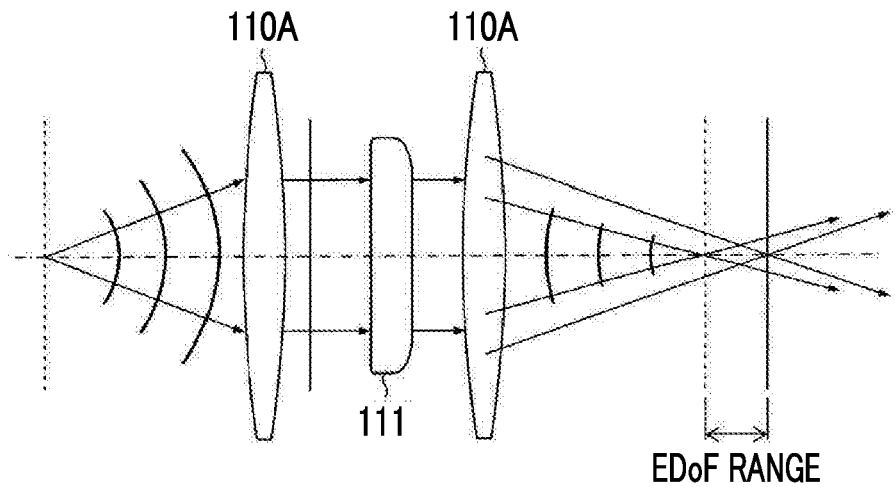
FIG. 51 is a diagram showing an example of the EDoF optical system.

FIG. 51 is a diagram showing an example of the EDoF optical system 110. The EDoF optical system 110 in this example includes fixed imaging lenses 110A having a single focus, and an optical filter 111 disposed at a pupil position. The optical filter 111 modulates a phase, and causes the EDoF optical system 110 (imaging lenses 110A) to have EDoF so that the extended depth of field (focal depth) (EDoF) is obtained. In this way, the imaging lenses 110A and the optical filter 111 form a lens unit that modulates a phase to extend the depth of field.

The EDoF optical system 110 includes another component as necessary, and for example, a diaphragm (not shown) is disposed in the vicinity of the optical filter 111. Further, a single optical filter 111 may be used, or a combination of a plurality of optical filter 111 may be used. Furthermore, the optical filter 111 is only an example of optical phase modulation means, and EDoF of the EDoF optical system 110 (imaging lens 110A) may be realized by another means. For example, instead of the optical filter 111, EDoF of the EDoF optical system 110 may be realized by the imaging lens 110A lens-designed to have the same function as that of the optical filter 111 in this example.

That is, EDoF of the EDoF optical system 110 may be realized by a variety of means for changing a wave front of image formation onto a light receiving surface of the imaging element 112. For example, "an optical element of which a thickness is changed", "an optical element of which a refractive index is changed (a refractive index distribution type wave front modulation lens, or the like)", "an optical element of which a thickness or a refractive index is changed due to coating on a lens surface or the like (a wave front modulation hybrid lens, an optical element formed on a lens surface as a phase surface, or the like)", or "a liquid crystal element capable of modulating a light phase distribution (a liquid crystal space phase modulation element, or the like)" may be employed as the EDoF means of the EDoF optical system 110. In this way, the invention is not only applied to a case where images which are regularly dispersed by a light wave front modulation element (optical filter 111 (phase plate)) can be formed, but may also be applied to a case where the same dispersed images as those formed using a light wave front modulation element can be formed by the imaging lens 110A itself without using the light wave front modulation element.

Since the EDoF optical system 110 shown in FIG. 51 may not be provided with a focus adjustment mechanism that mechanically performs focus adjustment, it is possible to reduce its size, and thus, the EDoF optical system 110 can be suitably mounted to a mobile phone or a personal digital assistant with a camera.

An optical image after passing through the EDoF optical system 110 having EDoF is formed on the imaging element 112 shown in FIG. 50, and is herein converted into an electric signal.

The imaging element 112 is configured by a plurality of pixels which are arranged in a matrix form using a predetermined pattern arrangement (Bayer arrangement, G-striped R/G full checker, X-Trans arrangement, or honeycomb arrangement, or the like), and each pixel is configured to include a microlens, a color filter (in this example, an RGB color filter), and a photodiode. An optical image incident onto the light receiving surface of the imaging element 112 through the EDoF optical system 110 is converted into an amount of signal electric charges corresponding to the quantity depending on the intensity of incident light by each photodiode arranged on the light receiving surface. Further, R, G, and B signal electric charges accumulated in each photodiode are sequentially output as a voltage signal (image signal) for each pixel.

The AD converter 114 converts analog R, G, and B image signals output from the imaging element 112 to each pixel into digital R, G, and B image signals. The digital image signals which are obtained by conversion into digital image signals in the AD converter 114 are applied to the restoration process block 120.

The restoration process block 120 includes a black level adjustment unit 122, a white balance gain unit 123, a gamma processing unit 124, a demosaicing unit 125, an RGB/YCrCb converter 126, and an Y signal restoration processing unit 127.

The black level adjustment unit 122 performs black level adjustment with respect to digital image signals output from the AD converter 114. A known method may be employed for the black level adjustment. For example, in a case where a certain effective photoelectric conversion element is focused on, by calculating an average of dark amperage acquisition signals respectively corresponding to a plurality of OB photoelectric conversion elements included in a photoelectric conversion element line including the effective photoelectric conversion element, and by subtracting the average from the dark amperage acquisition signals corresponding to the effective photoelectric conversion element, it is possible to perform the black level adjustment.

The white balance gain unit 123 performs gain adjustment based on a white balance gain of respective color signals of R, G, and B included in the digital image signals for which the black level data is adjusted.

The gamma processing unit 124 performs gamma correction for performing gradation correction such as a half tone so that the R, G, and B image signals for which the white balance is adjusted have desired gamma characteristics.

The demosaicing unit 125 performs demosaicing with respect to the R, G, and B image signals after gamma correction. Specifically, the demosaicing unit 125 generates a set of image signals (R signal, G signal, and B signal) output from each light receiving pixel of the imaging element 112 by performing a color interpolation process with respect to the R, G, and B image signals. That is, before demosaicing, a pixel signal from each light receiving pixel is any one of the R, G, and B image signals, but after color demosaicing, a set of three pixel signals of R, G, and B signals corresponding to each light receiving pixel is output.

The RGB/YCrCb converter 126 converts the R, G, and B signals for each pixel, subjected to the demosaicing, into a brightness signal Y, and a color difference signals Cr and Cb, and outputs the brightness signal Y and the color difference signals Cr and Cb for each pixel.

The Y signal restoration processing unit 127 performs a restoration process with respect to the brightness signal Y from the RGB/YCrCb converter 126 based on a restoration filter which is stored in advance. The restoration filter is configured by a deconvolution kernel (corresponding to a tap number of M=7 and N=7) having a kernel size of 7×7 and a computation coefficient (corresponding to restoration gain data and a filter coefficient) corresponding to the deconvolution kernel, and is used in a deconvolution process (deconvolution computation process) corresponding to phase modulation of the optical filter 111. The restoration filter corresponds to the optical filter 111, and is stored in a memory (not shown) (for example, a memory in which the Y signal restoration processing unit 127 is additionally provided). Further, the kernel size of the deconvolution kernel is not limited to 7×7. The Y signal restoration processing unit 127 has a function of a sharpening process in the above-described image processing unit 35.

Figure 52:
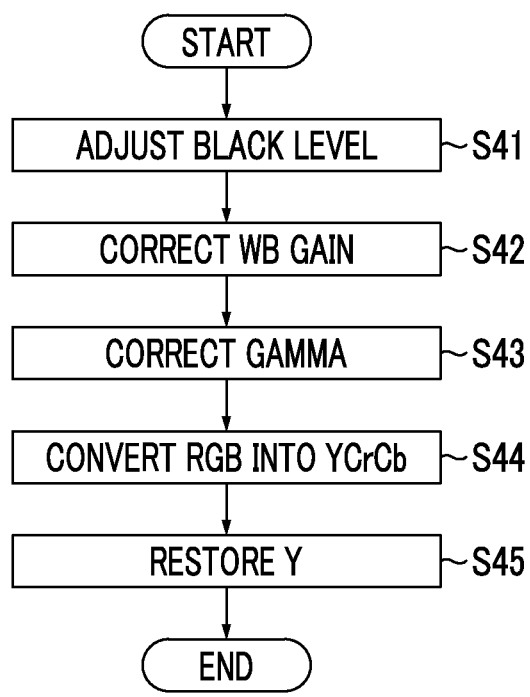
FIG. 52 is a diagram showing an example of a restoration processing flow in a restoration processing block shown in FIG. 50.

Next, a restoration process in the restoration process block 120 will be described. FIG. 52 is a diagram showing an example of a restoration process flow in the restoration process block 120 shown in FIG. 50.

Digital image signals from the AD converter 114 are applied to one input end of the black level adjustment unit 122, and black level data is applied to the other input end thereof. The black level adjustment unit 122 subtracts the black level data from the digital image signals, and outputs the digital image signals from which the black level data is subtracted to the white balance gain unit 123 (S41). Thus, a black level component is not included in the digital image signals, and thus, a digital image signal indicating the black level becomes 0.

The processes in the white balance gain unit 123 and the gamma processing unit 124 are sequentially performed with respect to image data after black level adjustment (S42 and S43).

The gamma-corrected R, G, and B signals are demosaiced in the demosaicing unit 125, and then, are converted into the brightness signal Y, and the color difference signals Cr and Cb in the RGB/YCrCb converter 126 (S44).

The Y signal restoration processing unit 127 performs a restoration process for applying a deconvolution process corresponding to phase modulation of the optical filter 111 of the EDoF optical system 110 to the brightness signal Y (S45). That is, the Y signal restoration processing unit 127 performs a deconvolution process (deconvolution operating process) of brightness signals (herein, brightness signals of 7×7 pixels) corresponding to a predetermined unit of pixel groups centering around a pixel which is an arbitrary processing target and restoration filters stored in advance in a memory or the like (7×7 deconvolution kernels and their computation coefficients). The Y signal restoration processing unit 127 performs a restoration process for removing image blurring of an entire image by repeating the convolution process for each of the predetermined unit of pixel groups to cover an entire area of an imaging surface. The restoration filter is determined according to the position of the center of the pixel groups for which the deconvolution process is performed. That is, a common restoration filter is applied to contiguous pixel groups. Further, in order to simplify the restoration process, it is preferable to apply a common restoration filter to all the pixel groups.

As shown in (a) of FIG. 53, a point image (optical image) of brightness signals after passing through the EDoF optical system 110 are formed on the imaging element 112 as a large point image (blurred image), but is restored as a small point image (high-resolution image) by the deconvolution process in the Y signal restoration processing unit 127, as shown in (b) of FIG. 53.

As described above, by applying a restoration process to brightness signals after demosaicing, it is not necessary to separately provide parameters of the restoration process for each of R, G, and B, and thus, it is possible to perform the restoration process at high speed. Further, since respective image signals of R, G, and B corresponding to pixels of R, G, and B disposed at scattered positions are not collected in individual units to perform the deconvolution process, but instead, brightness signals of contiguous pixels are collected in a predetermined unit and a common restoration filter is applied to the unit to perform the deconvolution process, the accuracy of the restoration process is enhanced. With respect to the color difference signals Cr and Cb, even though the resolution is not increased by the restoration process in terms of visual characteristics of human's eyes, an image may be allowed in terms of image quality. Further, in a case where an image is recorded in a compression format such as JPEG, since color difference signals are compressed at a high compression rate compared with that of a brightness signal, it is not necessary to increase the resolution by the restoration process. Thus, it is possible to enhance the accuracy of restoration, and simultaneously, to achieve simplification and speed increase of the process.

With respect to the restoration process of the above-described EDoF system, similarly, it is possible to apply the image filtering process according to the above-described embodiment.

Further, a form to which the invention is applicable is not limited to a digital camera and a computer (server). For example, the invention may be applied to various types of cameras that have an imaging function as a main function, and also, may be applied to various types of mobile devices that have other functions (call function, communication function, and other computer functions) in addition to an imaging function. As other forms to which the invention is applicable, for example, a mobile phone, a smartphone, a personal digital assistant (PDA) and a mobile game machine having a camera function may be used. Hereinafter, an example of a smartphone to which the invention is applicable will be described.

<Application Example to Smartphone>

FIG. 54 is a diagram showing an appearance of a smartphone 201. The smartphone 201 shown in FIG. 54 includes a flat housing 202, and a display input unit 220 that is disposed on one surface of the housing 202 and includes a display panel 221 which is a display unit and an operation panel 222 which is an input unit, in which the display panel 221 and the operation panel 222 are integrally formed. Further, the housing 202 includes a speaker 231, a microphone 232, an operation unit 240, and camera unit 241. The configuration of the housing 202 is not limited to thereto, and for example, a configuration in which a display unit and an input unit are provided in an independent manner may be employed, or a configuration in which a folding structure or a slide mechanism is provided may also be employed.

FIG. 55 is a block diagram showing a configuration of the smartphone 201 shown in FIG. 54. As shown in FIG. 55, as main components of the smartphone, a wireless communication unit 210, the display input unit 220, a call unit 230, the operation unit 240, the camera unit 241, a storage unit 250, an external input/output unit 260, a global positioning system (GPS) receiver unit 270, a motion sensor unit 280, a power source unit 290, and a main controller 200 (including the above-described main body controller 25) are provided. Further, as main functions of the smartphone 201, a wireless communication function for performing mobile wireless communication with a base station device BS through a mobile communication network NW.

The wireless communication unit 210 performs wireless communication with the base station device BS connected to the mobile communication network NW according to an instruction of the main controller 200. Using the wireless communication, the wireless communication unit 210 performs transmission and reception of a variety of file data such as sound data or image data, e-mail data, or the like, and performs reception of Web data, streaming data, or the like.

The display input unit 220 is a so-called touch panel that includes a display panel 221 and an operation panel 222, displays an image (a still image and a moving image), character information, or the like under the control of the main controller 200 to visually transmit information to a user, and detects a user operation with respect to the displayed information.

The display panel 221 uses a liquid crystal display (LCD), an organic electro-luminescence display (OELD), or the like as a display device. The operation panel 222 is a device that is provided so that an image displayed on a display surface of the display panel 221 can be visually recognized and detects one or a plurality of sets of coordinates operated by a user's finger or a stylus. If the device is operated by a user's finger or a stylus, the operation panel 222 outputs a detection signal generated due to the operation to the main controller 200. Then, the main controller 200 detects an operation position (coordinates) on the display panel 221 based on the received detection signal.

As shown in FIG. 54, as an embodiment of the imaging device of the invention, a configuration in which the display panel 221 and the operation panel 222 of the smartphone 201 shown as an example in FIG. 54 are integrated to form the display input unit 220 and the operation panel 222 is disposed to completely cover the display panel 221 may be used. In a case where such a configuration is employed, the operation panel 222 may have a function of detecting a user operation in a region out of the display panel 221. In other words, the operation panel 222 may include a detection region with respect to a portion that overlaps the display panel 221 (hereinafter, referred to as a "display region"), and a detection region with respect to an outer edge portion that does not overlap the display panel 221 (hereinafter, referred to as a "non-display region").

The size of the display region and the size of the display panel 221 may be completely the same, but it is not essential that both of the sizes are the same. Further, the operation panel 222 may include two sensitive regions of an outer edge portion and an inner portion other than the outer edge portion. Further, the width of the outer edge portion is appropriately designed according to the size of the housing 202, or the like. Furthermore, as a position detection method employed in the operation panel 222, any one of a matrix switch type, a resistive film type, a surface acoustic wave type, an infrared type, an electromagnetic induction type, an electrostatic capacitance type, and the like may be employed.

The call unit 230 includes the speaker 231 and the microphone 232. The call unit 230 converts user's voice input through the microphone 232 into voice data capable of being processed by the main controller 200 and outputs the result to the main controller 200, or decodes voice data received by the wireless communication unit 210 or the external input/output unit 260 and outputs the result through the speaker 231. Further, as shown in FIG. 54, for example, the speaker 231 may be mounted on the same surface as the surface where the display input unit 220 is provided, and the microphone 232 may be mounted on a side surface of the housing 202.

The operation unit 240 is a hardware key using a key switch or the like, and receives an instruction from a user. For example, as shown in FIG. 54, the operation unit 240 is a push button switch that is mounted on a side surface of the housing 202 of the smartphone 201, is turned on when being pressed by a finger or the like, and is turned off by a restoring force of a spring or the like when the finger is separated.

The storage unit 250 stores a control program or control data of the main controller 200, application software, address data in which a name, a telephone number, and the like of a communication partner are associated with each other, data on transmitted or received e-mails, Web data downloaded by a Web browser, or data on downloaded content, and temporarily stores streaming data or the like. Further, the storage unit 250 includes an internal storage unit 251 provided in the smartphone, and an external storage unit 252 provided with a slot for detachable external memory. Each of the internal storage unit 251 and the external storage unit 252 that form the storage unit 250 is realized using a storage medium such as a flash memory, a hard disk, a multimedia card micro type memory, a card type memory (for example, MicroSD (registered trademark) memory or the like), a random access memory (RAM), a read only memory (ROM), or the like.

The external input/output unit 260 serves as an interface with respect to all types of external devices to be connected to the smartphone 201, and is directly or indirectly connected to other external devices through communication or the like (for example, Universal Serial Bus (USB), IEEE1394, or the like) or a network (for example, Internet, wireless LAN, Bluetooth (registered trademark), Radio Frequency Identification (RFID), Infrared Data Association (IrDA, registered trademark), Ultra Wideband (UWB, registered trademark), ZigBee (registered trademark), or the like).

As an external device to be connected to the smartphone 201, for example, a wired or wireless headset, a wired or wireless external charger, a wired or wireless data port, a memory card, a Subscriber Identity Module (SIM) card or a User Identity Module (UIM) card connected through a card socket, an external audio/video device connected through an audio/video input/output (I/O) terminal, an external audio/video device connected in a wireless manner, a smartphone connected in a wired or wireless manner, a personal computer connected in a wired or wireless manner, a PDA connected in a wired or wireless manner, an earphone or the like connected in a wired or wireless manner, may be used. The external input/output unit may be configured to transfer received data transmitted from the external device to respective components in the smartphone 201, or to transmit data in the smartphone 201 to the external device.

The GPS receiver unit 270 receives GPS signals transmitted from GPS satellites ST1 to STn according to an instruction of the main controller 200, executes a positioning computation process based on the plurality of received GPS signals, and detects a position specified by the latitude, longitude and altitude of the smartphone 201. In a case where position information can be acquired from the wireless communication unit 210 and/or the external input/output unit 260 (for example, wireless LAN), the GPS receiver unit 270 can also detect the position using the position information.

The motion sensor unit 280 includes a triaxial acceleration sensor or the like, for example, and detects a physical movement of the smartphone 201 according to an instruction of the main controller 200. By detecting the physical movement of the smartphone 201, a direction and an acceleration where the smartphone 201 moves are detected. The detection result is output to the main controller 200.

The power source unit 290 supplies power accumulated in a battery (not shown) to respective units of the smartphone 201 according to an instruction of the main controller 200.

The main controller 200 includes a microprocessor, and is operated according to a control program or control data stored in the storage unit 250 to generally control the respective units of the smartphone 201. Further, the main controller 200 has a mobile communication control function for controlling respective units of a communication system and an application processing function in order to perform voice communication or data communication through the wireless communication unit 210.

The application processing function is realized as the main controller 200 is operated according to application software stored in the storage unit 250. As the application processing function, for example, an infrared communication function for controlling the external input/output unit 260 to perform data communication with an opposing device, an e-mail function for performing transmission and reception of e-mails, a Web browsing function for browsing Web pages, or the like is used.

Further, the main controller 200 has an image processing function, for example, for displaying video on the display input unit 220 based on image data (data on a still image or a moving image) such as received data or downloaded streaming data. The image processing function refers to a function for decoding the image data, performing image processing with respect to the decoded image data, and displaying an image obtained through the image processing on the display input unit 220, by the main controller 200.

In addition, the main controller 200 executes a display control with respect to the display panel 221, and an operation detection control for detecting a user operation through the operation unit 240 or the operation panel 222.

By executing the display control, the main controller 200 displays an icon for starting up application software or a software key such as a scroll bar, or displays a window for creating an e-mail. The scroll bar refers to a software key for receiving, with respect to a large image which cannot be accommodated in a display region of the display panel 221, an instruction for movement of a display portion of the image.

Further, by execution of the operation detection control, the main controller 200 detects a user operation through the operation unit 240, receives an operation with respect to the icon or an input of a character string with respect to an input section of the window, through the operation panel 222, or receives a scroll request of a display image through the scroll bar.

Furthermore, by execution of the operation detection control, the main controller 200 includes a touch panel control function for determining whether an operation position with respect to the operation panel 222 corresponds to a portion (display region) that overlaps the display panel 221 or an outer edge portion (non-display region) that does not overlap the display panel 221, and controlling a sensitive region of the operation panel 222 and a display position of a software key.

The main controller 200 may detect a gesture operation with respect to the operation panel 222, and may execute a predetermined function according to the detected gesture operation. The gesture operation does not refer to a typical simple operation, but refers to an operation of drawing a locus using a finger or the like, an operation of simultaneously designating a plurality of positions, or an operation of drawing a locus with respect to at least one of a plurality of positions by combination of the above operations.

The camera unit 241 is a digital camera that performs electronic imaging using an imaging element such as a CMOS or a CCD. The camera unit 241 may convert image data obtained through imaging into compressed image data such as JPEG, for example, may record the image data in the storage unit 250, or may output the image data through the external input/output unit 260 or the wireless communication unit 210, under the control of the main controller 200. In the smartphone 201 shown in FIG. 54, the camera unit 241 is mounted on the same surface as that of the display input unit 220, but the mounting position of the camera unit 241 is not limited thereto, and the camera unit 241 may be mounted on a rear surface of the housing 202, instead of the front surface of the housing 202 where the display input unit 220 is provided, or a plurality of camera units 241 may be mounted on the housing 202. In a case where the plurality of camera units 241 are mounted, imaging may be performed using a single camera unit 241 while switching the plurality of camera units 241 to be provided for imaging, or may be performed using the plurality of camera units 241 at the same time.

Further, the camera unit 241 may be used for various functions of the smartphone 201. For example, an image acquired by the camera unit 241 may be displayed on the display panel 221, or an image in the camera unit 241 may be used as one of operation inputs through the operation panel 222. Further, when detecting a position using the GPS receiver unit 270, the position may be detected with reference to an image from the camera unit 241. In addition, it is possible to determine an optical axis direction or a current usage environment of the camera unit 241 of the smartphone 201 without using a triaxial acceleration sensor or by using the triaxial acceleration sensor together, with reference to the image from the camera unit 241. Furthermore, the image from the camera unit 241 may be used in the application software.

Furthermore, position information acquired by the GPS receiver unit 270, voice information (which may be text information obtained by performing voice text conversion by the main controller or the like) acquired by the microphone 232, posture information acquired by the motion sensor unit 280, or the like may be added to image data on a still image or a moving image, and the result may be recorded in the storage unit 250, or may be output through the external input/output unit 260 or the wireless communication unit 210.

The above-described image processing unit 35 (filtering process unit 41) may be realized by the main controller 200, for example.

The invention is not limited to the above-described embodiments, and various modifications may be made in a range without departing from the concept of the invention.

EXPLANATION OF REFERENCES

10: digital camera
11: lens unit
12: camera main body
14: lens
15: diaphragm
17: optical system operation unit
18: lens unit controller
19: lens unit storage unit
20: lens unit input/output unit
24: imaging element
25: main body controller
26: user interface
27: display unit
28: camera main body input/output unit
29: main body storage unit
30: input/output interface
34: device controller
35: image processing unit
36: display controller
38: image determination unit
40: pre-processing unit
41: filtering process unit
42: post-processing unit
43: gain specifying unit
44: gain candidate data storage unit
45: gain acquisition unit
48: filter application unit
49: gain application unit
50: process data calculation unit
51: processed image data calculation unit
52: adder unit
54: repetitive computation determination unit
55: gain supply unit
56: filter supply unit
60: reference image acquisition unit
61: reference image analysis unit
62: target frequency characteristic acquisition unit
63: application gain calculation unit
66: frequency analysis unit
67: target frequency characteristic specifying unit
68: frequency characteristic storage unit
70: guide portion
70a: first guide portion
70b: second guide portion
70c: guide portion
70d: guide portion
71: auto focus area
73: imaging condition display portion
74: determination information portion
76: filter acquisition apparatus
77: filter calculation unit
78: average calculation unit
79: variance calculation unit
80: filter characteristic acquisition unit
81: tap coefficient computation unit
82: filter group classification unit
92: computer
93: computer input/output unit
94: computer controller
95: display
96: network
97: server
98: server input/output unit
99: server controller
101: imaging module
110: EDoF optical system
110A: imaging lens
111: optical filter
112: imaging element
114: AD converter
120: restoration process block
122: black level adjustment unit
123: white balance gain unit
124: gamma processing unit
125: demosaicing unit
126: YCrCb converter
127: Y signal restoration processing unit
200: main controller
201: smartphone
202: housing
210: wireless communication unit
220: display input unit
221: display panel
222: operation panel
230: call unit
231: speaker
232: microphone
240: operation unit
241: camera unit
250: storage unit
251: internal storage unit
252: external storage unit
260: external input/output unit
270: GPS receiver unit
280: motion sensor unit
290: power source unit

What is claimed is:

1. An image processing apparatus comprising:
a filtering process circuit that performs an image filtering process that includes a plurality of times of filtering processes with respect to original image data to acquire processed image data;
a gain candidate data storage; and
a gain specifying circuit;
wherein in each of the plurality of times of filtering processes, the filtering process circuit applies a filter to processing target data to acquire filter application process data, applies a gain to the filter application process data to acquire gain application process data, and acquires filtering process data from the gain application process data,
wherein in each of the plurality of times of filtering processes, the gain applied to the filter application process data is acquired based on a target frequency characteristic of the image filtering process specified based on an individual optical characteristic of an optical system used when the original image data is acquired,
the gain candidate data storage stores gain table information obtained by associating candidate data of the gain applied to the filter application process data with the individual optical characteristic of the optical system, in each of the plurality of times of filtering processes, and
the gain specifying circuit specifies, with reference to the gain table information, the candidate data associated with the individual optical characteristic of the optical system used when the original image data is acquired as the gain applied to the filter application process data in each of the plurality of times of filtering processes,
wherein the filtering process circuit applies the gain specified by the gain specifying circuit to the filter application process data to acquire the gain application process data in each of the plurality of times of filtering processes.

2. The image processing apparatus according to claim 1, further comprising:
a gain acquisition circuit that acquires data indicating the individual optical characteristic of the optical system used when the original image data is acquired, specifies the target frequency characteristic of the image filtering process based on the data indicating the individual optical characteristic, and acquires the gain applied to the filter application process data in each of the plurality of times of filtering processes based on the specified target frequency characteristic of the image filtering process.

3. The image processing apparatus according to claim 1, wherein the gain is acquired by fitting a frequency characteristic of the image filtering process to the target frequency characteristic of the image filtering process using a least squares method based on each frequency characteristic of the plurality of times of filtering processes.

4. The image processing apparatus according to claim 3, wherein weighting is performed based on a frequency in the least squares method.

5. The image processing apparatus according to claim 4, wherein a weight in a low-frequency band is set to be larger than a weight in a high-frequency band in the least squares method.

6. The image processing apparatus according to claim 4, wherein a weight in a high-frequency band is set to be larger than a weight in a low-frequency band according to an imaging condition when the original image data is acquired, in the least squares method.

7. The image processing apparatus according to claim 4, wherein the weight in the least squares method is determined according to a pixel position in the original image data.

8. The image processing apparatus according to claim 7, wherein the weight in the high-frequency band is large at a pixel position which is equal to or shorter than a first distance from the center of an image of the original image data, compared with a pixel position which is more distant than the first distance from the center of the image of the original image data, in the least squares method.

9. The image processing apparatus according to claim 7, wherein the weight in the low-frequency band is large at a pixel position which is more distant than a second distance from the center of an image of the original image data, compared with a pixel position which is equal to or shorter than the second distance from the center of the image of the original image data, in the least squares method.

10. The image processing apparatus according to claim 4, wherein the filtering process circuit uses a filter that makes the filtering process data equal to the processing target data in each of the plurality of times of filtering processes at a frequency where a ratio of the processed image data to the original image data is smaller than 1 in the target frequency characteristic of the image filtering process.

11. The image processing apparatus according to claim 1, wherein the filtering process circuit acquires the filter application process data using a filter determined according to an estimated characteristic of the optical system, in at least any one filtering process among the plurality of times of filtering processes.

12. The image processing apparatus according to claim 11, wherein the filter determined according to the characteristic of the optical system is a filter determined based on a point spread function of the optical system.

13. The image processing apparatus according to claim 1, wherein the filtering process circuit acquires the filter application process data using a filter determined irrespectively of a characteristic of the optical system used when the original image data is acquired through imaging, in at least any one filtering process among the plurality of times of filtering processes.

14. The image processing apparatus according to claim 13, wherein the filter determined irrespectively of the characteristic of the optical system is a contour emphasis filter.

15. The image processing apparatus according to claim 1, wherein the filtering process circuit acquires the filter application process data using a filter having a frequency characteristic according to a pixel position in the processing target data, in at least any one filtering process among the plurality of times of filtering processes.

16. The image processing apparatus according to claim 1, wherein the plurality of times of filtering processes include at least a first filtering process and a second filtering process, and
wherein the filtering process circuit uses the filtering process data acquired by the first filtering process as the processing target data in the second filtering process.

17. The image processing apparatus according to claim 1, wherein the plurality of times of filtering processes include at least a first filtering process and a second filtering process, and
wherein the filtering process circuit uses the same data in the first filtering process and the second filtering process as the processing target data, and acquires the processed image data based on the filtering process data acquired by the first filtering process and the filtering process data acquired by the second filtering process.

18. The image processing apparatus according to claim 1, wherein the plurality of times of filtering processes include at least a first filtering process and a second filtering process, and
wherein the filtering process circuit includes
a first filter application circuit that applies a filter for the first filtering process to the processing target data of the first filtering process to acquire the filter application process data,
a first gain application circuit that applies a gain for the first filtering process to the filter application process data acquired by the first filter application circuit to acquire the gain application process data,
a second filter application circuit that applies a filter for the second filtering process to the processing target data of the second filtering process to acquire the filter application process data, and
a second gain application circuit that applies a gain for the second filtering process to the filter application process data acquired by the second filter application circuit to acquire the gain application process data.

19. The image processing apparatus according to claim 1,
wherein the plurality of times of filtering processes include at least a first filtering process and a second filtering process,
wherein the filtering process circuit includes a filter application circuit that applies the filter to the processing target data to acquire the filter application process data, and a gain application circuit that applies the gain to the filter application process data to acquire the gain application process data,
wherein the filter application circuit acquires the filter application process data using a filter for the first filtering process in the first filtering process, and acquires the filter application process data using a filter for the second filtering process in the second filtering process, and
wherein the gain application circuit acquires the gain application process data using a gain for the first filtering process in the first filtering process, and acquires the gain application process data using a gain for the second filtering process in the second filtering process.

20. The image processing apparatus according to claim 1,
wherein the plurality of times of filtering processes include at least a first filtering process and a second filtering process, and
wherein the filtering process circuit
acquires the filter application process data using a reference filter determined according to an average of a plurality of types of frequency characteristics of the image filtering processes in the first filtering process, and
acquires the filter application process data using a variance filter determined according to a variance of the plurality of types of frequency characteristics of the image filtering processes in the second filtering process.

21. An image processing apparatus comprising:
a filtering process circuit that performs an image filtering process including a plurality of times of filtering processes with respect to original image data to acquire processed image data,
wherein the plurality of times of filtering processes include at least a first filtering process and a second filtering process,
wherein the filtering process circuit
applies a filter to a processing target data to acquire filter application process data, applies a gain to the filter application process data to acquire gain application process data, and acquires filtering process data from the gain application process data, in each of the plurality of times of filtering processes,
acquires, in the first filtering process, the filter application process data using a reference filter determined according to an average of frequency characteristics of the plurality of types of image filtering processes, which are frequency characteristics of the plurality of types of image filtering processes determined according to an individual optical characteristic of an optical system used when the original image data is acquired, and
acquires, in the second filtering process, the filter application process data using a variance filter determined according to a variance of the frequency characteristics of the plurality of types of image filtering processes, which are the frequency characteristics of the plurality of types of image filtering processes determined according to the individual optical characteristic of the optical system used when the original image data is acquired, and
wherein the gain applied to the filter application process data is determined based on the individual optical characteristic of the optical system used when the original image data is acquired, in each of the plurality of times of filtering processes.

22. A filter acquisition apparatus comprising:
a filter calculation circuit that acquires a reference filter determined according to an average of frequency characteristics of a plurality of types of image filtering processes, based on the frequency characteristics of the plurality of types of image filtering processes specified according to optical characteristics of a plurality of optical systems, and acquires at least one variance filter determined according to a variance of the frequency characteristics of the plurality of types of image filtering processes, based on the frequency characteristics of the plurality of types of image filtering processes.

23. The filter acquisition apparatus according to claim 22,
wherein the filter calculation circuit acquires, among the frequency characteristics of the plurality of types of image filtering processes classified into a plurality of filter groups, based on the frequency characteristics of the plurality of types of image filtering processes included in each of the plurality of filter groups, the reference filter and the at least one variance filter relating to each of the plurality of filter groups.

24. The filter acquisition apparatus according to claim 23, further comprising:
a filter group classification circuit that classifies the frequency characteristics of the plurality of types of image filtering processes into the plurality of filter groups, with reference to a mixed normal distribution.

25. The filter acquisition apparatus according to claim 22,
wherein the filter calculation circuit acquires the reference filter which has a plurality of taps, in which a coefficient is allocated to each tap, and acquires the at least one variance filter which has a plurality of taps, in which a coefficient is allocated to each tap.

26. The filter acquisition apparatus according to claim 25,
wherein the filter calculation circuit calculates the coefficient allocated to each tap of the at least one variance filter from a variation distribution function that represents the variance of the frequency characteristics of the plurality of types of image filtering processes and is determined based on the coefficient allocated to each tap of the reference filter.

27. The filter acquisition apparatus according to claim 26,
wherein the filter calculation circuit
acquires a first to an I-th variance filters in a case where I is an integer which is equal to or greater than 2,
calculates a coefficient allocated to each tap of the first variance filter from the variation distribution function determined based on the coefficient allocated to each tap of the reference filter, and
calculates, in a case where J is an integer which is equal to or greater than 2 and is equal to or smaller than I, a coefficient allocated to each tap of a J-th variance filter from the variation distribution function determined based on the coefficient allocated to each tap of the reference filter and a coefficient allocated to each tap of each variance filter that belongs to a first to a (J−1)-th variance filters.

28. The filter acquisition apparatus according to claim 25, wherein the filter calculation circuit updates a coefficient allocated to each tap of at least one of the reference filter and the at least one variance filter, based on a variation distribution function that represents the variance of the frequency characteristics of the plurality of types of image filtering processes and is determined based on the coefficient allocated to each tap of each of the reference filter and the at least one variance filter.

29. The filter acquisition apparatus according to claim 25, wherein the filter calculation circuit calculates the coefficient allocated to each tap of each of the reference filter and the at least one variance filter, based on a SAGE algorithm or an OMP algorithm.

30. An image processing method for performing an image filtering process including a plurality of times of filtering processes with respect to original image data to acquire processed image data, comprising:
 applying a filter to processing target data to acquire filter application process data, applying a gain to the filter application process data to acquire gain application process data, and acquiring filtering process data from the gain application process data, in each of the plurality of times of filtering processes,
 acquiring the gain applied to the filter application process data based on a target frequency characteristic of the image filtering process specified based on an individual optical characteristic of an optical system used when the original image data is acquired, in each of the plurality of times of filtering processes,
 storing gain table information obtained by associating candidate data of the gain applied to the filter application process data with the individual optical characteristic of the optical system, in each of the plurality of times of filtering processes, and
 specifying, with reference to the gain table information, the candidate data associated with the individual optical characteristic of the optical system used when the original image data is acquired as the gain applied to the filter application process data in each of the plurality of times of filtering processes, and
 wherein the specified gain applies to the filter application process data to acquire the gain application process data in each of the plurality of times of filtering processes.

31. An image processing method for performing an image filtering process including a plurality of times of filtering processes with respect to original image data to acquire processed image data,
 wherein the plurality of times of filtering processes include at least a first filtering process and a second filtering process,
 wherein the method comprises:
 applying a filter to processing target data to acquire filter application process data, applying a gain to the filter application process data to acquire gain application process data, and acquiring filtering process data from the gain application process data, in each of the plurality of times of filtering processes;
 acquiring, in the first filtering process, the filter application process data using a reference filter determined according to an average of frequency characteristics of a plurality of types of image filtering processes, which are frequency characteristics of the plurality of types of image filtering processes determined according to an individual optical characteristic of an optical system used when the original image data is acquired; and
 acquiring, in the second filtering process, the filter application process data using a variance filter determined according to a variance of the frequency characteristics of the plurality of types of image filtering processes, which are the frequency characteristics of the plurality of types of image filtering processes determined according to the individual optical characteristic of the optical system used when the original image data is acquired, and
 wherein the gain applied to the filter application process data is determined based on the individual optical characteristic of the optical system used when the original image data is acquired, in each of the plurality of times of filtering processes.

32. A filter acquisition method comprising:
 acquiring, based on frequency characteristics of a plurality of types of image filtering processes specified according to optical characteristics of a plurality of optical systems, a reference filter determined according to an average of the frequency characteristics of the plurality of types of image filtering processes; and
 acquiring at least one variance filter determined according to a variance of the frequency characteristics of the plurality of types of image filtering processes, based on the frequency characteristics of the plurality of types of image filtering processes.

33. A non-transitory computer-readable recording medium that stores a program that causes a computer to realize a function for performing an image filtering process including a plurality of times of filtering processes with respect to original image data to acquire processed image data, the non-transitory computer-readable recording medium that stores the program causing the computer to execute:
 a process of applying a filter to processing target data to acquire filter application process data;
 a process of applying a gain to the filter application process data to acquire gain application process data;
 a process of acquiring filtering process data from the gain application process data, in each of the plurality of times of filtering processes;
 wherein the gain applied to the filter application process data is acquired based on a target frequency characteristic of the image filtering process specified based on an individual optical characteristic of an optical system used when the original image data is acquired, in each of the plurality of times of filtering processes,
 a process of storing gain table information obtained by associating candidate data of the gain applied to the filter application process data with the individual optical characteristic of the optical system, in each of the plurality of times of filtering processes; and
 a process of specifying, with reference to the gain table information, the candidate data associated with the individual optical characteristic of the optical system used when the original image data is acquired as the gain applied to the filter application process data in each of the plurality of times of filtering processes,
 wherein the specified gain applies to the filter application process data to acquire the gain application process data in each of the plurality of times of filtering processes.

34. A non-transitory computer-readable recording medium that stores a program that causes a computer to realize a function for performing an image filtering process including a plurality of times of filtering processes with respect to original image data to acquire processed image data,
- wherein the plurality of times of filtering processes include at least a first filtering process and a second filtering process,
- wherein the non-transitory computer-readable recording medium that stores the program causes the computer to execute:
- a process of applying a filter to processing target data to acquire filter application process data, a process of applying a gain to the filter application process data to acquire gain application process data, and a process of acquiring filtering process data from the gain application process data, in each of the plurality of times of filtering processes;
- a process of acquiring, in the first filtering process, the filter application process data using a reference filter determined according to an average of frequency characteristics of the plurality of types of image filtering processes, which are the frequency characteristics of the plurality of types of image filtering processes determined according to an individual optical characteristic of an optical system used when the original image data is acquired; and
- a process of acquiring, in the second filtering process, the filter application process data using a variance filter determined according to a variance of the frequency characteristics of the plurality of types of image filtering processes, which are the frequency characteristics of the plurality of types of image filtering processes determined according to the individual optical characteristic of the optical system used when the original image data is acquired, and
- wherein the gain applied to the filter application process data is determined based on the individual optical characteristic of the optical system used when the original image data is acquired, in each of the plurality of times of filtering processes.

35. A non-transitory computer-readable recording medium that stores a program that causes a computer to execute:
- a process of acquiring, based on frequency characteristics of a plurality of types of image filtering processes specified according to optical characteristics of a plurality of optical systems, a reference filter determined according to an average of the frequency characteristics of the plurality of types of image filtering processes; and
- a process of acquiring, based on the frequency characteristics of the plurality of types of image filtering processes, at least one variance filter determined according to variances of the frequency characteristics of the plurality of types of image filtering processes.

* * * * *